US011120253B2

(12) United States Patent
Yu et al.

(10) Patent No.: US 11,120,253 B2
(45) Date of Patent: Sep. 14, 2021

(54) FACIAL IMAGE RECOGNITION USING PSEUDO-IMAGES

(71) Applicant: Stowers Institute for Medical Research, Kansas City, MO (US)

(72) Inventors: Congrong (Ron) Yu, Leawood, KS (US); Rishabh Raj, Kansas City, MO (US); Dar Wilbur Dahlen, Albany, CA (US)

(73) Assignee: Stowers Institute for Medical Research, Kansas City, MO (US)

( * ) Notice: Subject to any disclaimer, the term of this patent is extended or adjusted under 35 U.S.C. 154(b) by 81 days.

(21) Appl. No.: 16/453,545

(22) Filed: Jun. 26, 2019

(65) Prior Publication Data

US 2020/0005023 A1 Jan. 2, 2020

Related U.S. Application Data

(60) Provisional application No. 62/693,136, filed on Jul. 2, 2018.

(51) Int. Cl.
*G06K 9/00* (2006.01)
*G06K 9/46* (2006.01)
*G06K 9/40* (2006.01)

(52) U.S. Cl.
CPC ..... *G06K 9/00288* (2013.01); *G06K 9/00275* (2013.01); *G06K 9/40* (2013.01); *G06K 9/4652* (2013.01); *G06K 9/4661* (2013.01)

(58) Field of Classification Search
CPC ........... G06K 9/00288; G06K 9/00275; G06K 9/4661; G06K 9/4652; G06K 9/40; G06K 9/6244
See application file for complete search history.

(56) References Cited

U.S. PATENT DOCUMENTS 5,668,897 A * 9/1997 Stolfo ...................... G06K 9/00 382/283
6,681,032 B2 1/2004 Bortolussi et al.
(Continued)

FOREIGN PATENT DOCUMENTS

WO WO2004027692 A1 4/2004

OTHER PUBLICATIONS

Sep. 30, 2019 International Search Report and Written Opinion for corresponding PCT Application No. PCT/US19/39313 (13 pages).
(Continued)

*Primary Examiner* — Dhaval V Patel
(74) *Attorney, Agent, or Firm* — Maurice M. Klee

(57) ABSTRACT

This disclosure relates to the use of "pseudo-images" to perform image recognition, e.g., to perform facial image recognition. In an embodiment, the pseudo-image is obtained by starting with a real world image and, after optional preprocessing, subjecting the image to a non-linear transformation that converts the image into a pseudo-image. While real world objects (or, more generally, real world patterns) may be perceivable in the starting image, they cannot be perceived in the pseudo-image. Image recognition takes place by comparing the pseudo-image with a library of known pseudo-images, i.e., image recognition takes place in pseudo-image space without a return to real world space. In this way, robust image recognition is achieved even for imperfect real world images, such as, real world images that have been degraded by noise, poor illumination, uneven lighting, and/or occlusion, e.g., the presence of glasses, scarves, or the like in the case of facial images.

27 Claims, 40 Drawing Sheets

(56) References Cited

U.S. PATENT DOCUMENTS

| | | |
|---|---|---|
| 6,895,125 B2 | 5/2005 | Puetter et al. |
| 7,646,924 B2 | 1/2010 | Donoho |
| 8,005,303 B2 | 8/2011 | Cote |
| 8,406,525 B2 | 3/2013 | Ma et al. |
| 8,675,983 B2 | 3/2014 | Yahil |
| 8,787,682 B2 | 7/2014 | Yang et al. |
| 9,275,309 B2 | 3/2016 | Iliadis et al. |
| 9,342,758 B2 | 5/2016 | Xue |
| 9,430,694 B2 | 8/2016 | Iliadis et al. |
| 9,430,697 B1 | 8/2016 | Iliadis et al. |
| 9,582,890 B2 | 2/2017 | Gupta et al. |
| 9,639,954 B2 | 5/2017 | Khazanov et al. |
| 9,665,824 B2 | 5/2017 | Chang et al. |
| 9,704,020 B2 | 7/2017 | Koul et al. |
| 9,704,025 B2 | 7/2017 | Al-Qunaieer et al. |
| 9,710,729 B2 | 7/2017 | Chidlovskii et al. |
| 2011/0064302 A1* | 3/2011 | Ma .................. G06K 9/6232 382/159 |
| 2015/0066486 A1 | 3/2015 | Kokkinis et al. |
| 2015/0086118 A1 | 3/2015 | Shabou et al. |
| 2015/0269314 A1 | 9/2015 | Kopriva et al. |
| 2016/0275416 A1 | 9/2016 | Min et al. |
| 2016/0283858 A1* | 9/2016 | Lin .................... G06N 5/02 |
| 2017/0053185 A1 | 2/2017 | Sandler et al. |
| 2017/0083755 A1 | 3/2017 | Tang et al. |
| 2017/0160813 A1 | 6/2017 | Divakaran et al. |
| 2017/0169284 A1 | 6/2017 | Chu et al. |
| 2017/0193282 A1 | 7/2017 | Valko et al. |

OTHER PUBLICATIONS

Allen et al.,"A Generalized Least-Square Matrix Decomposition," Journal of the American Statistical Association, 109:505, 145-159 (2014).

Bell et al., "The 'Independent Components' of Natural Scenes are Edge Filters," Vision Res., 1997, vol. 37, No. 23, pp. 3327-3338.

Berry et al., "Algorithms and Applications for Approximate Non-negative Matrix Factorization," (Preprint 2006), Computational Statistics & Data Analysis, 2007, vol. 52, issue 1, pp. 155-173.

Candes et al., "I1-magic: Recovery of sparse signals via convex programming" pp. 1-19 (2005) available at http://brainimaging.waisman.wisc.edu/~chung/BIA/download/matlab.v1/I1magic-1.1/I1magic_notes.pdf.

Candes et al., "Decoding by linear programming," (Preprint 2004), IEEE transactions on information theory 51(12): 4203-4215 (2005).

Candes et al., "Robust uncertainty principles: Exact signal reconstruction from highly incomplete frequency information," (Preprint 2004), Information Theory, IEEE Transactions on 52: 489-509 (2006).

Candes et al., "Stable signal recovery from incomplete and inaccurate measurements." (Preprint 2005), Communications on pure and applied mathematics 59(8): 1207-1223 (2006).

Casanovas et al., "Blind Audiovisual Source Separation Based on Sparse Redundant Representations," IEEE Transactions on Multimedia, vol. 12, No. 5, pp. 358-371, 2010.

Chen, S. et al., "Atomic decomposition by basis pursuit," SIAM review 43(1): 129-159 (2001).

Chen, W. et al., "Nonnegative matrix factorization with manifold structure for face recognition" International Journal of Wavelets, Multiresolution and Information Processing vol. 17, No. 02, 1940006 (2019), Abstract.

Cui et al., "Fusing Robust Face Region Descriptors via Multiple Metric Learning for Face Recognition in the Wild," The IEEE Conference on Computer Vision and Pattern Recognition (CVPR), 2013, pp. 3554-3561.

Donoho et al., "Optimally sparse representation in general (nonorthogonal) dictionaries via l1 minimization, " Proceedings of the National Academy of Sciences 100(5): 2197-2202 (2003).

Donoho et al., "For most large underdetermined systems of linear equations the minimal I1-norm solution is also the sparsest solution," (Preprint 2004), Communications on pure and applied mathematics 59: 797-829 (2006).

Donoho, "Compressed sensing," (Preprint 2004), Information Theory, IEEE Transactions on 52(4): 1289-1306 (2006).

Donoho et al., "Sparse solution of underdetermined systems of linear equations by stagewise orthogonal matching pursuit," IEEE Transactions on Information Theory 58(2): 1094-1121 (2012).

Elad et al., "Image Denoising Via Sparse and Redundant Representations Over Learned Dictionaries," IEEE Transactions on Image Processing, vol. 15, No. 12, pp. 3736-3745, 2006.

Elad et al., "On the Role of Sparse and Redundant Representations in Image Processing," Proceedings of the IEEE, vol. 98, No. 6, pp. 972-982, 2010.

Ganguli et al.,"Compressed sensing, sparsity, and dimensionality in neuronal information processing and data analysis." Annu. Rev. Neurosci. 35, 485-508 (2012).

Hoyer, "Non-negative matrix factorization with sparseness constraints," The Journal of Machine Learning Research, 5:1457-1469, 2004.

Hurley et al., "Comparing Measures of Sparsity," IEEE Transactions on Information Theory, vol. 55, No. 10, pp. 4723-4741, 2009.

Kim et al., "Sparse nonnegative matrix factorization for clustering,", Technical Report CSE Technical Reports; GT-CSE-OS-01, 2008.

Lee et al., "Learning the Parts of Objects by Non-negative Matrix Factorization," Nature, vol. 401, pp. 788-791 (1999).

Leonardis et al., "Robust Recognition Using Eigenimages" Computer Vision and Image Understanding vol. 78 No. 1 pp. 99-118 2000.

Li et al., "Learning spatially localized, parts-based representation," Proceedings of the 2001 IEEE Computer Society Conference on Computer Vision and Pattern Recognition, CVPR 2001, Kauai, HI, USA, 2001, pp. I-1.

Liu et al., "Non-negative matrix factorization for visual coding," 2003 IEEE International Conference on Acoustics, Speech, and Signal Processing, 2003. Proceedings. (ICASSP '03)., Hong Kong, 2003, pp. III-293-III-296.

Oh et al., "Occlusion Invariant Face Recognition Using Selective Local Non-Negative Matrix Factorization Basis Images" Image and Vision Computing vol. 26 No. 11 pp. 1515-1523 2008.

Olshausen et al., "Emergence of simple-cell receptive field properties by learning a sparse code for natural images," Nature , vol. 381, pp. 607-609 (1996).

Peng et al., "Sparse graphical representation based discriminant analysis for heterogeneous face recognition" Signal Processing, vol. 156, 2019, Abstract.

Raj et al., "Compressed sensing allows robust and accurate sensory signal recovery," Poster# II-90, 2016 Cosyne.org Main Meeting, Salt Lake City, UT, 2016.

Raj et al., "A Framework for Robust Sensory Processing Based on Sparse Independent Representations of Inputs" Program#/Poster# 773.19/DD9. 2017 Neuroscience Meeting Planner. Washington, DC.: Society for Neuroscience, 2017.

Rapin et al.,"Sparse and Non-Negative BSS for Noisy Data," IEEE Transactions on Signal Processing, vol. 61, No. 22, pp. 5620-5632, 2013.

Rapin et al.,Sparse Regularizations and Non-negativity in BSS. Proceedings of SPARS, Lausanne,Switzerland, 83 (2013).

Rozell et al., "Sparse coding via thresholding and local competition in neural circuits," Neural Comput 20, 2526-2563, (2008).

Wagner et al., "Toward a Practical Face Recognition System: Robust Alignment and Illumination by Sparse Representation," (Preprint), IEEE Transactions on Pattern Analysis and Machine Intelligence, vol. 34, No. 2, pp. 372-386, 2012.

Wang et al., "Face Feature Extraction: A Complete Review," in IEEE Access, vol. 6, pp. 6001-6039, 2018.

Wright et al., "Robust Face Recognition via Sparse Representation," IEEE Transactions on Pattern Analysis and Machine Intelligence, vol. 31, No. 2, pp. 210-227, 2009.

Yang et al., "Linear spatial pyramid matching using sparse coding for image classification," IEEE Conference on Computer Vision and Pattern Recognition, Miami, FL, 2009, pp. 1794-1801.

Zhao et al., "Discriminant analysis of principal components for face recognition," pp. 73-85. Springer Verlag Berlin, 1998.

(56) References Cited

OTHER PUBLICATIONS

Zhao et al., "Face recognition: A literature survey" ACM computing surveys (CSUR) 35, 399-458 (2003).
Zhang et al., "Multi-cue Normalized Non-Negative Sparse Encoder for image classification," 2015 IEEE International Conference on Multimedia and Expo (ICME), 2015, pp. 1-6, doi: 10.1109/ICME.2015.7177531.
Zhou et al., "Image Classification Using Super-Vector Coding of Local Image Descriptors" In: Daniilidis K., Maragos P., Paragios N. (eds) Computer Vision—ECCV 2010. ECCV 2010. Lecture Notes in Computer Science, vol. 6315. Springer, Berlin, Heidelberg, https://doi.org/10.1007/978-3-642-15555-0_11.
Jun. 18, 2021 European Search Report with Examined Claims for EP Application No. 19831514.5 (20 pages).

\* cited by examiner

First-Images    Pseudo-images

First-Image

Pseudo-image

Dictionary

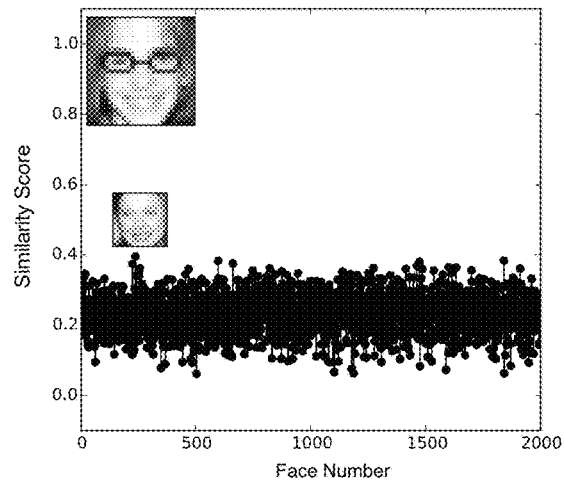 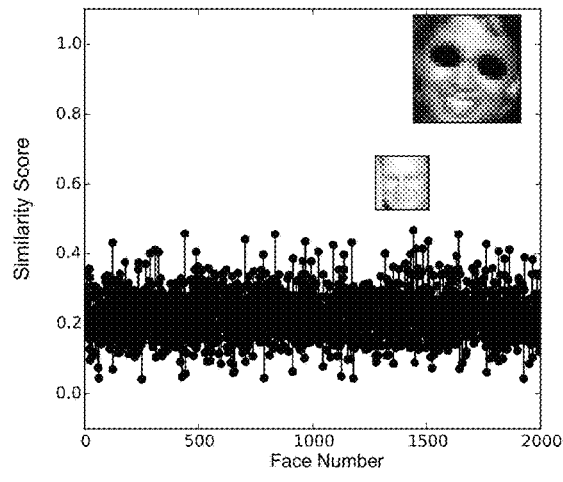
FIG. 20  FIG. 21
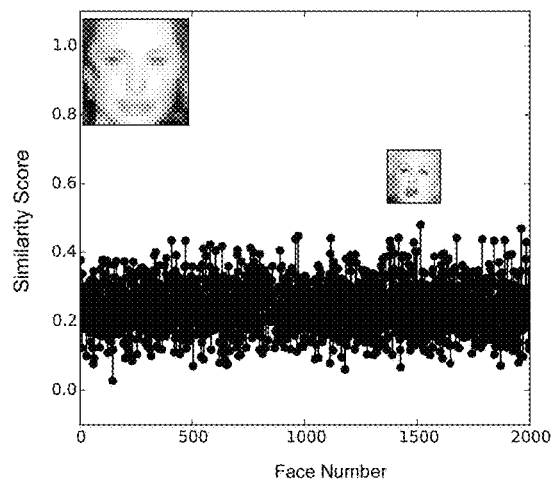 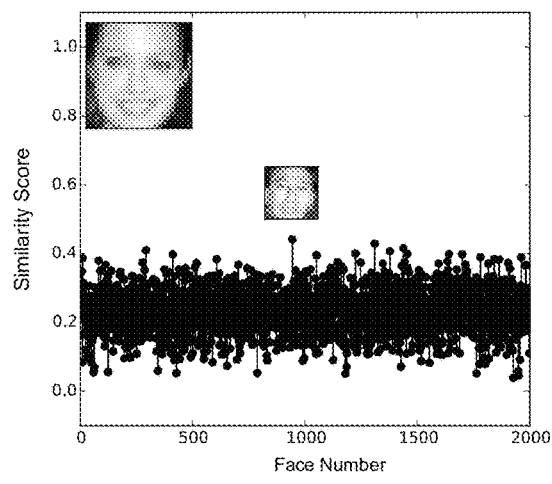
FIG. 22

FACIAL IMAGE RECOGNITION USING PSEUDO-IMAGES

CROSS-REFERENCE TO RELATED APPLICATION

This application claims the benefit under 35 USC § 119(e) of U.S. Provisional Application No. 62/693,136 filed on Jul. 2, 2018, the contents of which in its entirety is hereby incorporated by reference.

GOVERNMENT FUNDING

This invention was made with government support under grant number R01DC 014701 awarded by the National Institutes of Health. The government has certain rights in the invention.

FIELD

This disclosure relates to computer systems and computer-implemented methods for performing image recognition. In a particularly important embodiment, the systems and methods are used to identify a human subject within an image through facial recognition. More generally, the disclosure provides computer-implemented methods and computer systems for processing images composed of pixels or, more generally, images composed of components, to find objects, patterns, or features embedded in the images that can be used for classification, identification, or other purposes.

BACKGROUND

Facial recognition by computer devices has broad applications, not only in historically important areas such as national security and the criminal justice system, but also in recent years in commercial settings and social media interactions. Consequently, facial recognition has been and continues to be the subject of intense study with various scientific journals being dedicated to the problem (e.g., the International Journal of Computer Vision and the IEEE publications entitled IEEE Transactions on Image Processing and IEEE Transactions on Pattern Analysis and Machine Intelligence) and with international conferences being regularly convened to report on progress being made (e.g., the annual conferences of the International Association for Pattern Recognition and the IEEE Computer Society Conferences on Computer Vision and Pattern Recognition and the IEEE International Conference on Automatic Face and Gesture Recognition).

Success in facial recognition has been achieved in laboratory environments. However, it remains a challenge in practical applications, where images are often collected from imperfect sources such as surveillance cameras, the internet, or mobile devices. Facial images obtained under such real world conditions are often degraded by noise, poor illumination, uneven lighting, and/or occlusion, making it difficult to recognize the person or persons whose faces appear in the image. Variation in facial expression, pose, and camera angles often present additional difficulties. A central challenge of facial recognition is thus to achieve robust and invariant recognition of the same face under varying conditions and with degraded images. Such images will be referred to herein as "imperfect images."

Computerized facial recognition is usually performed using systems that represent faces in some form, following which a matching process is conducted. Some of the systems that achieve successful recognition involve extracting features from images using either learning-based approaches or manually-curated features. Representations of the images are then subject to matching that often involves statistical approaches to classify and/or identify the faces. While manually-curated features can provide robustness, it is prohibitive to enumerate all possible features. Deep learning approaches can allow a system to perform feature extraction with supervised or unsupervised algorithms. However, they generally require a large training set that covers numerous possible conditions. If there are conditions not included in the training set, the system likely will fail to perform in practice.

SUMMARY AND GENERAL DESCRIPTION

The present disclosure is directed to the above problems in facial image recognition. More generally, the disclosure is directed to providing robust methods for processing images composed of components (e.g., pixels) to find objects, patterns, or features embedded therein.

In accordance with a first aspect, the disclosure provides a method of performing computer-implemented image recognition comprising:

(a) providing a first-image having M components;

(b) providing a predetermined transformation matrix, wherein:

(i) the predetermined transformation matrix is an M×K matrix in which the K columns constitute a set of K dictionary elements, and (ii) the predetermined transformation matrix is constructed by a method comprising performing a sparse, non-negative factorization of an M×N matrix in which the N columns constitute a set of N training images, each training image having M components; and (c) constructing a pseudo-image for the first-image using the predetermined transformation matrix to perform a sparse, non-negative transformation of the first-image, said pseudo-image for the first-image consisting of K element weights, each element weight being for one of the K dictionary elements;

wherein the M×N matrix has a rank R and K satisfies one or both of the following relationships:

K is greater than or equal to M; and (ii) K is greater than or equal to R.

As is known, the row rank of a matrix is the number of rows of the matrix that are linearly independent and the column rank is the number of columns that are linearly independent. The row rank always equals the column rank and thus the number of linearly independent rows or columns constitutes a matrix's "rank." A matrix is a "full rank matrix" if its rank equals the largest possible rank for a matrix of the same dimensions, i.e., if the rank of the matrix is the lesser of the number of rows and columns.

The M×N matrix will often be a full rank matrix and it will also normally have N>M. Under these conditions, R equals M so that the second relationship becomes the same as the first relationship, i.e., K≥M. Thus, in many cases, the above relationships are equivalent to the predetermined transformation matrix being a square matrix (K=M) or, more typically, a rectangular matrix with more columns than rows (K>M).

In certain embodiments of the first aspect of the disclosure, the method further comprises the following steps (d) and (e):

(d) providing a set of S pseudo-images of known images, each of said S pseudo-images consisting of K element weights, each element weight being for one of the K dictionary elements; and (e) comparing the pseudo-image of step (c) with the set of S pseudo-images of step (d) to, for example, determine a likelihood that the first-image is one or more of:
 (i) in one or more classes or categories of the known images,
 (ii) a particular known image,
 (iii) not in one or more classes or categories of the known images, and
 (iv) not a known image.

In other embodiments of the first aspect of the disclosure, the method comprises the further step of reporting the results of the comparison of step (e) or otherwise using those results, e.g., using the results of the comparison to control the operation of a robot in a machine vision application of the disclosed method.

In accordance with a second aspect, the disclosure provides a method of performing computer-implemented image recognition comprising:

(a) providing a first-image having M components;

(b) providing a predetermined transformation matrix, wherein:
 (i) the predetermined transformation matrix is an M×K matrix in which the K columns constitute a set of K dictionary elements, and
 (ii) the predetermined transformation matrix is constructed by a method comprising performing a sparse, non-negative factorization of an M×N matrix in which the N columns constitute a set of N training images, each training image having M components;

(c) constructing a pseudo-image for the first-image using the predetermined transformation matrix to perform a sparse, non-negative transformation of the first-image, said pseudo-image for the first-image consisting of K element weights, each element weight being for one of the K dictionary elements;

(d) providing a set of S pseudo-images of known images, each of said S pseudo-images consisting of K element weights, each element weight being for one of the K dictionary elements; and (e) comparing the pseudo-image of step (c) with the set of S pseudo-images of step (d) to, for example, determine a likelihood that the first-image is one or more of:
 (i) in one or more classes or categories of the known images,
 (ii) a particular known image,
 (iii) not in one or more classes or categories of the known images, and
 (iv) not a known image.

In certain embodiments of the second aspect of the disclosure, the method comprises the further step of reporting the results of the comparison of step (e) or otherwise using those results, e.g., using the results of the comparison to control the operation of a robot in a machine vision application of the disclosed method.

In accordance with a third aspect, the disclosure provides a method of performing computer-implemented image recognition comprising:

(a) providing a first-image having M components each of which has only one of two possible values;

(b) providing a predetermined transformation matrix, wherein:
 (i) the predetermined transformation matrix is an M×K matrix in which the K columns constitute a set of K dictionary elements, and
 (ii) the predetermined transformation matrix is constructed by a method comprising performing a sparse, non-negative factorization of an M×N matrix in which the N columns constitute a set of N training images, each training image having M components each of which has only one of said two possible values; and (c) constructing a pseudo-image for the first-image using the predetermined transformation matrix to perform a sparse, non-negative transformation of the first-image, said pseudo-image for the first-image consisting of K element weights, each element weight being for one of the K dictionary elements.

In certain embodiments of the third aspect of the disclosure, the method further comprises the following steps (d) and (e):

(d) providing a set of S pseudo-images of known images whose components have only one of said two possible values, each of said S pseudo-images consisting of K element weights, each element weight being for one of the K dictionary elements; and (e) comparing the pseudo-image of step (c) with the set of S pseudo-images of step (d) to, for example, determine a likelihood that the first-image is one or more of:
 (i) in one or more classes or categories of the known images,
 (ii) a particular known image,
 (iii) not in one or more classes or categories of the known images, and
 (iv) not a known image.

In other embodiments of the third aspect of the disclosure, the method comprises the further step of reporting the results of the comparison of step (e) or otherwise using those results, e.g., using the results of the comparison to control the operation of a robot in a machine vision application of the disclosed method.

With regard to step (a) of the first, second, and third aspects of the disclosure, the first-image can be an image obtained from, for example, a digital imaging device, e.g., a standalone digital camera or a digital camera embodied in another device, e.g., a cell phone. Such images are examples of "original-images" as defined below. In certain embodiments, the first-image can be an original-image that has been subjected to one or more levels of preprocessing. To facilitate the presentation, the first-image of step (a) is referred to below as a "first-image-of-interest" or as a "step(a)-first-image" in order to distinguish the first-image of step (a) from other first-images that are used in other portions of the overall process, e.g., first-images that are used as training images and first-images that are used in the preparation of pseudo-image libraries.

With regard to step (b) of the first, second, and third aspects of the disclosure, the predetermined transformation matrix used in this step can be thought of as the "engine" of the disclosed image recognition process. In an embodiment, the sparse, non-negative factorization used in obtaining the predetermined transformation matrix employs at least one Frobenius norm. (As used herein, a Frobenius norm of a matrix is the square root of the sum of the squares of the components of the matrix.) Importantly, the matrix of training images used in obtaining the predetermined transformation matrix (referred to herein as the "training set of images" or simply the "training set") need not include the firstimage-of-interest and typically will not include it. That is, the disclosed method is able to perform image recognition on images that were not part of the method's training set. This is an important advantage of the process because, among other things, it allows image recognition to be performed on imperfect images that were not part of the training set, including images that suffer from, for example, one or more of noise, corruption, or occlusion. In an embodiment, once constructed, the predetermined transformation matrix is stored in a non-transitory, computer-readable medium for later use.

To facilitate the presentation, the pseudo-image of step (c) is referred to below as a "pseudo-image-of-interest" or as a "step(c)-pseudo-image" in order to distinguish the pseudo-image of step (c) from other pseudo-images that are used in other portions of the overall process, e.g., pseudo-images that are generated during the production of the predetermined transformation matrix and pseudo-images that are used in the preparation of pseudo-image libraries. In an embodiment, once constructed, the step(c)-pseudo-image is stored in a non-transitory, computer-readable medium for later analysis and/or use. In an embodiment, the sparse, non-negative transformation used in constructing pseudo-images (other than the pseudo-images generated during the production of the predetermined transformation matrix) employs at least one $L_2$ norm. (As used herein, an $L_2$ norm of a vector is the square root of the sum of the squares of the components of the vector.)

With regard to optional steps (d) and (e) of the first and third aspects of the disclosure and required steps (d) and (e) of the second aspect of the disclosure, in an embodiment, the set of pseudo-images of known images used in these steps (the "library of pseudo-images" or simply the "library") is obtained using the same predetermined transformation matrix as used in step (c). Importantly, in step (e), the comparison is between pseudo-images, not between first-images. It is this comparison of pseudo-images as opposed to a comparison of first-images that is a key element in providing the disclosed process with its improved robustness compared to prior techniques for performing image recognition.

Upon completion of the comparison of step (e), the results of the comparison can be reported directly to the user or stored for subsequent use, reporting, or analysis. When the comparison of step (e) is used for classification, the reporting may be as simple as identifying a single category and/or a single class for the first-image-of-interest (and thus the original-image; see below). For example, in the case of facial recognition, the classification can be as basic as categorizing the first-image-of-interest as being a male face or a female face. The reporting will typically be more detailed, e.g., it will typically provide information regarding multiple categories and/or multiple classes of interest. Optionally, the reporting can include an indication of the confidence level of the classification for one, more than one, or all of the categories or classes for which a comparison was performed.

When the comparison of step (e) is used for identification, the reporting may be as simple as notifying the user that a "match" has been found. Typically, the notification will be accompanied by at least the name of the known image. Usually, in addition to the name, the reporting will include other relevant data regarding the known image, as well as a copy of the known image. Optionally, the reporting can include an indication of the confidence level of the identification, e.g., the reporting can include a similarity or comparison score. In an embodiment, the indication of confidence can include copies of one or more known images with lower confidence levels (lower likelihoods of corresponding to the first-image-of-interest) than the known image with the highest confidence level.

As noted above, an important feature of the image recognition method disclosed herein is that once in pseudo-image space, the method remains in pseudo-image space and does not return to first-image space to, for example, perform the comparison of step (e). In this way, the robustness of the method, e.g., its ability to handle imperfect images, is significantly improved. Robustness has also been found to depend on the value of K, with larger values of K leading to more robustness but at the expense of longer computation times and/or larger storage requirements.

In particular, as will be discussed in more detail below, it has been found that robustness increases with the ratios of K to M and R. (As noted above, in many cases, R will be equal to M.) Quantitatively, in certain embodiments, one or both of the K/M and K/R ratios are greater than or equal to 1.0, or greater than or equal to 2.0, or greater than or equal to 3.0, or greater than or equal to 4.0, or greater than or equal to 5.0.

As noted above, the M×N matrix will often be a full rank matrix and it will also normally have N>M. Under these conditions, R equals M so that the K≥R criterion for robust image recognition becomes K≥M, i.e., for a full rank M×N matrix with N>M, the dimension of the pseudo-image in K space needs to be greater than or equal to the dimension of the first-image in M space. Under these circumstances, the transformation from a first-image to a pseudo-image using the predetermined transformation matrix can be thought of as an "expansion" or "decompression" of the first-image from M components to K components. That is, the predetermined transformation matrix takes an image with a given number of components (M components) and transforms it (expands it or decompresses it) into an image with more components (K element weights). A priori one would not think that this would be helpful in performing image recognition. In accordance with the present disclosure, just the opposite has been found—the transformation is extremely effective in performing image recognition and provided the expansion is sufficiently large, results in high levels of robustness in performing image recognition on imperfect images.

On its face, the M K decompression strategy of the image recognition techniques disclosed herein goes against the conventional wisdom that image processing should achieve data compression, not expansion. However, because of the sparseness condition applied during the generation of pseudo-images, the decompression in most cases does not mean that more storage is needed for the pseudo-image than for the first-image since relatively few of the K element weights making up the pseudo-image will have values that need to be stored to represent the pseudo-image. That is, many and, in most cases, most of the element weights will be zero or essentially zero and thus all that needs to be stored are the values and locations in the pseudo-image of the element weights that are not zero or not essentially zero. Accordingly, in most cases, the image recognition techniques disclosed herein simultaneously achieve both effective image recognition and reduced storage requirements. (Although it will typically not affect storage requirements, it can be noted that because the transformation from the first-image to the pseudo-image is a non-negative transformation, all of the element weights that are stored are positive numbers.) Quantitatively, designating the number of element weights that need to be stored as K', the ratio of K' to M will generally be less than 1.0, or less than or equal to 0.75, or less than or equal to 0.50, or less than or equal to 0.25, or less than or equal to 0.10, or less than or equal to 0.05, or equal to 1/M.

In the case of grayscale first-images, having K≥M and/or K≥R has been found to be a base requirement for robust image recognition. For first-images where the components of the image can only have one of two values, e.g., on or off, as opposed to many values, e.g., 256 values as in an 8-bit grayscale, it has been found that acceptable levels of robustness can be achieved through the use of pseudo-images in comparison step (e) even if neither of the K≥M and K≥R relationships are satisfied. Example 10 and, in particular, FIGS. 33 and 34, illustrate this difference between 2-value images (binary images) compared to grayscale images. Specifically, in this example, acceptably robust image recognition of imperfect images of symbols (specifically, letters and characters) was achieved both when K was greater than M (FIG. 33) and when it was less than M (FIG. 34). As illustrated in this example, having K greater than M makes the process substantially more robust, but the robustness is sufficient for practical applications when K is less than M and the first-image is a binary image. The same results are found when K is compared with R.

In accordance with a fourth aspect of the present disclosure, the value of K and/or the value of its ratio to one or both of M and R is varied until a suitable level of robustness is identified for the particular image recognition problem being addressed. Examples 1-8 below illustrate this aspect of the disclosure where a K/M ratio of 0.8 was found sufficient for performing facial recognition on faces that had not been subjected to facial modifications but insufficient for faces that had been subjected to modification. A K/M ratio of 2.4, on the other hand, succeeded in providing correct identifications both for unmodified and modified faces, and a K/M ratio of 4.0 was even better.

In accordance with a fifth aspect, the disclosure provides non-transitory, computer-readable media and computer systems for performing the image recognition methods disclosed herein. The non-transitory, computer-readable media, which can be sold and/or distributed as articles of commerce, can contain computer instructions (computer code) capable of being executed on a computer system to perform part or all of the disclosed image recognition techniques.

In accordance with a sixth aspect, the disclosure provides one or more datasets of pseudo-images for use in steps (d) and (e) as pseudo-image libraries. The dataset or sets can be contained in non-transitory, computer-readable media that are sold and/or distributed as articles of commerce. Likewise, one or more predetermined transformation matrices for use in step (b) and/or one or more training sets for obtaining predetermined transformation matrices can be contained in non-transitory, computer-readable media that are sold and/or distributed as articles of commerce. The distribution can, for example, be over the internet which, among other things, can facilitate updating of pseudo-image libraries to, for example, add new pseudo-images or remove pseudo-images no longer relevant to the image recognition being performed. The non-transitory, computer-readable media can be in the "cloud" or at a user's location.

Additional aspects of the present disclosure are set forth below under the heading "Features of the Disclosure."

A preferred application of the image recognition techniques disclosed herein is facial recognition. Other applications include object recognition and symbol recognition (machine reading). More generally, the disclosed image recognition techniques can be used in all forms of machine vision. Non-limiting examples of the variety of images that can be analyzed using the technology disclosed herein, as well as non-limiting examples of applications for the technology, are discussed below under the heading "Industrial Applicability."

Additional properties and advantages of the technology disclosed herein are set forth in the detailed description that follows, and in part will be readily apparent to those skilled in the art from that description or recognized by practicing the technology as described herein. The accompanying drawings are included to provide a further understanding of the technology, and are incorporated in and constitute a part of this specification. It is to be understood that the various aspects of the technology disclosed in this specification and in the drawings can be used individually and in any and all combinations. It is also to be understood that the general description set forth above and the detailed description which follows are merely exemplary of the invention and are intended to provide an overview or framework for understanding the nature and character of the invention as defined by the claims.

BRIEF DESCRIPTION OF THE DRAWINGS

FIG. 20 shows the identification of a face in a pseudo-image library but with a pair of glasses added to the face as in FIG. 14. K equaled 500 for this figure, instead of 1,500 as in FIG. 14. In contrast to FIG. 14, a wrong face was identified.

FIG. 21 shows the identification of a face in a pseudo-image library but with a pair of sunglasses obscuring the eyes of the woman's face as in FIG. 15. K equaled 500 for this figure, instead of 1,500 as in FIG. 15. In contrast to FIG. 15, a wrong face was identified.

FIG. 22 shows the identification of two faces in a pseudo-image library but with different facial expressions as in FIG. 16. K equaled 500 for this figure, instead of 1,500 as in FIG. 16. In contrast to FIG. 16, wrong faces were identified.

FIG. 27 shows the identification of a female face in a pseudo-image library but with different parts of her face obscured as in FIGS. 18 and 24. K equaled 2,500 for this figure and the correct face was identified with a substantially higher similarity score in all cases compared to other faces in the library.

FIG. 31 shows 1,000 symbols (letters and characters) that were used as a training set for image recognition in accordance with the techniques disclosed herein. Each symbol was digitized as a 16×16 first-image.

FIG. 36 shows the first-images (N=1,000) used in comparing the de novo and sequential approaches for creating an augmented predetermined transformation matrix. Each of these first-images is a 16×16 array of binary pixels (M=256). The first images of this figure are the same as those of FIG. 31, but with different formatting.

FIG. 37 shows the dictionary elements (K=1,000) produced using the de novo approach for creating an augmented predetermined transformation matrix. Each of the dictionary elements is a 16×16 array of binary pixels (M=256).

TERMINOLOGY AND NOTATION

Figure 1:
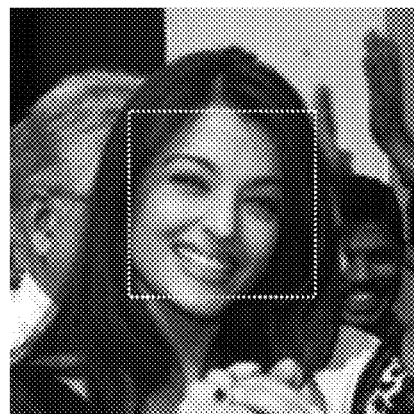
FIG. 1 shows an original-image of a person-of-interest.

The following terms and their associated singulars and plurals and the following notation are used in the specification and in the claims.

(A) Original-Image and First-Level, Second-Level, and Other Preprocessing

An "original-image" is an ordered sequence of components (e.g., pixels), each component having a value and a location within the sequence. Typically, a human will be able to perceive one or more objects from the real world in an original-image (e.g., a human face in the case of facial recognition), but not necessarily in all cases, e.g., an original-image can be a computer-generated image such as a UPC or matrix barcode. An original-image can be generated by a digital imaging device, e.g., a standalone digital camera or a digital camera embodied in another device, e.g., a cell phone. An original-image can also be an analog image that has been digitized.

In the case of original-images that are in color, the image can be broken down into composite colors, e.g., the red, green, and blue subcomponents (e.g., subpixels) of an image produced by a digital camera, and each of the composite colors processed as a separate original-image. Alternatively, the composite colors can be concatenated into a single original-image. For example, in the case of a 25×25 RGB color image, the concatenated original image would have 1,875 components, rather than 625 components if the image were not in color.

If desired, an original-image can be subjected to "first-level preprocessing" prior to being transformed into a pseudo-image. Unlike second-level preprocessing discussed below, first-level preprocessing maintains the relative relationships between the components of an image both in terms of the relative values and the relative locations of the components in the sequence of components. Examples of first-level preprocessing include, but are not limited to, reduction in the number of components (down-sampling), cropping of portions of the image, affine transformations of the image, such as, rotating, translating, stretching, and/or contracting all or part of the image, normalization, and the like.

As with an original-image, a first-level preprocessed image is an ordered sequence of components, each component having a value and a location within the sequence. In the case of original-images in which humans can perceive one or more objects from the real world, one or more objects from the real world will normally still be perceivable by humans after first-level preprocessing unless all such objects are removed by, for example, cropping. The number of components in a first-level preprocessed image can be the same as or less than the number of components in the image from which it is derived.

For some applications, second-level preprocessing can be performed on an original-image or a first-level preprocessed image (referred to as the "starting-image" for the second-level preprocessing). In an embodiment, second-level preprocessing can comprise performing a Fourier transform of the starting-image and using the resulting Fourier coefficients as the components of the first-image. Along these same lines, wavelet transforms can be used and the resulting wavelet coefficients used as the components of the first-image. These types of pre-processing can produce a "reduced-image" that is an ordered sequence of components, each component having a value and a location within the sequence, where the number of components in the reduced-image is less than the number of components in the starting-image. A reduction in the number of components reduces storage requirements and depending on the number of calculations needed to generate the reduced-image, can reduce overall processing times.

Like an original-image or a first-level preprocessed image, a second-level preprocessed image is an ordered sequence of components, each component having a value and a location within the sequence. However, unlike first-level preprocessing, second-level preprocessing does change the relationship between the components. The change in the relationship between components can be in terms of relative values, relative locations of the components in the sequence of components, or both relative values and relative locations in the sequence of components. Consequently, in the case of images that contain objects from the real world, humans may find it more difficult or, in some cases, impossible to perceive those objects in images that have undergone second-level preprocessing.

Although first-level and second-level preprocessing have been defined separately to facilitate the presentation, in practice, the two types of preprocessing can be integrated with one another as a single preprocessing step in the overall image recognition process. Also, each of first-level and second-level preprocessing steps can be performed multiple times in any order. In the case of images that contain objects from the real world, when first-level preprocessing is performed on an image that has undergone second-level preprocessing, humans may find it more difficult or impossible to perceive the real world objects in the resulting second-level-followed-by-first-level preprocessed image.

In addition, preprocessing that is not specifically characterizable as first-level preprocessing or second-level preprocessing can be used. For example, low-pass, high-pass, or band-pass spatial filtering can change the relative values between components. Such filtering can produce images in which humans may find it easier, rather than harder, to perceive objects from the real world because, for example, high-frequency noise has been removed in the case of low-pass filtering or edges of objects have been enhanced in the case of high-pass filtering. Preprocessing thus includes, but is not limited to, first-level and second-level preprocessing.

(B) First-Image

A "first-image" is an original-image or an original-image that has been subjected to preprocessing. Thus, a first-image is an ordered sequence of components (e.g., pixels), each component having a value and a location within the sequence. As discussed above, for a typical original-image, a human will be able to perceive one or more objects from the real world (e.g., a human face) in the original-image. For a first-image that is the original-image or the original-image that has undergone only first-level preprocessing, this will continue to be the case. For other types of preprocessing, humans may find it difficult or impossible to perceive objects from the real world in a first-image.

In the discussion below, the first-image is treated as a vector, with an individual first-image being represented by $x_n$ and a set of first-images arranged as the columns of a matrix being represented by X. The number of components in a first-image (the "dimension" of the first-image) is represented by the letter M and the number of columns (number of first-images) in the matrix X is represented by the letter N. Thus, in the above notation, n can have a value between 1 and N, each $x_n$ has M components, and X is an M×N matrix.

Although in the discussion below, first-images and other ordered sequences of components are treated as vectors (one-dimensional arrays), in a computer, ordered sequences of components can be stored and/or processed as higher dimensional arrays, e.g., two or three dimensional arrays, if desired.

(C) Predetermined Transformation Matrix and Dictionary Elements

A "predetermined transformation matrix" is a matrix having M rows and K columns. Each of the K columns is referred to as a "dictionary element" or simply an "element." Each dictionary element is an ordered sequence of M components, each component having a value and a location within the sequence. Thus, if desired, each dictionary element can be displayed as an image (see, for example, FIG. 4). In the discussion below, a predetermined transformation matrix is represented by the matrix Φ.

As described above and discussed in more detail below, a predetermined transformation matrix is obtained by a method comprising performing a sparse, non-negative factorization of a matrix of training images. As discussed below, sparseness both with regard to the production of the predetermined transformation matrix and the production of pseudo-images from first-images can be measured using an $L_1$ norm, an $L_0$ norm, or an $L_p$ norm where p is greater than zero and less than one, the $L_1$ norm being preferred in most cases. Other measures of sparseness can also be used (see below). The matrix of training images is a matrix of known images, specifically, a matrix of known first-images. Those known first-images may have been subjected to preprocessing. In such a case, in an embodiment, the first-image-of-interest (step(a)-first-image) can be subjected to the same preprocessing as the first-images making up the training set. In other embodiments, the preprocessing used to produce the first-image-of-interest may be different from the preprocessing used to produce the first-images of the training set (or the first-image-of-interest may be an original-image with no preprocessing) provided that, notwithstanding the different preprocessing, the preprocessed first-image-of-interest and the preprocessed first-images making up the training set have the same number of components (i.e., the same M value).

The factorization produces the predetermined transformation matrix and pseudo-images for the training images. Both the predetermined transformation matrix and the pseudo-images are constrained to be non-negative. The pseudo-images are also constrained to be sparse. The predetermined transformation matrix, however, is not constrained to be sparse. Thus, in the phrase "a sparse, non-negative factorization," non-negativity applies to both the predetermined transformation matrix and the pseudo-images that are produced by the factorization, while sparseness applies only to the pseudo-images. The process of producing the predetermined transformation matrix is non-linear, as opposed to linear, as a result of, among other things, the non-negativity constraints that can be considered analogous to rectification which is an inherently non-linear process. Likewise, the production of pseudo-images from first-images using the predetermined transformation matrix is also a non-linear process.

Using the matrix notation adopted above for first-images, the matrix of training images can be represented by a matrix X. In this notation, a predetermined transformation matrix $\Phi$ is a matrix having M rows and K columns obtained by performing a sparse, non-negative factorization of an M row by N column matrix X. In an embodiment, the factorization employs a minimization of at least one Frobenius norm. In the discussion below, an individual pseudo-image produced using the predetermined transformation matrix is represented by a, while a set of pseudo-images arranged as columns in a matrix is represented by A. Using this notation, the relationship of the matrix X of training images used in producing the predetermined transformation matrix $\Phi$ and the set of pseudo-images A for the training images produced during the process of determining $\Phi$ can be written:

$$X = \Phi A,$$

where A has K rows and N columns. Thus, the predetermined transformation matrix can be thought of as performing a transformation from a basis having M dimensions (the number of rows of the X matrix) to a basis having K dimensions (the number of rows of the A matrix).

Although not wishing to be bound by any particular theory of operation, it is believed that the combination of the non-negativity constraints on $\Phi$ and A in combination with the sparseness constraint on A force the inclusion in $\Phi$ of key features of the images of the training set, e.g., eye shape in the case of facial images, thus making $\Phi$ robust in terms of image recognition. The use of Frobenius norms can also contribute to the robustness of the technique. Because such norms are squared norms, they can be considered as related to "energy," which, in turn, can be considered as related to "information content." The key features are the features with the most information content and by using Frobenius norms, $\Phi$ can be forced to capture those features. The non-negativity constraint then prevents dilution of the key features with non-key features, and the sparseness constraint binds key features together in the dictionary elements. The result is that the dictionary elements can have specific receptor fields, i.e., they can capture particular shapes and combinations of shapes in the images of the training set, and by having a sufficient number of dictionary elements, robust image recognition can be achieved.

Suitable values for M (the number of components in the first-images), N (the number of first-images in the training set), and K (the number of element weights for dictionary elements in the pseudo-images) to achieve robustness can be readily determined by skilled workers based on the present disclosure. In general terms, the number (N) of first-images in the training set scales with the number (M) of components in the first-images, i.e., one usually needs a larger training set as the number of components (e.g., number of pixels) in the first-images increases. Also in general terms, N is approximately equal to K and normally is greater than K.

As discussed above, K itself depends on M and/or R with, in certain embodiments, K satisfying one or both of the relationships $K/M \geq 1.0$ and $K/R \geq 1.0$, where, as above, R is the rank of the X matrix. More particularly, as also discussed above, in certain embodiments, one or both of the K/M and K/R ratios are greater than or equal to 2.0, or greater than or equal to 3.0, or greater than or equal to 4.0, or greater than or equal to 5.0. These ratios are particularly important in the case of grayscale images and can be relaxed in the case of binary images if desired. Further, in general, the value of K scales with N, i.e., as N increases, it is generally desirable for K to increase. However, increasing K also increases the demands on computational resources including computational (CPU) times and/or memory requirements. Also, the effectiveness of increases in K can diminish when K becomes too large. Thus, as will be evident to a skilled person, trade-offs in terms of accuracy and computational costs are made when choosing values of K, M and N for any particular application of the image recognition techniques disclosed herein.

As discussed above and more fully below, K is the dimension of a pseudo-image obtained from an M-dimensional first-image using the predetermined transformation matrix and thus to achieve robustness, in an embodiment, the dimension of the pseudo-image will be greater than the dimension of the first-image when the M×N matrix is full rank and N>M, except in the case of binary images where the dimension of the pseudo-image can be smaller than the dimension of the first-image if desired. The M×N matrix will usually not be far from full rank, i.e., R will not be much smaller than M, and thus satisfying K≥M will not be significantly more stringent than satisfying K≥R. While the transformation from M-space to K-space will not formally be an expansion in the number of dimensions used in capturing the information content of the first-image when K is greater than or equal to R but less than M, the transformation will not be a significant compression. The same will be true in the case of binary images where the transformation may somewhat reduce the number of dimensions but usually not to a great extent. As noted above, the M→K decompression strategy of the image recognition techniques disclosed herein goes against the conventional wisdom that image processing is based on data compression, not expansion. Likewise, merely a small compression goes against the conventional wisdom.

(D) Pseudo-Image and Element Weights

A "pseudo-image" is an ordered sequence of K components, each component having a value and a location within the sequence. Thus, if desired, a pseudo-image can be displayed as an image (see, for example, the grayscale pseudo-images of FIGS. 5 and 6). In practice, i.e., for purposes of computer coding, pseudo-images can be treated as vectors.

As discussed above, a pseudo-image is obtained from a first-image by a non-linear transformation of the first-image, specifically, a sparse, non-negative transformation of the first-image performed using the predetermined transformation matrix discussed above. Because the transformation applies a non-negativity constraint, the value of each of the K components of a pseudo-image is zero or a positive number.

Each of the K components functions as an "element weight" for one of the K dictionary elements (K columns) of the predetermined transformation matrix used in constructing the pseudo-image from the first-image. Because the transformation from the first-image to the pseudo-image applies a sparseness constraint on the pseudo-image, normally there are only a few components (element weights) with larger values and many components (element weights) with smaller or zero values (see, for example, FIGS. 6 and 7). In practice, only the components with larger values need be stored and used for the comparison of a pseudo-image-of-interest with pseudo-images of known images. Accordingly, the term "pseudo-image" includes the case where the pseudo-image as stored and/or used comprises all K components and the case where the pseudo-image comprises less than all K components, the smaller components not being explicitly included in the pseudo-image as stored and/or used.

Figure 5:
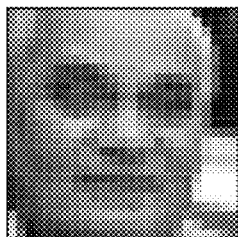
FIG. 5 shows a portion of a library (S=2,000) of pseudo-images of the training set. Five pseudo-images corresponding to each of the first-images shown in FIG. 3 are displayed.
Figure 5:
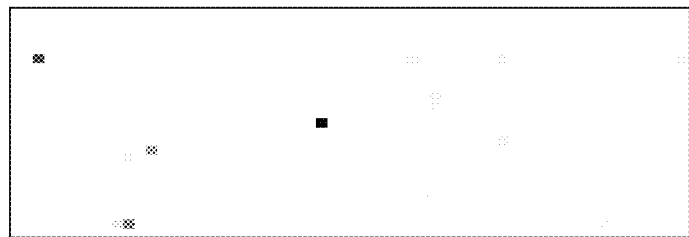
Figure 5:
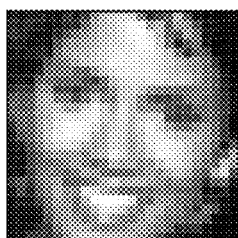
Figure 5:
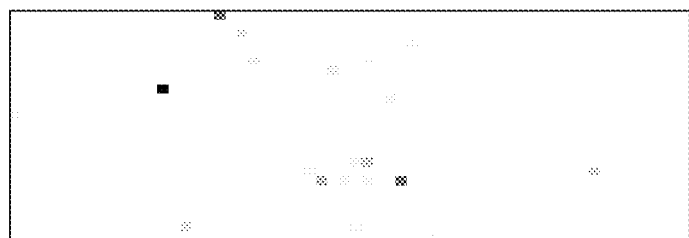
Figure 5:
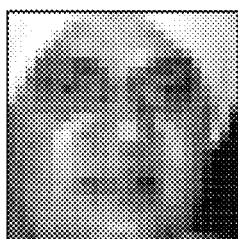
Figure 5:
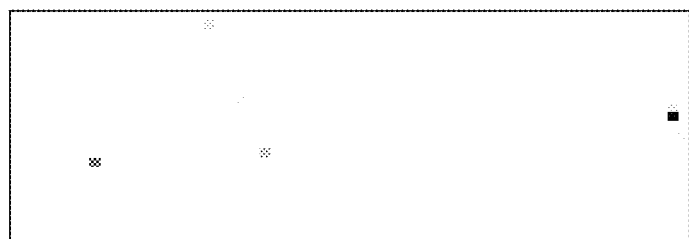
Figure 5:
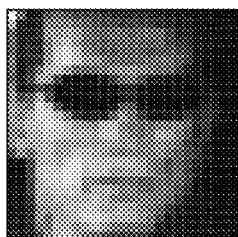
Figure 5:
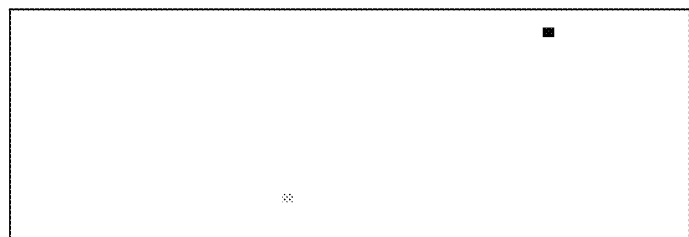
Figure 5:
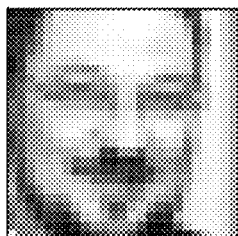
Figure 5:
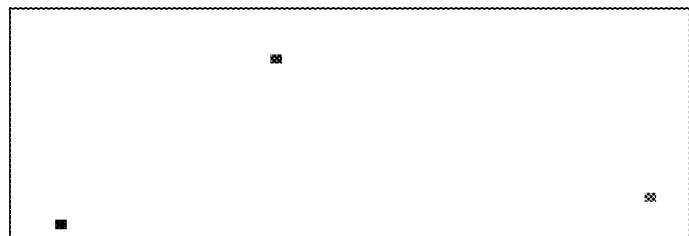
Figure 6:
FIG. 6 shows the pseudo-image-of-interest for the first-image-of-interest of FIG. 2B. It also shows the dictionary elements for the pseudo-image and highlights the dictionary elements with the largest element weights. The pseudo-image-of-interest was obtained using the predetermined transformation matrix some of whose dictionary elements are shown in FIG. 4. All 1500 dictionary elements and their element weights are displayed.
Figure 6:
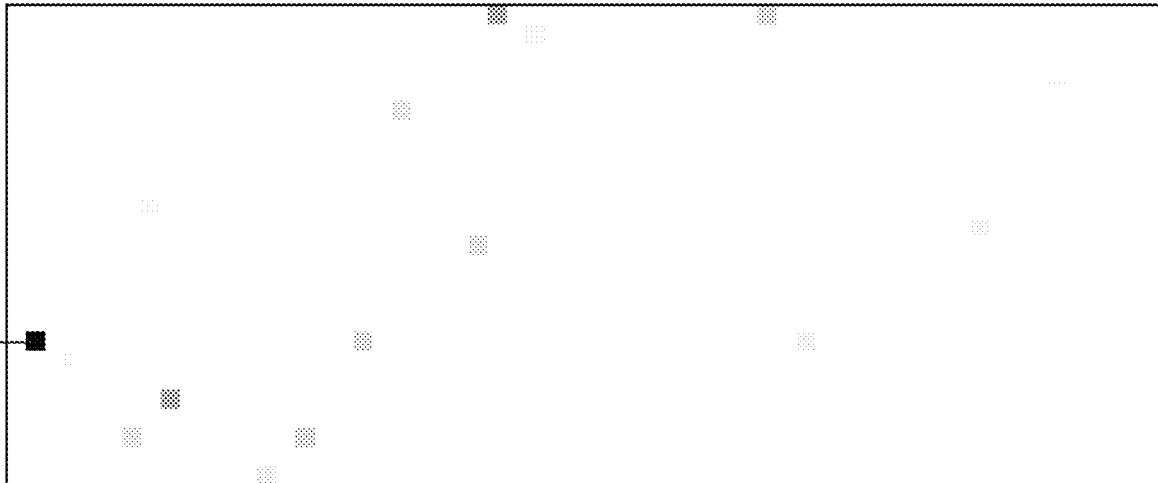
Figure 6:
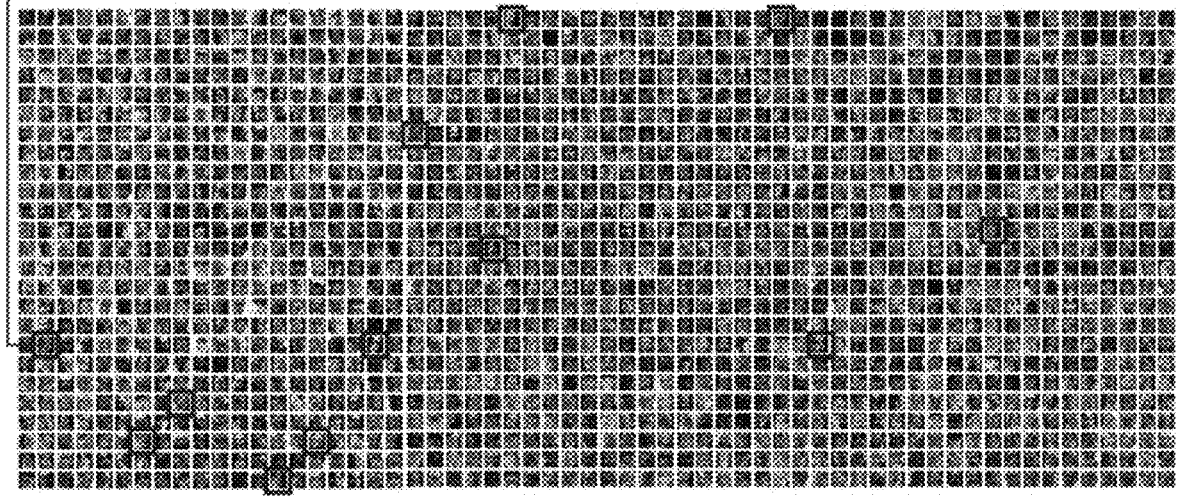

When displayed as a two-dimensional array, humans do not perceive a pseudo-image as showing objects from the real world (see, for example, the grayscale pseudo-images of FIGS. 5 and 6). This is so even in cases where humans could perceive objects from the real world in the first-image prior to the transformation of the first-image into the pseudo-image, i.e., even if the first-image was an original-image or an original-image that had undergone only first-level preprocessing (see, for example, the grayscale first-images of FIGS. 5 and 6). This is an important distinction of the present technique in that the classification and/or identification of images is performed using images that do not contain humanly-perceivable objects. Among other things, this avoids the storage of humanly-perceivable images of specific individuals and thus avoids the privacy issues associated with such storage.

(E) Pseudo-Image Library

A "pseudo-image library" is a set of pseudo-images used for classification and/or identification of a pseudo-image-of-interest (a step(c)-pseudo-image) obtained from a first-image-of-interest (a step(a)-first-image).

(F) Classification and Identification

"Classification" is associating an image with a set having at least two members with one or more common characteristics, e.g., a class or category, while "identification" is associating an image with a set having one member, e.g., an individual.

DETAILED DESCRIPTION AND PREFERRED EMBODIMENTS

FIGS. 1-8 illustrate an embodiment of the image recognition techniques of the present disclosure. In particular, they illustrate an embodiment in which the techniques are applied to the problem of facial recognition. The specific procedures employed in producing the figures are discussed below and in Example 1.

The figures are introduced at this point in the description to provide context for the general discussion that follows. It is to be understood that the use of facial recognition as a vehicle for explaining the technology should not be considered limiting and that the pseudo-image techniques disclosed herein are equally applicable to other image recognition problems such as those involving object recognition, symbol recognition, and the like (see the Industrial Applicability section below for other non-limiting applications of the technology disclosed herein).

The aspects of the disclosed image recognition technique illustrated in FIGS. 1-8 are as follows:

(1) FIG. 1 shows an original-image of a person of interest.

Figure 2A:
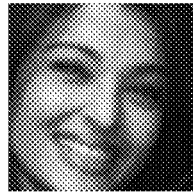
FIG. 2A shows the original-image-of-interest of FIG. 1 after a first round of first-level preprocessing, specifically, cropping.
Figure 2B:
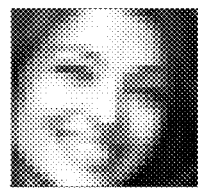
FIG. 2B shows the original-image-of-interest after a second round of first-level preprocessing, specifically, downsampling. The image of this figure was used as a first-image-of-interest; it contained 625 pixels (M=625) in a 25×25 array.

(2) FIGS. 2A and 2B show the original-image of FIG. 1 after two rounds of first-level preprocessing, specifically, FIG. 2A shows the original image after cropping and FIG. 2B shows it after down-sampling. The image of FIG. 2B is the first-image-of-interest (step(a)-first-image) which is subsequently transformed into a pseudo-image, specifically, the step(c)-pseudo-image.

Figure 3:
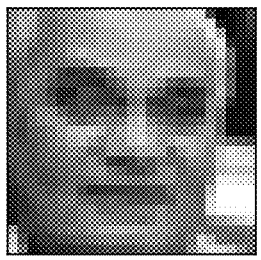
FIG. 3 shows five first-images of a training set of 2,000 first-images (N=2,000). The first-images were obtained using the same first-level preprocessing as that used in obtaining the first-image-of-interest of FIG. 2B.
Figure 3:
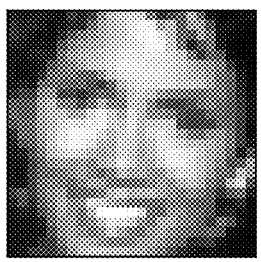
Figure 3:
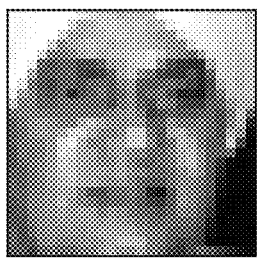
Figure 3:
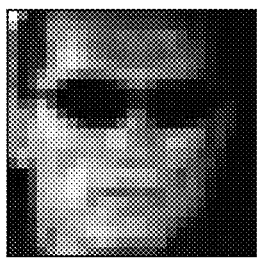
Figure 3:
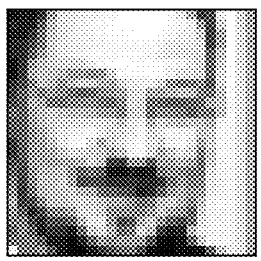

(3) FIG. 3 shows a portion of a training set of first-images obtained using the same two rounds of first-level preprocessing as that used in obtaining the first-image-of-interest of FIG. 2B.

Figure 4:
FIG. 4 shows a portion of the dictionary elements of a predetermined transformation matrix obtained using the full training set from which the portion of FIG. 3 was taken. In this instance, each pseudo-image has 1,500 element weights (K=1,500) for 1,500 dictionary elements, one weight for each dictionary element. Thirty-six of the 1,500 dictionary elements are shown. Each dictionary element has 625 components shown as a 25×25 two-dimensional array in this figure.

(4) FIG. 4 shows a portion of the dictionary elements of a predetermined transformation matrix obtained using the full training set from which the portion of FIG. 3 was taken.

(5) FIG. 5 shows a portion of a library of pseudo-images.

(6) FIG. 6 shows the pseudo-image-of-interest for the first-image-of-interest of FIG. 2B. The pseudo-image-of-interest was obtained using the predetermined transformation matrix some of whose dictionary elements are shown in FIG. 4.

Figure 7:
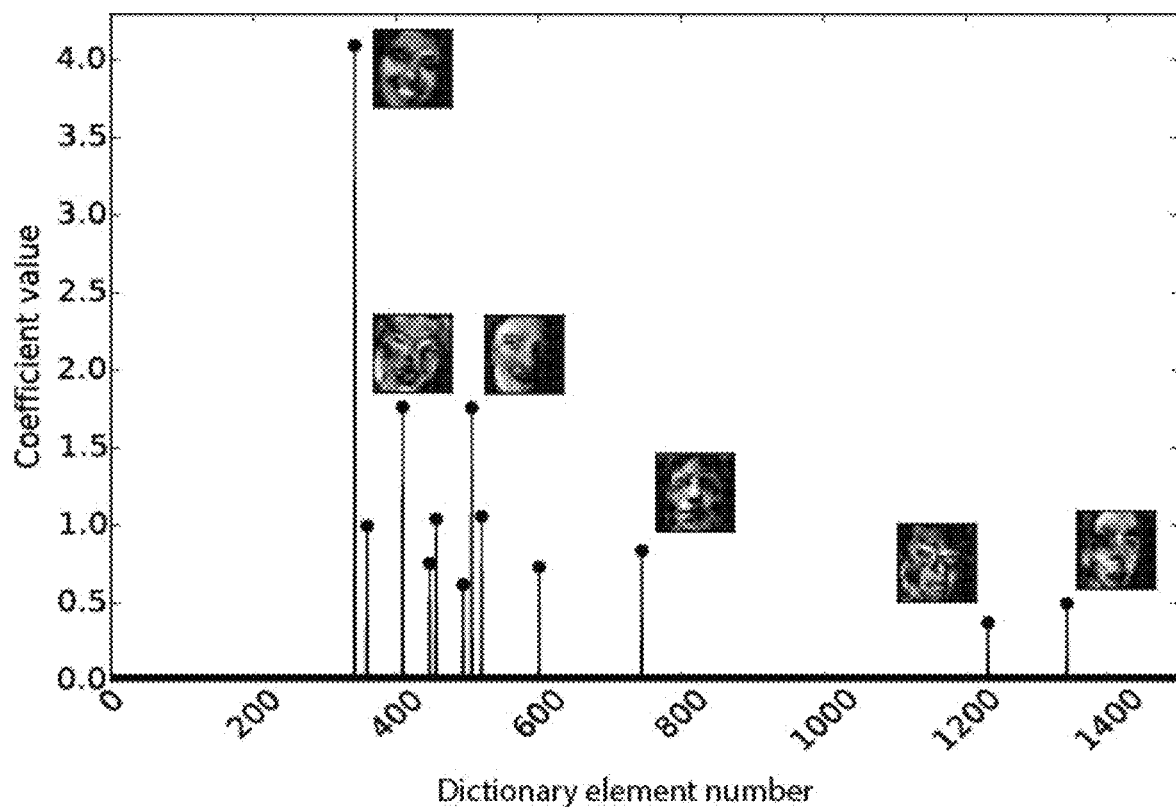
FIG. 7 shows significant element weights (coefficient values) for the pseudo-image-of-interest of FIG. 6. The coefficient value of each element is indicated by the height of the line corresponding to the element.

(7) FIG. 7 shows the dictionary elements with the largest element weights (coefficient values) of the pseudo-image-of-interest of FIG. 6.

Figure 8:
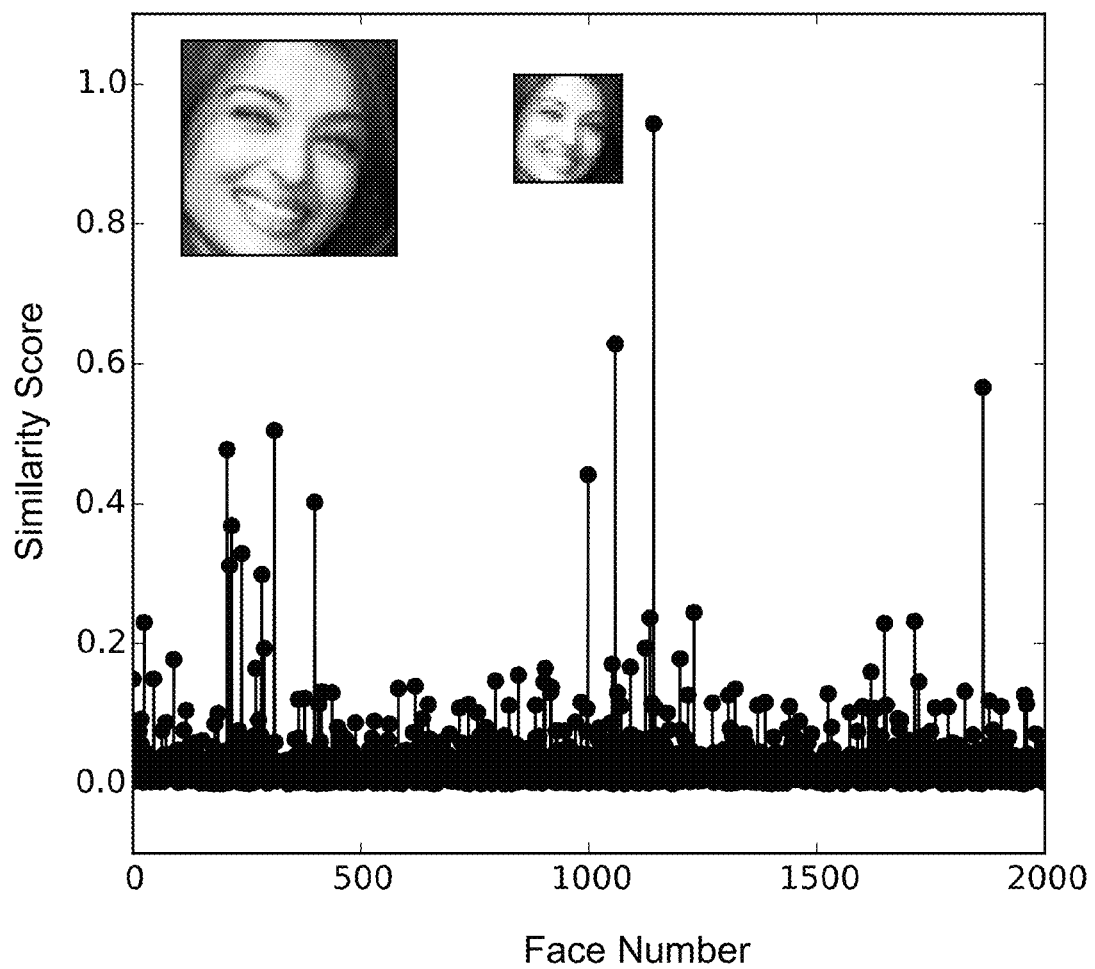
FIG. 8 shows the similarity scores of the pseudo-image-of-interest of FIG. 6 with the pseudo-image library obtained from the 2,000 first-images of the training set. Similarity was measured by cosine distances. The figure is an example of the reporting of the identification of a first-image-of-interest and thus an original-image-of-interest by a comparison of a pseudo-image-of-interest with a pseudo-image library. The first-image of the face within the training set that has the highest similarity score is displayed. It is identical to the first-image-of-interest.
Figure 9:
FIG. 9 shows a portion of the dictionary elements of a predetermined transformation matrix obtained using the full training set from which the portion of FIG. 3 was taken. In this instance, each pseudo-image has 500 element weights (K=500) for 500 dictionary elements. Thirty-six of the 500 dictionary elements are shown.

(8) FIG. 8 shows the reporting of the identification of the first-image-of-interest and thus the original-image by a comparison of the pseudo-image-of-interest of FIG. 6 with the full pseudo-image library from which the portion of FIG. 5 was taken.

As discussed above, the present disclosure employs pseudo-images to perform image recognition. The process begins with an original-image (see, for example, FIG. 1) that is typically subjected to at least some preprocessing (e.g., cropping and down-sampling) to produce a first-image-of-interest (see, for example, FIG. 2B). Alternatively, the original-image can be used directly as the first-image-of-interest without preprocessing. As discussed above in the Terminology and Notation section, the first-image-of-interest is conveniently represented as a vector x.

The first-image-of-interest is transformed into a pseudo-image-of-interest (see, for example, FIGS. 6 and 7) using a predetermined transformation matrix composed of dictionary elements (see, for example, FIG. 4) obtained using a training set of first-images (see, for example, FIG. 3). As discussed above in the Terminology and Notation section, the pseudo-image-of-interest is conveniently represented by a vector $\alpha$, the predetermined transformation matrix by a matrix $\Phi$, the training set of first-images, i.e., the collection of the set of x vectors for the training images, by a matrix X, and the pseudo-images for the training set by a matrix A.

Classification and/or identification of the first-image-of-interest and thus the original-image is then performed by comparing the pseudo-image-of-interest with a library of pseudo-images (see, for example, FIG. 5). The results of the comparison can be reported to a user by, for example, displaying a known image that corresponds to the entry in the library for which a match was found or, in the case of classification, an identifier for a class or category. The results of the comparison can include an indication of the likelihood that the classification and/or identification is accurate, e.g., an indication of the likelihood that the first-image-of-interest corresponds to a class, a category, or an individual. The indication can be a similarity or comparison score (see, for example, FIG. 8).

The predetermined transformation matrix is obtained by a method comprising performing a sparse, non-negative factorization on a matrix of vectorized first-images (the training set). The size of the training set will depend on the classification and/or identification to be performed. For example, in the case of facial recognition, if the classification and/or identification is to be performed on a limited set of individuals, e.g., individuals who are to be permitted access to a particular facility, then a relatively small training set may be sufficient provided enough individuals are included in the set so that the predetermined transformation matrix is able to classify and/or identify the limited set of individuals and distinguish them from individuals not in the limited set. At the other extreme, classification and/or identification of individuals in the general population will, in general, require a large training set so that enough features are embedded in the predetermined transformation matrix to perform the classification and/or identification. A suitable size for the training set can be readily found for any particular application of the image recognition techniques disclosed herein by routine experimentation based on the present disclosure.

In certain embodiments, image recognition on imperfect images is performed with limited and, in some cases, no imperfect images in the training set. Specifically, it has been found that image recognition on imperfect images and, in particular, facial recognition on imperfect facial images can be performed without the need to purposely include large numbers of imperfect images in the training set. Imperfect images can be included in the training set if desired and, in some cases, a limited number of imperfect images in the training set may be useful. For example, inclusion in the training set of imperfect images where the imperfection is, for example, pose and/or facial expression can make the predetermined transformation matrix more robust in terms of classification and/or identification in some cases.

Unlike prior image recognition techniques and, in particular, prior facial recognition techniques, large numbers of imperfect images are not a requirement for successful image recognition. The lack of such a requirement permits the use of smaller training sets than would otherwise be needed. Such smaller training sets, in turn, improve the speed and/or storage requirements of the process used to generate the predetermined transformation matrix. These higher speed and/or smaller storage considerations also apply to pseudo-image libraries whether the library is based on the training set, the training set plus additional pseudo-images, or a set of pseudo-images that excludes the training set (see below). Likewise, the higher speed and/or smaller storage considerations apply to comparisons of a pseudo-image-of-interest with one or more pseudo-image libraries.

As discussed above, in some embodiments, the first-image-of-interest is an original-image that has been subjected to preprocessing, where the preprocessing can be first-level preprocessing, second-level preprocessing, or a combination of first-level and second-level preprocessing. When preprocessing is to be used, the same preprocessing is preferably performed on the training set prior to its use in producing the predetermined transformation matrix. While such preprocessing commonality is preferred because it can provide improved image recognition, it is not a requirement for successful image recognition. This lack of a requirement of common preprocessing between the first-images of the training set and the first-image-of-interest can be beneficial in many situations. Specifically, it provides flexibility to the overall process by permitting a given training set to be used with first-images-of-interest that have been subjected to varying degrees of preprocessing.

The pseudo-image-of-interest for the first-image-of-interest is obtained using the predetermined transformation matrix to perform a sparse, non-negative transformation of the first-image-of-interest. The factorization that generates the predetermined transformation matrix also generates pseudo-images for the members of the training set. In certain embodiments, classification and/or identification of the original-image can be performed by comparing the pseudo-image-of-interest with the pseudo-images for the members of the training set. In such a case, the pseudo-images for the members of the training set functions as a pseudo-image library for performing classification and/or identification.

The pseudo-image-of-interest can also be used for purposes other than classification and/or identification. For example, if the first-image-of-interest is for a person, object, symbol, or the like whose category, class, or identity is known but who is not already part of a pseudo-image library, then the pseudo-image-of-interest can be used to augment one or more libraries, i.e., the pseudo-image-of-interest can be added to one or more libraries. The thus expanded library or libraries can then be used in the future for classification and/or identification of first-images-of-interest and thus original-images. In this way, pseudo-image libraries can become more valuable over time for the classification and/or identification of images.

In some embodiments, multiple pseudo-image libraries can be used in the classification and/or identification process, including libraries of different sizes. The classification and/or identification process can compare the pseudo-image-of-interest with all of the libraries or with a subset of libraries. For example, the comparison process can proceed through the libraries in a selected order, e.g., from the smallest library to the largest library, until a match having a sufficient level of confidence is found whereupon the comparison process can be ended.

In some embodiments, the pseudo-image library need not include pseudo-images for the members of the training set, i.e., the library can exclude some or all of the members of the training set. For example, in connection with facial recognition, this can be the case where the training set provides sufficient variability in facial features so as to produce a predetermined transformation matrix capable of extracting facial features from a variety of individuals irrespective of whether those individuals are in the training set.

In such embodiments, whether for facial recognition or other types of image recognition, the training set can be thought of as seeding the predetermined transformation matrix with the ability to produce pseudo-images-of-interest containing sufficient information to perform classification and/or identification. Once the predetermined transformation matrix is well-seeded, the training set can be viewed as having served its purpose and thus no longer being needed for the comparison step. As a specific example in the field of criminal law, a training set could be composed of individuals who do not have criminal records and the pseudo-image library could include only individuals with criminal records.

The foregoing are just a few non-limiting examples of the wide variety of pseudo-image libraries that can be used in the practice of the image recognition techniques disclosed herein. In general terms, the pseudo-image library or libraries used in the comparison step will be adjusted to meet the needs of particular image recognition situations. Adjustments of the library or libraries can also take place over time as needs change. Thus, pseudo-images can be added or subtracted, and libraries can be combined with one another or subdivided into parts based on initial or subsequent needs. Among the parameters that can be considered in selecting a library or set of libraries for any particular application are accuracy (level of confidence) of image recognition achieved with the library or libraries, comprehensiveness of the library or libraries, process speed, and memory requirements. As is typical, trade-offs will often be needed between these competing considerations.

Comparison of a pseudo-image-of-interest with one or more pseudo-image libraries can be performed in a variety of ways. For example, Euclidean distances can be calculated between a pseudo-image-of-interest and the pseudo-images of a library, with smaller distances being indicative of correspondence between the pseudo-image-of-interest and particular pseudo-images of the library. As another example, cosine similarity values (scores) can be calculated, i.e., $\cos(\theta)$ values can be calculated, where $\theta$ is the angle between the pseudo-image-of-interest and a particular pseudo-image of the library, both treated as vectors. When the pseudo-image-of-interest is aligned or nearly aligned with a particular pseudo-image of the library, $\theta$ equals zero or nearly zero, so that the cosine similarity value is 1.0 or close to 1.0, thus indicating a correspondence between the pseudo-image-of-interest and the particular pseudo-image of the library.

Whatever measure or measures are used, because the pseudo-images of the library are for known images, the result of the comparison can, for example, be used to determine whether the first-image corresponding to the pseudo-image-of-interest is one or more of:
 (i) in one or more classes or categories of the known images,
 (ii) a particular known image,
 (iii) not in one or more classes or categories of the known images, and
 (iv) not a known image.

The results of the comparison can be employed in various ways. One basic use is to provide a user with a visual, oral, or other type of notification that a "match" has or has not been found. The notification will typically be accompanied by a report which may be as simple as the name of the known image or may include other data including an indication of the level of confidence of the identification. The report can be in visual, oral, or other form. In the case of machine vision, the result of the comparison may be a set of instructions for execution by, for example, a robot, e.g., instructions to interact with the identified object in a particular way. Other ways in which the result of the comparison can be used will be evident to persons skilled in the art from the present disclosure.

Various algorithms can be used to obtain a predetermined transformation matrix $\Phi$ by factorization of a matrix X of training images. Similarly, various algorithms can be used to transform a first-image-of-interest x into a first-pseudo-image-of-interest a. The following are non-limiting examples of suitable algorithms that can be used.

Algorithms for Generating a Predetermined Transformation Matrix Using a Training Image Set A key to the robustness in pattern recognition of the disclosed method is the predetermined transformation matrix. As discussed above, the predetermined transformation matrix is obtained from a set of first-images that are used as a training set. The process of generating the predetermined transformation matrix comprises the factorization of a matrix containing the training set of first-images into two separate matrices. The factorization of a matrix into two separate matrices is an approach generally characterized as blind source separation (BSS), which historically was developed to identify or approximate independent sources of signals. General discussions of BSS can be found in Comon and Jutten 2010 and Yu, Hu et al. 2014. The methods disclosed herein employ linear algebra, including operations on matrices and (column) vectors and solutions to systems of linear equations, general discussions of which can be found in Gill, Murray et al. 1991 and Strang 2006. The methods also employ optimization techniques, general discussions of which can be found in the literature (Gill, Murray et al. 1991, Dantzig and Thapa 1997, Chen, Donoho et al. 2001, Boyd and Vandenberghe 2004, Candes and Tao 2005, Donoho 2006, Comon and Jutten 2010, Donoho, Tsaig et al. 2012, Yu, Hu et al. 2014).

In general terms, the generation of the predetermined transformation matrix can be achieved through a two-step process. First, each image in the training set that is not already digitized is digitized and as needed preprocessed into a first-image of dimension $m_1 \times m_2$, e.g., 25×25=625. As discussed above, the preprocessing is preferably the same as will be performed on original-images which are to undergo image recognition. The first-image is further represented as an M-dimensional vector (M=$m_1 \cdot m_2$) so that each first-image can form a column vector of the training set matrix X. For a training set consisting of N first-images (e.g., N faces), the training set matrix X is, therefore, an M×N dimension matrix.

In the second step, the matrix X is factorized into two matrices A and $\Phi$. Here, $\Phi$ is the predetermined transformation matrix. The dimension of $\Phi$ is M×K. A is a K×N matrix, which represents the N first-images in K dimensions. Each column of A is the transformation of the corresponding first-image of the training set into its pseudo-image, the dimension of the pseudo-image being K.

Using the training set of first-images, the predetermined transformation matrix is generated in such a way that the pseudo-images corresponding to the first-images of the training set are sparse. Note that the pseudo-image is not unique but depends on the images making up the training set, as well as the initialization step of A and $\Phi$, as in Algorithm 1 below. However, once $\Phi$ has been determined, the pseudo-image generated using $\Phi$ (e.g., the pseudo-image generated using Algorithm 2 below) is only dependent on $\Phi$ and is independent of the initialization used in the pseudo-image generation process, e.g., as discussed below in connection with Algorithm 2, the initialization used in the pseudo-image generation process can be, for example, random.

In the method disclosed herein, two restrictions are imposed on the BSS problem. First, all elements in $\Phi$ and A are required to be non-negative. Second, A is required to be sparse. These constraints are important in obtaining the predetermined transformation matrix that is used to generate pseudo-images. In particular, these constraints are important for robust image recognition. The sparsity constraint results in grouping of distinguishing morphological features of first-images into dictionary elements, such that first-images with different morphologies do not share the same significant coefficients. The non-negativity constraint enforces the grouping together of features that occur together in the training set. This is achieved by preventing the use of negative coefficients which can cause features to be subtracted out of complex feature combinations. The non-negativity constraint thus prevents the dictionary elements from becoming overly complicated, i.e., it prevents complex feature combinations that do not co-occur in the actual images from remaining in the analysis as could occur if negative coefficients were permitted. A consequence of these two constraints is that features that are likely to occur together in first-images get extracted into a few dictionary elements, which bind the co-occurring and therefore defining feature combinations in the first-images, into distinct dictionary elements. This arrangement thus maximizes the distinction between dictionary elements for these features and dictionary elements for other features that likewise tend to occur together in first-images.

In other words, these two constraints are highly effective in classifying (aggregating) source features based on statistical relations between them. For example, a particular contour of a nose can end up being in one dictionary element with certain cheek features, while the shape of an ear plus eyebrow features are in another, based on the faces used in the training set. If, for example, all of the faces in the training set happened to have substantially identical say, ears, then the sparsity constraint would tend to drive ears to be bundled with other features captured in the dictionary elements because "ears" would have little informational content in distinguishing the faces in this particular training set. Accordingly, when selecting a training set it can be of value to have sufficient variety for a wide range of features so that informative features do not get excluded from the dictionary elements by the sparsity constraint applied to A. Note that while sparsity is effective in driving the formation of independent dictionary elements, maximal independence is not guaranteed.

In the factorization of the training set matrix X, the goal is to produce matrices A and that minimize the error between the two sides of the equation:

$$X = \Phi A$$

while requiring that all elements in and A are non-negative (i.e., $\Phi \geq 0$ and $A \geq 0$) and A is sparse. Sparseness can be measured in different forms. The most common measures are the $L_1$ and $L_0$ norms. When an $L_1$ measure of sparseness is used, then the sum of the absolute values of the components of the pseudo-image will be minimized, whereas if an $L_0$ measure of sparseness is used, then the pseudo-images will have a minimized number of elements, i.e., a minimized number of positive elements because of the non-negativity constraint. When sparseness is defined by its $L_1$ norm, the minimization problem takes the form of:

$$\underset{A,\Phi}{argmin} \frac{1}{2} \|X - \Phi A\|_2^2 + \lambda \|A\|_1, \text{ subject to } A \geq 0; \Phi \geq 0$$

Here, $\|\cdot\|_p$ denotes a $L_p$ norm, i.e. the p-th root of the sum of p-th powers of absolute values (p>0). In this notation, $\|\cdot\|_1$ denotes the $L_1$ norm of a vector $\alpha$ or a matrix A, i.e., the sum of the absolute values of all coefficient values in $\alpha$ or A. Thus, the process to solve this problem requires the minimization of the Frobenius norm difference (i.e., the Euclidean distance) between the two sides of the equation and the minimization of the $L_1$ norm.

For the $L_0$ norm, which is the number of non-zero elements, the minimization problem takes for the form of:

$$\underset{A,\Phi}{argmin} \frac{1}{2} \|X - \Phi A\|_2^2 + \lambda \|A\|_0, \text{ subject to } A \geq 0; \Phi \geq 0$$

Note that the $L_0$ norm is not a classical norm definition. Also, the $L_0$ norm is not generally used in practice since $L_0$ minimization is an NP hard problem. Using the $L_1$ norm not only provides a measure of sparsity on its own, but also provides the closest convex surrogate to the $L_0$ norm, when solving the minimization problem. It is also possible to define sparseness using an $L_p$ norm where p is greater than zero and less than one, and usually small (e.g., $p=10^{-5}$). In addition to $L_0$, $L_1$, and $L_p$<p<1), the sparseness measure can take other forms, such as, the one defined by Hoyer (Hoyer 2004) or the one referred to as the Gini Index (Hurley and Rickard 2009). Note that in the above expressions, A is a parameter used to tune the strictness of the sparseness constraint. In practice, the value of A can be selected by the algorithm as the process proceeds. A representative, but not limiting, example of a suitable algorithm for selecting A as a function of iteration number is set forth below.

In practice, the process to perform sparse, non-negative BSS is a convex optimization problem. A general outline of a suitable algorithm is set forth below in Algorithm 1, which first initializes $\Phi$ and A to be non-negative random matrices to seed the computation, and then iterates the computation process to satisfy the constraints imposed until convergence (defined for this particular algorithm by a lack of net movement of the function's gradient) is achieved. In the examples, specifically, in the generation of the $\Phi$ matrices used in the examples, the non-negative blind source separation algorithm nGMCA (Rapin, Bobin et al. 2013, Rapin, Bobin et al. 2013) was used. This BSS algorithm is a specific example of Algorithm 1. Sparsity was measured using the $L_1$ norm. At each iteration i, the value of A for the last iteration ($A_{i-1}$) was used as the inital value for determining ($A_i$), and likewise, the value of $\Phi$ for the last iteration ($\Phi_{i-1}$) was used as the initial value for determining ($\Phi_i$).

---

Algorithm 1:

Initialize $\Phi_0$ and $A_0$ with non-negative random numbers; initialize I;
For i = 1, I
  Normalize the columns of $\Phi_{i-1}$ to unit length;

$$A_i \leftarrow \underset{A}{argmin} \frac{1}{2} \|X - \Phi_{i-1} A\|_2^2 + \lambda_i \|A\|_1, A \geq 0$$

$$\Phi_i \leftarrow \underset{\Phi}{argmin} \frac{1}{2} \|X - \Phi A_i\|_2^2, \Phi \geq 0$$

End For Loop when gradient descent stops or if i > I
Output $\Phi_i$ and $A_i$

---

The value of lambda in this algorithm varies with the iteration number i. Typically, lambda begins with a large value to force a high level of sparsity at the beginning of the process and then decreases with higher iterations, the final value typically being less than or equal to 1.0 For example, lambda can be calculated from formulas of the following type, it being understood that other formulas can be used if desired:

$$\lambda_1 = \|\Phi_0^T (\Phi_0 A_0 - X)\|_\infty$$

$$\lambda_{i+1} = \lambda_i - \theta(\lambda_i - \sigma_{res})$$

$$\theta = \frac{1}{(0.8 * I - i)}$$

In this formula, i is the iteration number and $\sigma_{res}$ is the standard deviation of the elements of $X-\Phi_i A_i$ where the elements are treated as a set of numbers.

With regard to initializing I, i.e., the maximum number of iterations, in the examples set forth below, I was set at 500. Skilled persons can determine a suitable value for I for any particular application of Algorithm 1 or other algorithms that may be used to obtain $\Phi$ by performing preliminary calculations using the training set of images. In the examples, when I was reached or the gradient descent stopped, the $L_2$ differences between the columns of X and the columns of $\Phi A$ were calculated as an error measure and the median of those differences was used as an error threshold ($\epsilon$) in Algorithm 2 below.

Algorithms for Generating a Pseudo-Image from a First-Image

The process of generating a pseudo-image for a first-image is a process of minimization based on the predetermined transformation matrix $\Phi$. It is formulated as the solution to the following problem $x=\Phi\alpha$ with the vector x being an M-dimensional vector representing the first-image and the vector $\alpha$ being a K-dimensional vector constituting the pseudo-image for the first-image. The goal is to find the sparsest K-dimensional vector $\alpha$ while maintaining a minimum error between the two sides of the $x=\Phi\alpha$ equation.

As discussed in, for example, the above linear algebra textbooks (Gill, Murray et al. 1991, Strang 2006), a necessary, but not sufficient, condition for a unique solution to this problem is that $M \geq K$. If $M>K$, there is either a unique solution or no solution; a unique solution exists if $M=K$ and $\Phi$ is full rank; no unique solution exists if $M=K$ and $\Phi$ is not full rank; no unique solution exists if $M<K$.

When K (the number of element weights in the pseudo-image for the first-image) is chosen to be larger than M (the number of components in the first-image), the system is underdetermined and does not have a unique solution using classical linear algebra methods. Nevertheless, because of the sparseness and non-negativity constraints, surprisingly, the system achieves effective image recognition.

In the disclosed method, a key property of the pseudo-images produced during the production of the predetermined transformation matrix is that they are sparse, meaning that in a given pseudo-image for a first-image of the training set, only a small fraction of the elements (e.g., less than or equal to 20%, or less than or equal to 10%, or less than or equal to 5%, or less than or equal to 1%) is active (i.e., substantially greater than zero, e.g., greater than or equal to 1% or greater than or equal to 5% or greater than 10% of the largest element weight). With this property, theories developed independently by Donoho (Chen, Donoho et al. 2001, Donoho and Elad 2003, Donoho 2006, Donoho, Tsaig et al. 2012), and by Candes and Tao (Candes and Tao 2005, Candès, Romberg et al. 2006, Candes, Romberg et al. 2006) show that a unique solution can be obtained by imposing a sparseness constraint when solving the minimization problem. Whereas the sparsity measure can take different forms, as discussed above, the most commonly used sparsity definitions are $L_0$ and $L_1$.

An example of the process using $L_1$ minimization (Donoho 2006) is to solve:

$$\min_a \|a\|_1 \text{ subject to } \|x - \Phi a\|_2 \leq \epsilon$$

where $\epsilon$ is an error measure of the difference between x and $\Phi\alpha$.

The $L_1$-minimization problem can be implemented by a convex optimization procedure, for example based on the simplex method. These techniques can be found in various books and research publications (Gill, Murray et al. 1991, Dantzig and Thapa 1997, Chen, Donoho et al. 2001, Boyd and Vandenberghe 2004, Candes and Tao 2005, Donoho 2006, Donoho, Tsaig et al. 2012).

Notably, the methods disclosed here have a non-negative constraint, which requires all coefficients (element weights) of the vector $\alpha$ to be non-negative. Thus, the problem is properly written as:

$$\min_a \|a\|_1 \text{ subject to } x = \Phi a, a \geq 0$$

where the terminology $\alpha \geq 0$ means that all components of a are zero or positive.

A representative non-limiting example of an algorithm that can be used to obtain a pseudo-image represented by the vector $\alpha$ using the predetermined transformation matrix $\Phi$ is the "$l_1$ MAGIC" technique of Candes and Romberg, 2005. In the examples below, Candes' and Romberg's Min-$l_1$ approach with quadratic constraints was used with the modifications that the matrices were not required to be positive definite when obtaining inverses and the coefficient values of the vector $\alpha$ were required to be positive, which was achieved by setting negative coefficients to zero at the end of the algorithm. The E value from Algorithm 1 was used as the error measure.

The structure of the algorithm used in the examples was:

Algorithm 2:

set $a_0 = \Phi^T (\Phi\Phi^T)^{-1} x$
Initialize $\tau_1, \mu, \eta$ and I
m = length (a)
converge = 0

$$I = \left\lceil \frac{\log m - \log \eta - \log \tau_1}{\log \mu} \right\rceil$$

For i = 1: I
  if converge = 1,
    break;
  else $$a_i \leftarrow \min_a \|a_{i-1}\|_1 \text{ subject to } \|\Phi a_{i-1} - x\|_2 \leq \epsilon$$

if$\left(\frac{m}{\tau_i} < \eta\right)$ converge = 1
    else
      $a_{i-1} = a_i$
    End if else
  End if else
  $\tau_{i+1} = \mu \tau_i$
End for
Set all negative components to zero and output $a_i$ The values of the $\tau_1$, $\mu$, $\eta$ parameters used in the examples were as follows:

$$\tau_1 = \max\left(\frac{2m+1}{\|a_0\|_1}, 1\right)$$

$$\mu = 10$$

$$\eta = 0.001$$

The goal of the algorithm is to minimize the sparsity of a vector $\alpha$ that satisfies the constraint $\|x-\Phi\alpha\|_2 \leq \epsilon$. This is an optimization problem which dictates that we remain in the constrained region while solving the problem. This means that $\alpha_i$ needs to satisfy $\|x-\Phi\alpha_i\|_2 \leq \epsilon$ or $\epsilon^2 - \|x-\Phi\alpha_i\|_2^2 \geq 0$. However, it should be noted that because the goal is sparsity, merely satisfying $\|x-\Phi\alpha_i\|_2 \leq \epsilon$ is not indicative of having arrived at a $\alpha_i$ with optimized sparsity. Rather, the end of optimization is reached when a parameter referred to as the duality gap $$\left(\frac{m}{\tau_i}\right)$$

is less than a predetermined value (0.001 in the examples below). However, a direct comparison to the duality gap is not made in the algorithm. Instead a number of iterations (I) that serves as a convergence guarantee is calculated using the duality gap parameter, and the algorithm is then run for those many iterations.

A cost function $f$ can be used to move $\alpha_i$ towards the desired solution. An example of a suitable cost function is the following function, which was used in the examples:

$$\text{def}: f(a_i) = \|a_i\|_1 + \frac{1}{\tau_i}(-\log(\epsilon^2 - \|x - \Phi a_i\|_2^2))$$

To minimize this cost function and thus find the desired vector $\alpha$ which satisfies $\|x-\Phi\alpha\|_2 \leq \epsilon$ and is sparse, the following steps can be used:

(1) calculate the number of steps required to minimize the cost function using the duality gap parameter;
(2) choose a starting point $\alpha_0$ that is feasible, i.e., a starting point that satisfies the $\|x-\Phi\alpha\|_2 \leq \epsilon$ constraint (note that although not used in the examples, if desired, $\alpha_0$ can be a random starting point in the feasible region);
(3) to reach the minimum of the cost function from the starting point one needs to move in a direction where the value of the function is less than the value at the starting point; to find that direction, the cost function at the starting point is approximated with a parabola (second order approximation);
(4) the minimum of the parabola is then found analytically and $\alpha_0$ is maximally moved in that direction while staying in the feasible region;
(5) when doing step (4), the decrease in the cost function is checked to determine if it is within a preselected percentage, e.g., 1.0 percent in the examples, of the decrease predicted by a linear model of the cost function at the starting point;
(6) if the decrease is not within the preselected percentage, the step size is decreased until the decrease in the cost function comes within the preselected percentage range;
(7) the new point resulting from step (4) is then used as the starting point, and steps (3) to (6) are repeated until the slope of the cost function is below a preselected level, e.g., 0.001 in the examples;
(8) once the slope is below the preselected level, the value of x is changed, e.g., multiplied by 10, and steps (3) to (7) are repeated.

It should be noted that it may take more than one step to reach the minimum of the parabola. In the examples, a maximum of 50 steps was used, i.e., either the minimum of the parabola was reached prior to 50 steps, or the point reached at 50 steps was taken as the minimum.

The above structure for Algorithm 2 used a "for loop"; the following structure uses a "while loop" with the values of the $\tau_1$, $\mu$, $\eta$ parameters being the same as above. Numerous other approaches for programming the above procedure for obtaining $\alpha$, as well as other procedures for finding sparse, non-negative vectors that satisfy the $x=\Phi\alpha$ equation, will be evident to skilled persons from the present disclosure.

---

Input: $a_0$ such that $\|\Phi a_0 - x\|_2 \leq \epsilon$, parameters $\tau_1$, $\mu$, and $\eta$
m = length ($a_0$)
i = 1
converge = 0

$$I = \left\lceil \frac{\log m - \log \eta - \log \tau_1}{\log \mu} \right\rceil$$

while converge $\neq$ 1

$\quad a_i \leftarrow \min_a \|a_{i-1}\|_1$ subject to $\|\Phi a_{i-1} - x\|_2 \leq \epsilon$ $\quad \text{if}\left(\frac{m}{\tau_i} < \eta \text{ or } i > I\right)$ $\quad\quad$ converge = 1
$\quad$ else
$\quad\quad \tau_{i+1} = \mu \tau_i$
$\quad\quad a_{i-1} = a_i$
$\quad\quad i = i + 1$
$\quad$ End if else
End while
Set all negative components to zero and output $a_i$

---

In the typical case, the first-image is a grayscale image whose pixels have numerous values. In some cases, the first-image can be a binary image whose pixels can only have one of two possible values (e.g., on or off). In this case, K can be selected to be less than M so that, as discussed in the above linear algebra textbooks (Gill, Murray et al. 1991, Strang 2006), a unique solution exists. When applied to a binary image having K less than M, the above techniques find that unique solution. However, although sparseness is applied, the unique solution turns out to be not particularly sparse. First-images of symbols typically fall within this category where unique solutions are possible.

It should be noted that the disclosed methods are different from those used in compressed sensing and sparse signal recovery (Donoho 2006, Elad 2010, Eldar and Kutyniok 2012) because in these methods, the goal was to reconstruct or approximate the original signal fiducially. In the disclosed method, the created pseudo-image bears no resemblance to the original-image and is created in different dimensions. Using a sparse, non-negative transformation, pseudo-images generated from variations of the first-image, as well as corrupted or occluded first-images, can be nearly identical to the pseudo-image of the unadulterated first-image, as shown in the examples.

Figure 42:
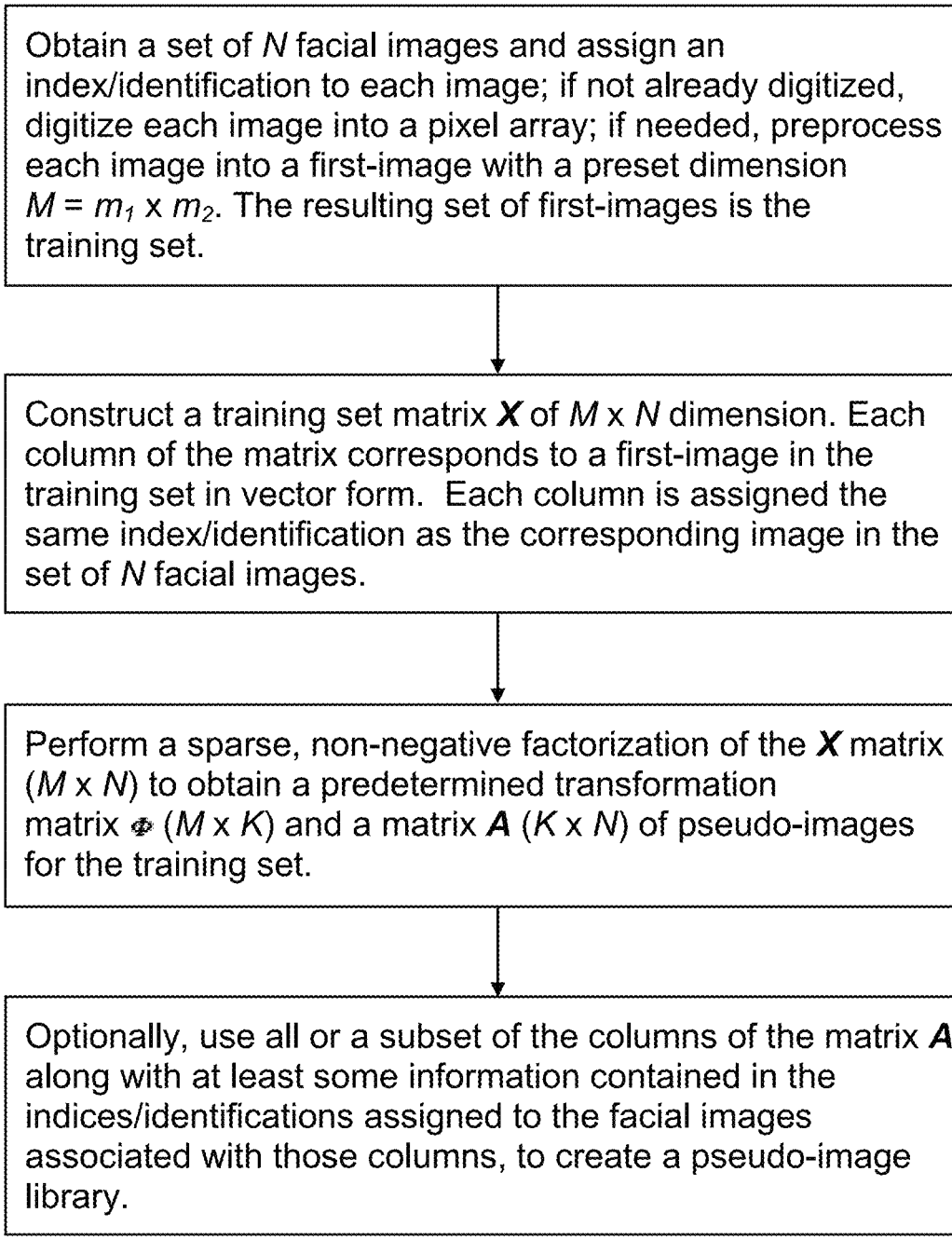
FIG. 42 is a flowchart illustrating an exemplary embodiment of the present disclosure which produces a predetermined transformation matrix and a set of pseudo-images for a training set.
Figure 43:
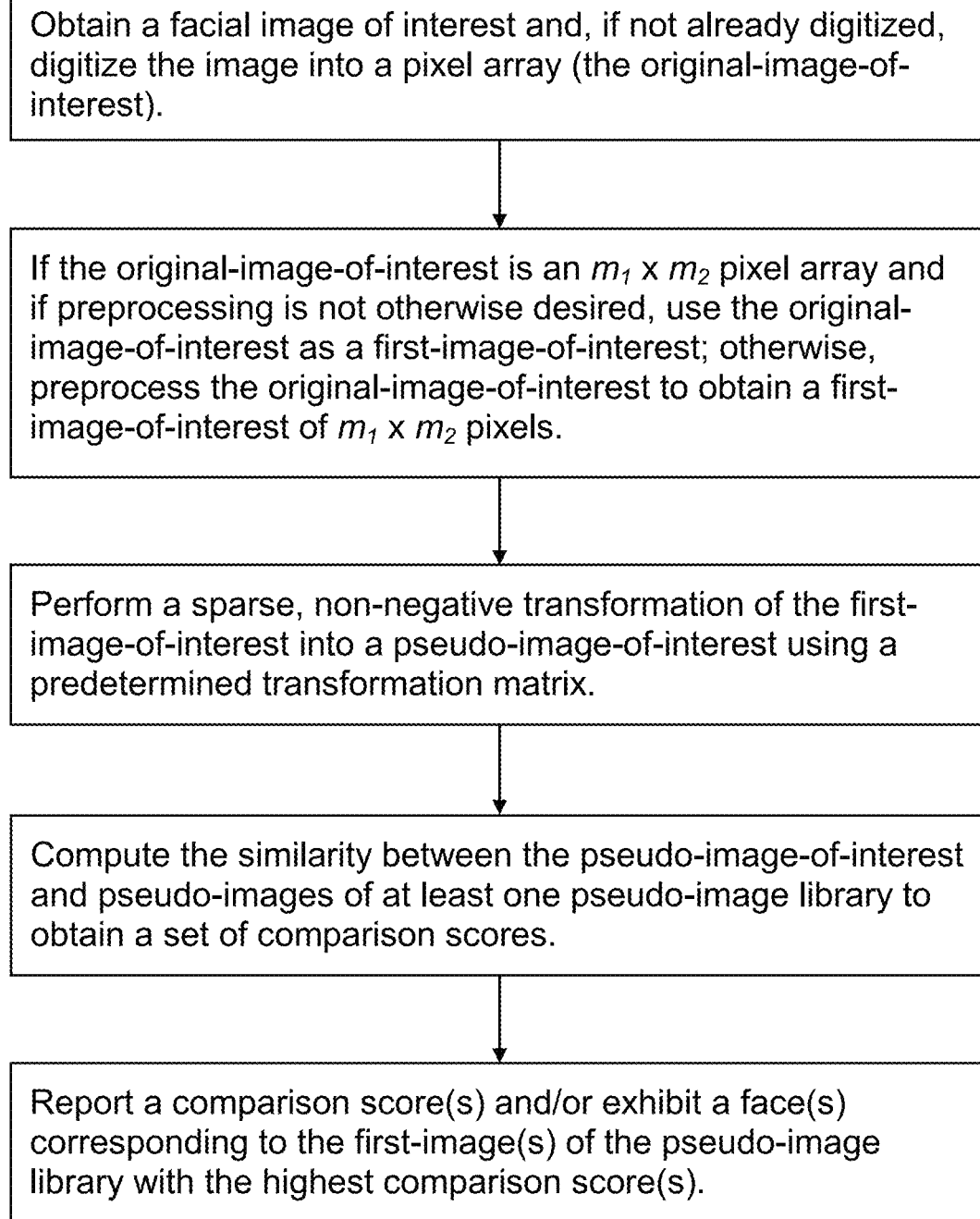
FIG. 43 is a flowchart illustrating an exemplary embodiment of the present disclosure which produces a pseudo-image-of-interest from a first-image-of-interest and compares the pseudo-image-of-interest with a pseudo-image library.
Figure 44:
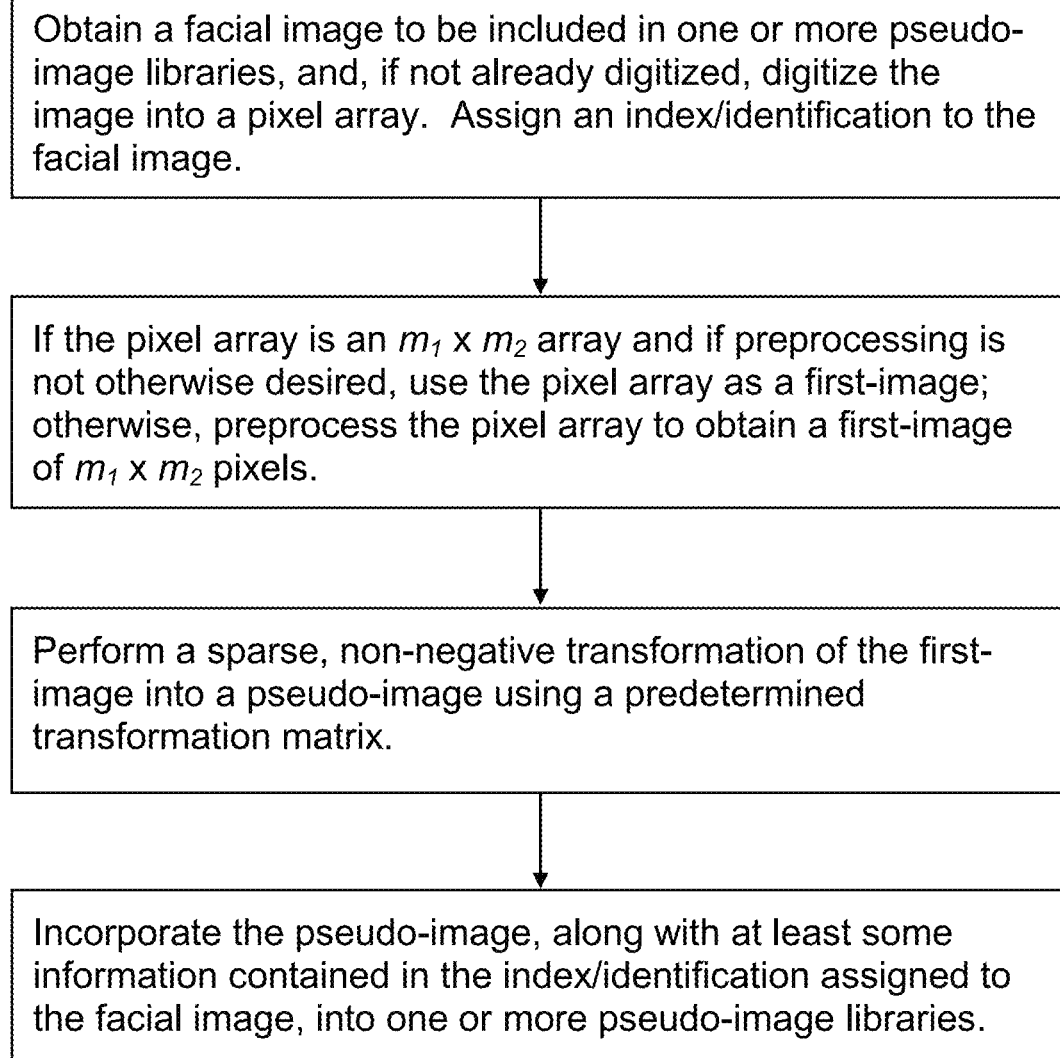
FIG. 44 is a flowchart illustrating an exemplary embodiment of the present disclosure which produces a pseudo-image from a known image and incorporates the pseudo-image in one or more pseudo-image libraries.

FIGS. 42-44 set forth representative flowcharts that can be used in the practice of the present disclosure. These flowcharts as well as those of FIGS. 45-46 discussed below are, of course, merely provided for purposes of illustrating embodiments of the disclosure and are not intended to limit the scope of the invention as defined by the claims in any manner.

FIG. 42 sets forth a flowchart that can be used in constructing a predetermined transformation matrix for use in transforming first-images into pseudo-images. The flowchart includes the steps of: (1) obtaining a set of facial images and, if needed, preprocessing the facial images into first-images of a specified dimension $M=m_1 \times m_2$, (2) organizing the first-images into an X matrix, and (3) performing a sparse, non-negative factorization of the X matrix to obtain the predetermined transformation matrix Φ and a matrix A of pseudo-images for the training set. Thereafter, if desired, the columns of A can be organized as a pseudo-image library. Also, if desired, statistical analyses, such as, PCA, hierarchal clustering, and/or analyses with support vector machines, can be performed on the matrix A in order to classify the pseudo-images. As just one example, using techniques of this type, human faces can be classified as male or female faces.

FIG. 43 sets forth a flowchart that can be used in performing image recognition, specifically, facial recognition. The flowchart includes the steps of: (1) obtaining a facial image of interest (an original-image-of-interest), (2) if needed, preprocessing the original-image into a first-image-of-interest of a specified dimension $M=m_1 \times m_2$, (3) using a predetermined transformation matrix to perform a sparse, non-negative transformation of the first-image-of-interest to produce a pseudo-image-of-interest, (4) comparing the pseudo-image-of-interest with at least one library of pseudo-images, and (5) reporting the results of the comparison.

FIG. 44 sets forth a flowchart that can be used in preparing or augmenting one or more pseudo-image libraries. The flowchart includes the steps of: (1) obtaining a facial image to be included in the one or more pseudo-image libraries, (2) if needed, preprocessing the facial image into a first-image of a specified dimension $M=m_1 \times m_2$, (3) using a predetermined transformation matrix to perform a sparse, non-negative transformation of the first-image to produce a pseudo-image, and (4) incorporating the pseudo-image along with at least some indexing/identification information into the one or more pseudo-image libraries.

The steps set forth in the flowcharts of FIGS. 42-44 discussed above and FIGS. 45-46 discussed below or in other flowcharts developed based on the present disclosure can be readily implemented using a variety of computer equipment and a variety of software programming languages, e.g., MATLAB or OCTAVE, which are well-suited for matrix calculations. Other programming languages that can be used in the practice of the disclosure include, without limitation, FORTRAN, C, C++, PYTHON, PASCAL, BASIC, and the like. More than one programming language can be used in the practice of the disclosure if desired.

Output from the computations can be in electronic and/or hard copy form, and can be displayed in a variety of formats, including in tabular and graphical form. For example, graphs can be prepared using commercially available data presentation software such as those that are part of MATLAB and OCTAVE or those of MICROSOFT's EXCEL program, R, or other software packages.

Programs for implementing the disclosure can be provided to users on a non-transitory, computer-readable medium with instructions stored thereon capable of being executed by a computer processor to perform the steps of the process. Non-limiting examples of such media include diskettes, CDs, flash drives, and the like. The programs can also be downloaded to users through the internet. In addition, the process of the disclosure can be provided to users on-line through, for example, "cloud" computing. The process can be performed on various computing platforms, including personal computers, workstations, mainframes, supercomputers, etc.

The predetermined transformation matrix can be implemented as computer hardware, including computer hardware that is field programmable. For example, the predetermined transformation matrix can be directly programmed into a computer chip, e.g., a microchip, and can be alterable in the field through the use of a programmable device, e.g., a FPGA. Once a large enough training set has been employed in determining a predetermined transformation matrix, no addition learning will normally be necessary and a fixed predetermined transformation matrix can be used across different platforms (different machines) and provided as a hard-implemented device, e.g., as firmware. Hardware implementations may be particularly well-suited for established image recognition systems.

As noted immediately above, once determined by the methods discussed above, a predetermined transformation matrix will generally not require additional learning. However, in cases where additional learning is desired, e.g., to improve robustness or accuracy, two approaches can be used to produce an "augmented" predetermined transformation matrix. The two approaches will be referred to as the "de novo" and "sequential" approaches. Since an augmented predetermined transformation matrix that results from additional learning can be used in the same manner as an existing predetermined transformation matrix when performing image recognition, the term "predetermined transformation matrix" will be understood to include both an existing (e.g., original) predetermined transformation matrix and an augmented predetermined transformation matrix produced by additional learning. It will also be understood that, if desired, augmentation can be performed multiple times using either the de novo approach, the sequential approach, or a combination of those approaches.

The de novo approach to additional learning uses the methods discussed above for producing an original predetermined transformation matrix to produce the augmented predetermined transformation matrix. In accordance with the methods discussed above, all of the training images are utilized at once by forming the M×N dimension X matrix of first-images and then factorizing the X matrix into the M×K dimension predetermined transformation matrix (the Φ matrix) and the K×N dimension A matrix of pseudo-images that correspond to the first-images of the training set.

In accordance with the de novo approach, this process of using all of the first-images of the training set at once is repeated but with a larger (augmented) training set, i.e., an X matrix with more columns. Specifically, an M×(N+N') dimension X matrix is formed where N' is the number of newly-incorporated images (N'≥1). This matrix is then factored into an M×K dimension predetermined transformation matrix (the augmented Φ matrix) and a K×(N+N') dimension A matrix of pseudo-images that correspond to the first-images of the augmented training set. Because the process involves an initial seeding of the A matrix (and the Φ matrix) with non-negative random numbers (see Algorithm 1 above), the resulting augmented predetermined transformation matrix will, in general, be sufficiently different from the existing (prior) transformation matrix so as to require recomputation of pseudo-image libraries that were generated with the prior matrix. Thus, in addition to being time consuming, this approach may disrupt previously designated associations between the pseudo-images and other datasets (e.g., criminal records, etc.).

In accordance with the second approach—the sequential approach—the need for such recomputation can be substantially reduced or eliminated completely. As its name implies, the sequential approach performs sequential learning in which the Φ matrix and the A matrix are updated based on one or more new first-images incorporated into the training set without the need to start over from the beginning as in the de novo approach. The method offers an advantage over de novo learning of being more efficient. Importantly, in general, it is able to update the pseudo-images for the training set without affecting their identities.

Figure 45:
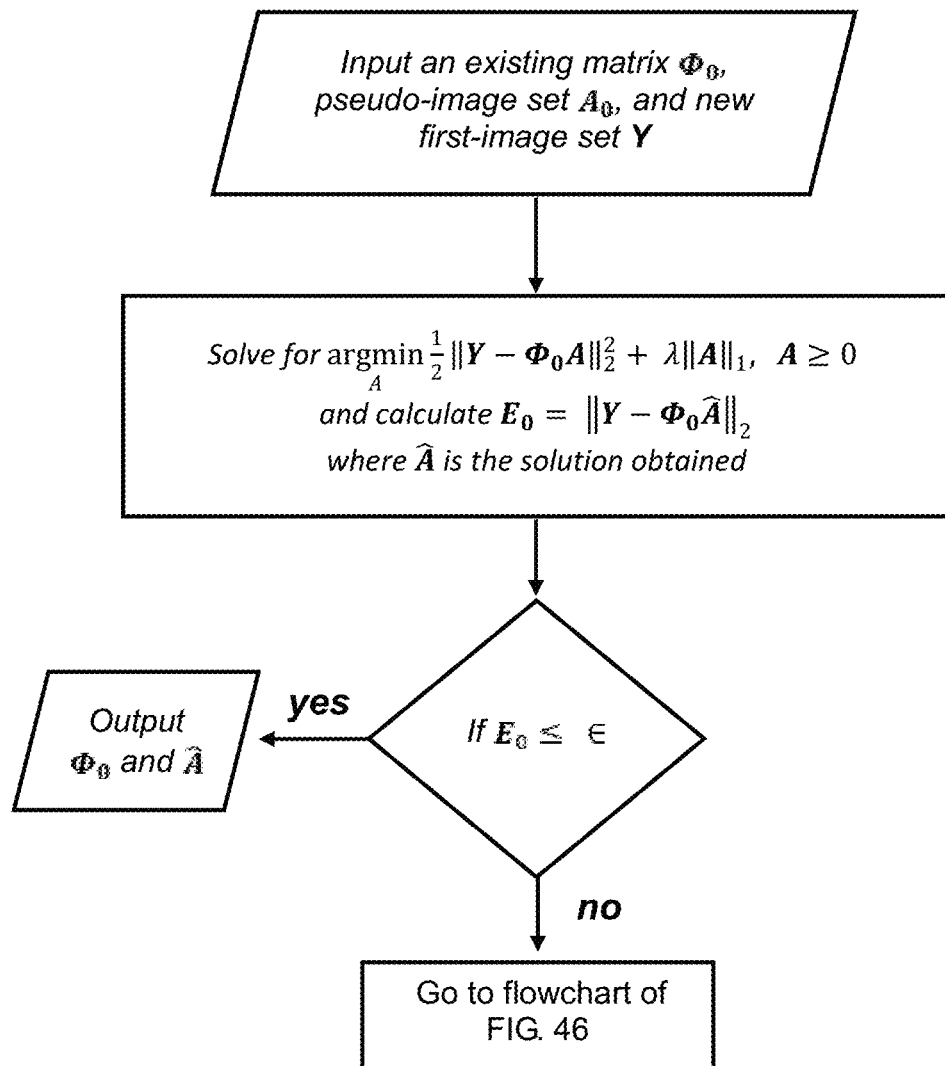
FIG. 45 is a flowchart illustrating an exemplary embodiment of the present disclosure for determining whether a predetermined transformation matrix is in need of augmentation.

As a preliminary step before using either the de novo or the sequential approaches to augment an existing predetermined transformation matrix, it will normally be appropriate to determine whether that matrix actually needs augmentation in order to be able to generate pseudo-images for a new first-image or a set of new first-images. FIG. 45 sets forth an exemplary flowchart for performing such a preliminary inquiry. As shown in the first box of that figure, the inputs to the process are the existing predetermined transformation matrix $\Phi_0$ and the new first-image set Y, which may be a single new first-image. Because, as discussed below, the sequential approach uses the existing pseudo-image set $A_0$ corresponding to the training set used to produce $\Phi_0$, $A_0$ is also shown as an input in FIG. 45, although it is not used when the de novo approach is employed.

As shown in the calculation step of FIG. 45 (the second box of that figure), using $\Phi_0$ and Y, a set of pseudo-images Â is calculated for Y using procedures analogous to those of Algorithm 1 above, but with a minimization only over A as opposed to over both A and Φ. Thus, λ and I are as in Algorithm 1, as is ε used in the decision box (yes/no box) of FIG. 45. As shown in the decision box, when the error $E_0$ is less than or equal to ε, $\Phi_0$ can continue to be used without augmentation. The process also generates the pseudo-images Â for the one or more new first-images which, for example, can be used to augment one or more pseudo-image libraries. Thus, while Φ is not augmented, the pseudo-images are augmented through the calculation of Â.

Figure 46:
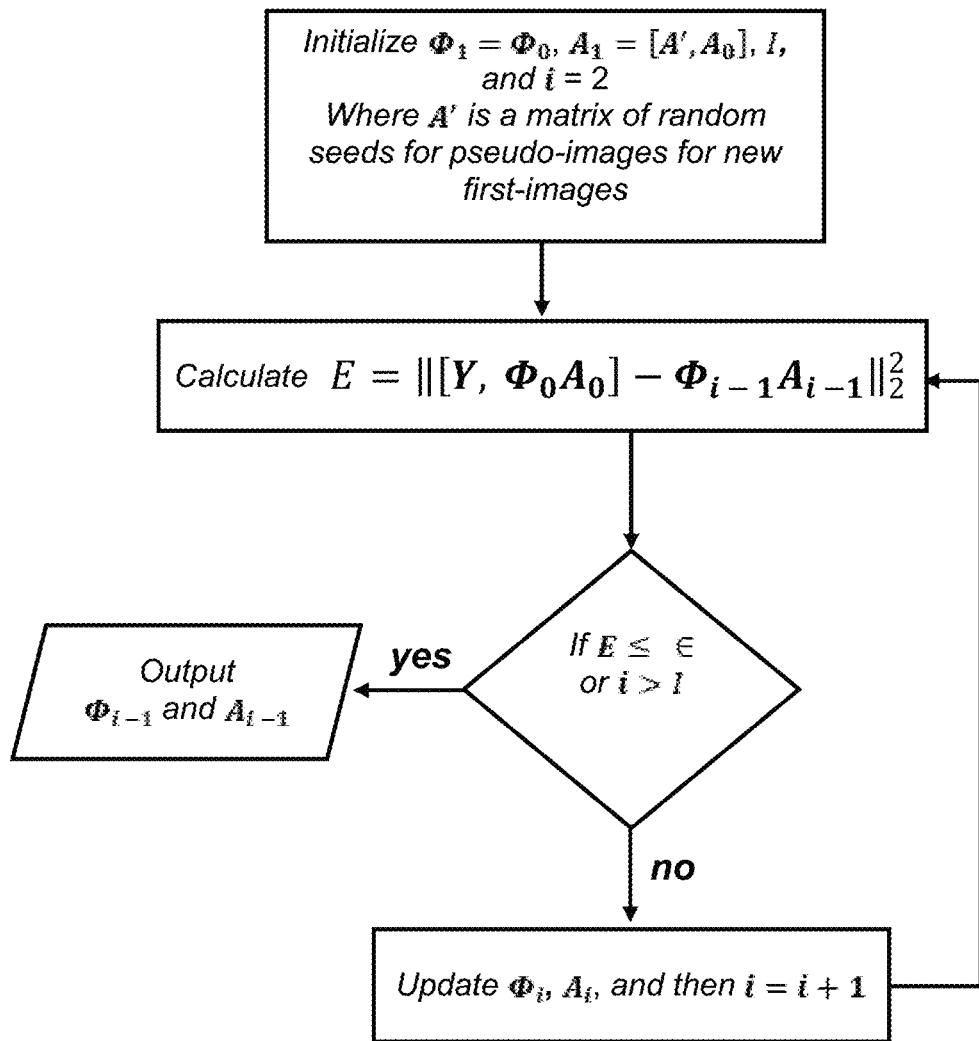
FIG. 46 is a flowchart illustrating an exemplary embodiment of the present disclosure for augmenting a predetermined transformation matrix by the sequential approach. The updating of $\Phi_i$ and $A_i$ can be performed using, for example, Algorithm 3 below.

When the calculation box of FIG. 45 produces an $E_0$ value that is greater than ε, the process proceeds to FIG. 46. (Note that, if desired, the process of FIG. 46 can be performed without first performing the process of FIG. 45; likewise, the de novo approach can be commenced without first performing the process of FIG. 45.) The process of FIG. 46 assumes that a set of N first-images have been used to produce a predetermined transformation matrix $\Phi_0$ and a corresponding set of pseudo-images $A_0$. When a new first-image or a set of new first-images Y is to be incorporated in the system, the method searches for a new predetermined transformation matrix Φ (the augmented predetermined transformation matrix) and pseudo-images A that, using $L_1$ minimization, minimize the cost function:

$$\operatorname*{argmin}_{\Phi, A} \frac{1}{2}\|[Y - \Phi_0 A_0] - \Phi A\|_2^2 + \lambda \|A\|_1, \Phi \geq 0, A \geq 0$$

A general outline of the process for performing this minimization is set forth in FIG. 46 and a representative non-limiting example of an algorithm that can be used with this general outline is set forth below in Algorithm 3. As will be evident to skilled persons from the present disclosure, other algorithms and general outlines for performing the sequential process can be used if desired.

Algorithm 3

Concatenate matrix of new images with $\Phi_0 A_0$, which are the proxy of the first-images of the previous training set.

Initialize $\Phi_1 = \Phi_0$; initialize $A' \in (K, N')$ with random numbers;

initialize $A_1 = [A', A_0]$; initialize $I$;

For $i = 2, I$

Normalize the columns of $\Phi_{i-1}$ to unit length;

$$A_i \leftarrow \operatorname*{argmin}_A \frac{1}{2}\|[Y, \Phi_0 A_0] - \Phi_{i-1} A\|_2^2 + \lambda \|A\|_1, A \geq 0$$

$$\Phi_i \leftarrow \operatorname*{argmin}_\Phi \frac{1}{2}\|[Y, \Phi_0 A_0] - \Phi A_i\|_2^2, \Phi \geq 0$$

End For Loop when gradient descent stops or if $i > I$

Output $\Phi_i$ and $A_i$

The values of I and A used in Algorithm 3 are determined in the same manner as discussed above in connection with Algorithm 1. As in Algorithm 1, at each iteration i, the value of A for the last iteration ($A_{i-1}$) is used as the initial value for determining ($A_i$), and likewise, the value of Φ for the last iteration ($\Phi_{i-1}$) is used as the initial value for determining ($\Phi_i$).

The process of FIG. 46 and Algorithm 3 is able to substantially preserve existing pseudo-images for the prior members of the training set as well as existing pseudo-image libraries. This is especially so when the existing predetermined transformation matrix $\Phi_0$ is robust. An examination of Algorithm 3 reveals that rather than concatenating Y with the original training set of first-images (the X matrix), Y is concatenated with $\Phi_0 A_0$ as a proxy for X. Thus, $\Phi_0$ is actively used in the process and can thereby influence the contents of the augmented predetermined transformation matrix and thus the pseudo-images produced using that augmented matrix. When $\Phi_0$ is robust, the augmented predetermined transformation matrix need not be excessively different from $\Phi_0$ to cover the new first-images being introduced into the training set in the augmentation process. Consequently, pseudo-images generated with the original predetermined transformation matrix ($\Phi_0$) and the augmented predetermined transformation matrix need not be excessively different thus making it more likely that previously-designated associations between the existing pseudo-images and other datasets can be preserved.

Figure 47:
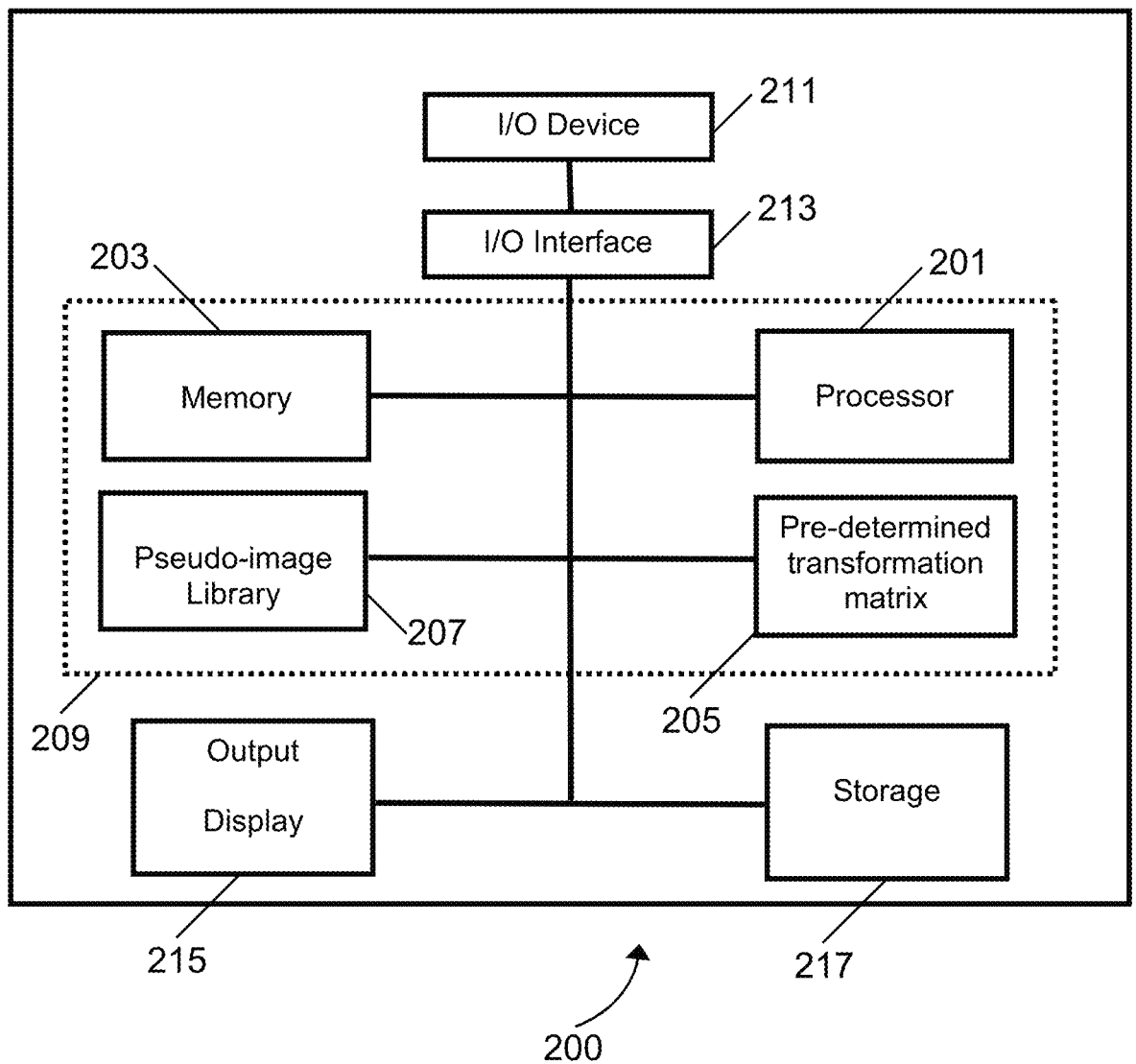
FIG. 47 is a functional block diagram illustrating components of a representative example of a computer system for use in practicing embodiments of the methods of the disclosure.

FIG. 47 schematically illustrates a non-limiting architecture of components of a computer system 200 for performing image recognition using the methods disclosed herein. In this non-limiting, exemplary embodiment, system 200 includes one or more computer processors 201 and one or more memories 203 with data and instructions stored therein that, when used by the one or more computer processors, can perform the steps of transforming a first-image into a pseudo-image and then comparing the pseudo-image with a library of pseudo-images and/or incorporating the pseudo-image in one or more pseudo-image libraries. The one or more computer processors and one or more memories can also be used to transform original-images into first-images.

The same or a separate computer system can be used to calculate one or more predetermined transformation matrices for use in performing transformations from first-images to pseudo-images. A predetermined transformation matrix 205 and a pseudo-image library 207 are shown separately in FIG. 47, it being understood that they can be part of one or more memories 203 or can be hard coded into the one or more computer processors 201.

In addition to its processor/memory unit 209, computer system 200 can also include an I/O device 211 that transmits acquired signals through an I/O interface 213 to the processor/memory unit. These I/O devices can be used to, for example, load original-images, first-images, pseudo-image libraries, and/or predetermined transformation matrices into the system's memory. The devices can also be used to transmit operator commands to the system. The results of the computations performed by processor/memory unit 209, e.g., pseudo-images, predetermined transformation matrices, pseudo-image libraries, comparison reports, and the like, can be output through output/display unit 215 and/or stored in a non-transitory, computer-readable storage medium 217.

Without intending to limit its scope in any manner, the invention is further illustrated by the following non-limiting examples.

Example 1

This example illustrates the application of the image recognition techniques disclosed herein to the problem of facial recognition.

FIG. 1 shows an original-image of a person-of-interest whose identify is desired. The person-of-interest is in a crowd of other people as will often be the case in applications of the facial recognition techniques disclosed herein. FIG. 2A shows an initial (first round) of first-level preprocessing in which FIG. 1 was cropped to highlight just the face of the person-of-interest. The dimension of the cropped face had the same number of vertical and horizontal pixels; specifically, the cropped image had 10,000 pixels (100× 100). The cropping was performed using the open-source software OPEN-CV, but could also have been done using face detection software, such as, GOOGLE VISION API or CLANDMARK.

FIG. 2B shows further first-level preprocessing in which the FIG. 2A image was down-sampled to a pre-specified dimension ($m_1 \times m_2 = 25 \times 25$). In this example, down-sampling was achieved by local averaging over 4×4 pixel subareas. This down-sampling reduced the 100×100 pixels of FIG. 2A to 25×25 pixels for FIG. 2B. The grayscale values for the pixels were normalized to be between zero and one. The FIG. 2B image was the first-image-of-interest (step(a)-first-image) for this example and thus M for this example was 625.

A training set of 2,000 facial images (N=2,000) was obtained from an automated web-based image search and subjected to the same first-level preprocessing used to obtain FIG. 2B from FIG. 2A. FIG. 3 shows five of the facial images of the training set.

Using the full set of 2,000 training images and Algorithm 1 above, a Φ matrix, i.e., a predetermined transformation matrix, was obtained composed of 1,500 dictionary elements (i.e., K=1,500 and Φ was a 625×1,500 matrix). FIG. 4 shows 36 of the 1,500 dictionary elements obtained in this way. In FIG. 4, the dictionary elements are displayed as two-dimensional arrays, rather than as columns of the predetermined transformation matrix.

As discussed above, the process of producing the predetermined transformation matrix Φ generates a pseudo-image for every image in the training set. Each pseudo-image has the same number of element weights (components) as the number of columns (number of dictionary elements) in Φ, i.e., each pseudo-image has K element weights, which in this example was 1,500. FIG. 5 shows five of the 2,000 pseudo-images generated in this way. In this figure, the element weights of the pseudo-images are displayed as two-dimensional, grayscale arrays, rather than as vectors of numerical values as would be their typical form in a computer system. As can be seen, objects from the real world (i.e., human faces) can be perceived in the first-images but not in the pseudo-images.

FIG. 6 shows the active elements of the pseudo-image corresponding to the face shown in FIG. 2B, where active elements are dictionary elements having coefficients (element weights) substantially greater than zero. The pseudo-image of this figure was obtained using Algorithm 2 and the predetermined transformation matrix some of whose dictionary elements are shown in FIG. 4.

The top 12 dictionary elements of the pseudo-image, i.e., the 12 dictionary elements with the largest element weights, are marked by dark frames in the bottom panel of FIG. 6, which shows all 1,500 dictionary elements. The grayscale of each element in the pseudo-image indicates the coefficient value of that element.

An alternative view of the active elements, including values for the coefficients (element weights) of the significant dictionary elements, is shown in FIG. 7. The coefficient value of each element is indicated by the height of the line corresponding to the element.

The identification of the face shown in FIG. 2B and thus in FIG. 1 was performed by calculating a similarity score between the pseudo-image-of-interest, i.e., the pseudo-image of FIG. 6, and each member of a library of pseudo-images. For the purposes of this example, the pseudo-image library was the set of pseudo-images for the training set which, as discussed above, were generated at the same time the predetermined transformation matrix Φ was generated. Accordingly, the S value for the pseudo-image library was 2,000. The function cos(θ) was used as the similarity score for this example, as well as in Examples 2-10.

FIG. 8 shows the reporting of the identification of the first-image-of-interest and thus the original-image by a comparison of the pseudo-image-of-interest of FIG. 6 with the full pseudo-image library from which the portion of FIG. 5 was taken. The first-image with the highest score is identical to the first-image-of-interest. As can be seen, its similarity score is substantially greater than the next highest score, thus illustrating the robustness of the identification for this system where K/M was 2.4 (K=1,500; M=625). The rank of the X matrix, as determined by the RANK( ) function in MATLAB, was 625 so that the K/R and K/M values for this example were both 2.4, each of which is indicative of robustness. The K/M and K/R value for this Example 1 was also the K/M and K/R value for Examples 3-6 below.

Example 2

This example illustrates how reducing the values of the K/M and K/R ratios compromises the robustness of the image recognition procedure.

The same procedures and training set as in Example 1 were used with the K value set at 500 instead of 1,500 and thus, although the pseudo-image library still had 2,000 pseudo-images, the pseudo-images were different because K was different. The KIM and K/R values were both 0.8 since the X matrix was the same as in Example 1 and thus had the same R equal to M value as in that example, i.e., 625. The 0.8 value for K/M and K/R for this Example 2 was also the K/M and K/R value for Example 7 below.

FIGS. 9-13 show the results. Comparing FIG. 9 with FIG. 4 of Example 1, we see that reducing K changed the dictionary elements. For the smaller K value, the dictionary elements incorporated less features and were sketchier than those in FIG. 4, but still resembled faces.

Figure 10:
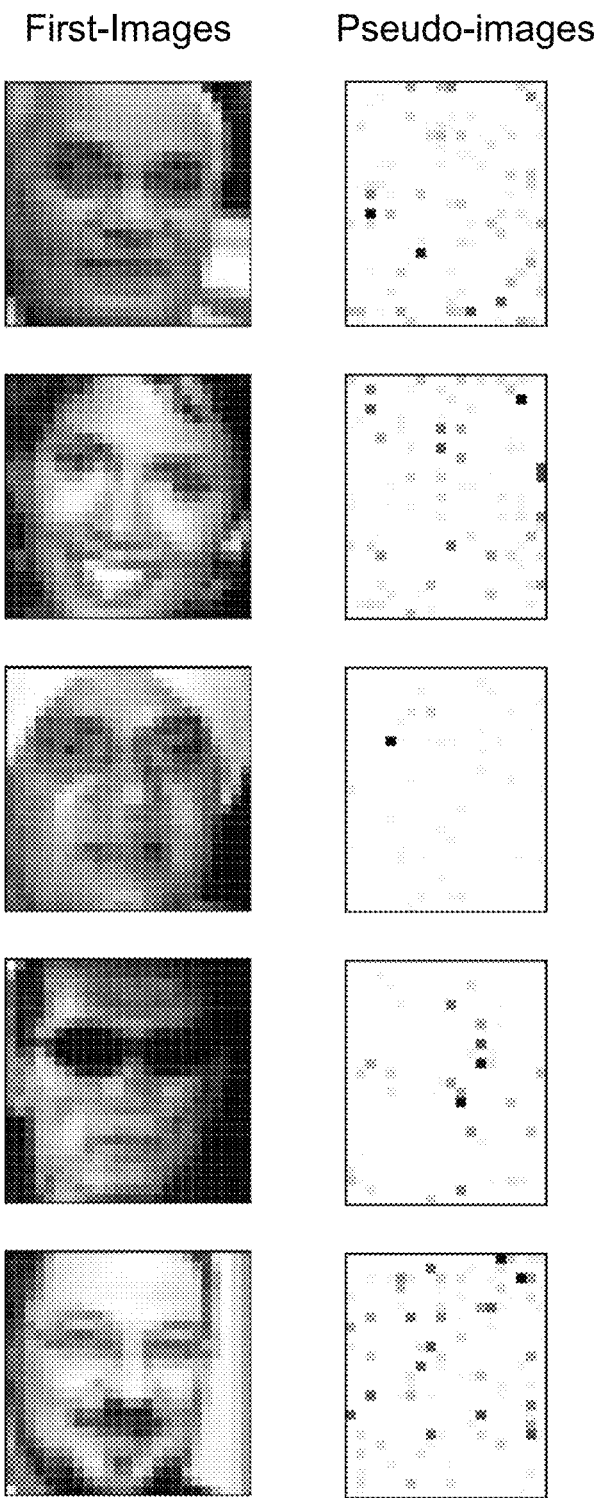
FIG. 10 shows a portion of a library of pseudo-images of the training set when transformed into pseudo-images of 500-dimension. Five pseudo-images corresponding to each of the first-images shown in FIG. 3 are displayed.
Figure 11:
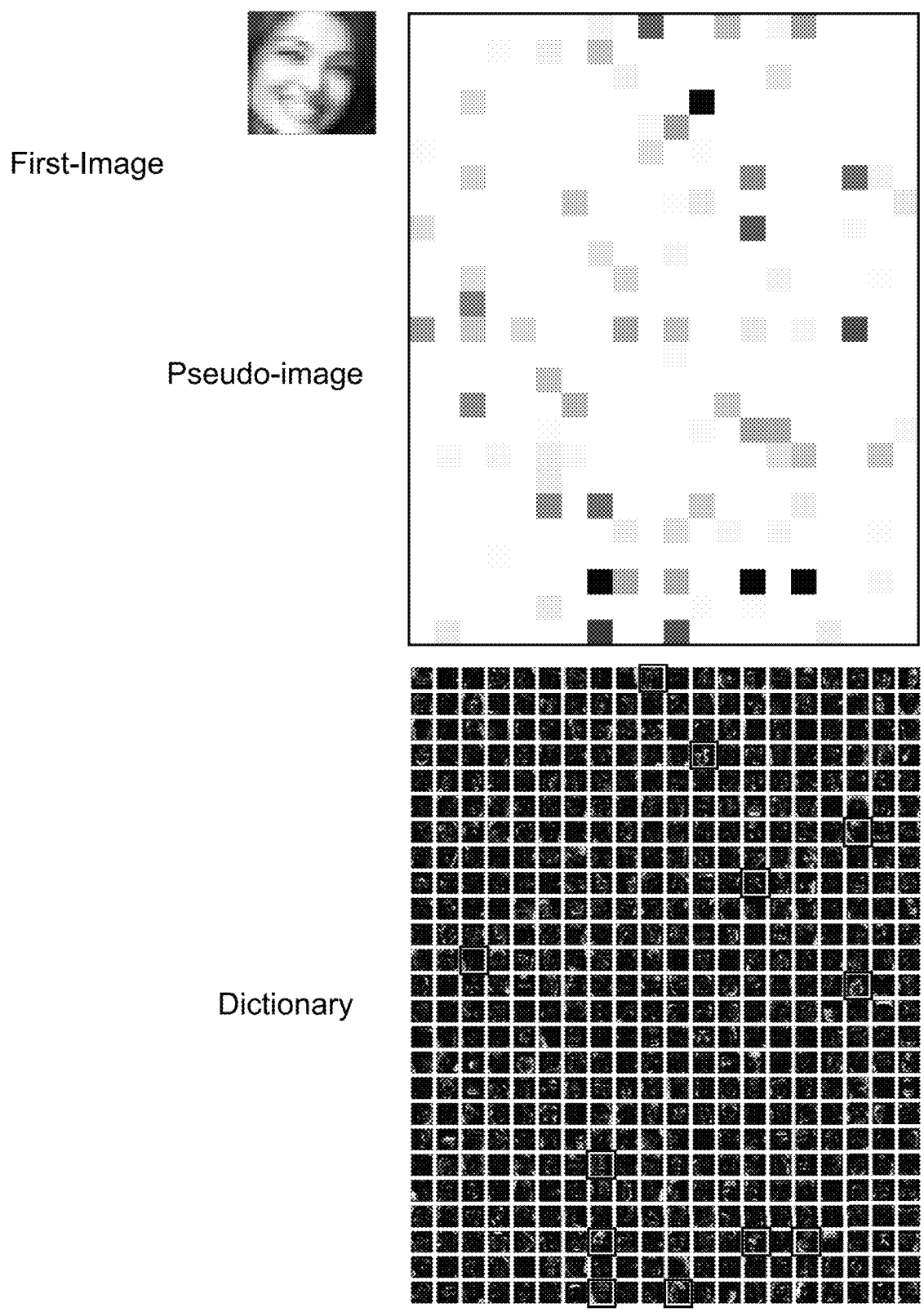
FIG. 11 shows the pseudo-image-of-interest for the first-image-of-interest of FIG. 2B for K equal to 500. The pseudo-image-of-interest was obtained using the predetermined transformation matrix some of whose dictionary elements are shown in FIG. 9. Each element weight (each component) of the pseudo-image is for a dictionary element of the predetermined transformation matrix, i.e., each element weight of the pseudo-image is for a column of the predetermined transformation matrix. The dictionary elements with the top (largest) twelve element weights are highlighted in the bottom panel of this figure. The grayscale of each element weight in the pseudo-image indicates the magnitude of the element weight. All 500 element weights and dictionary elements are displayed.
Figure 12:
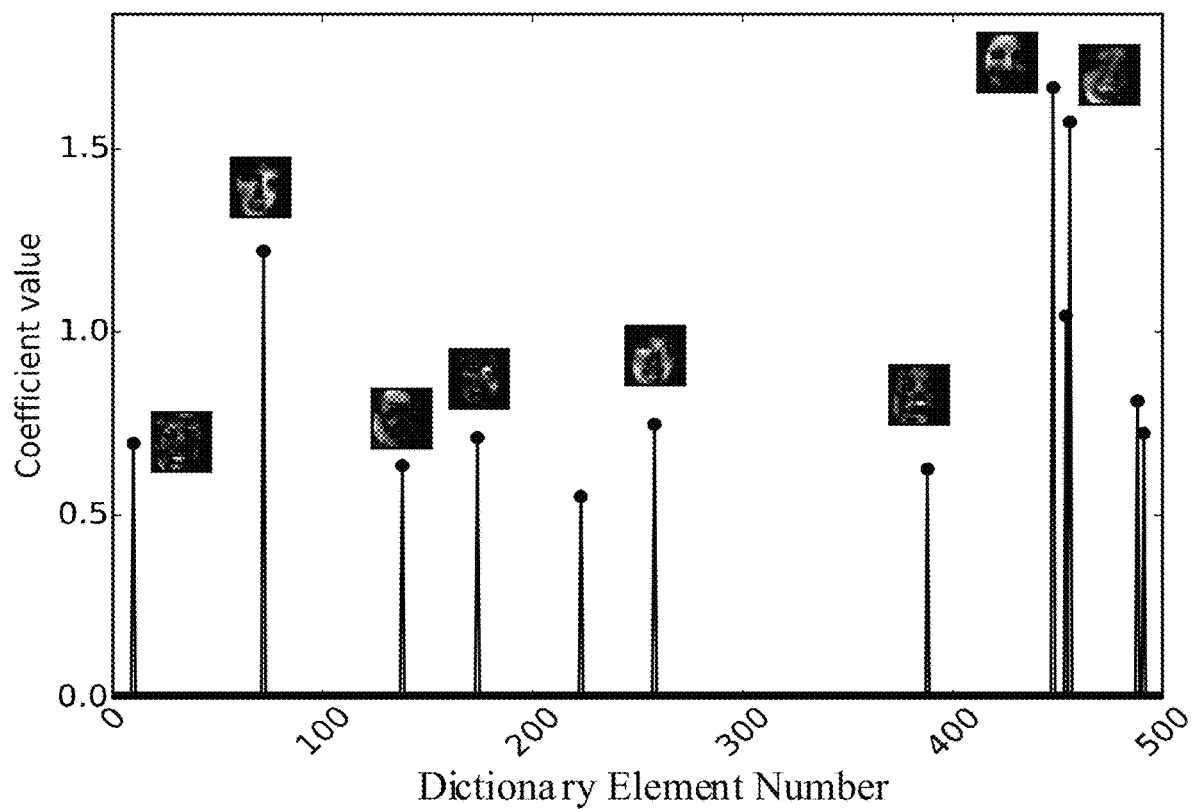
FIG. 12 shows the twelve significant dictionary elements of the pseudo-image of FIG. 11. The element weight (coefficient value) of each of the significant dictionary elements is indicated by the height of the line corresponding to the element. Larger pictures of the twelve dictionary elements are displayed in the bottom panel.
Figure 13:
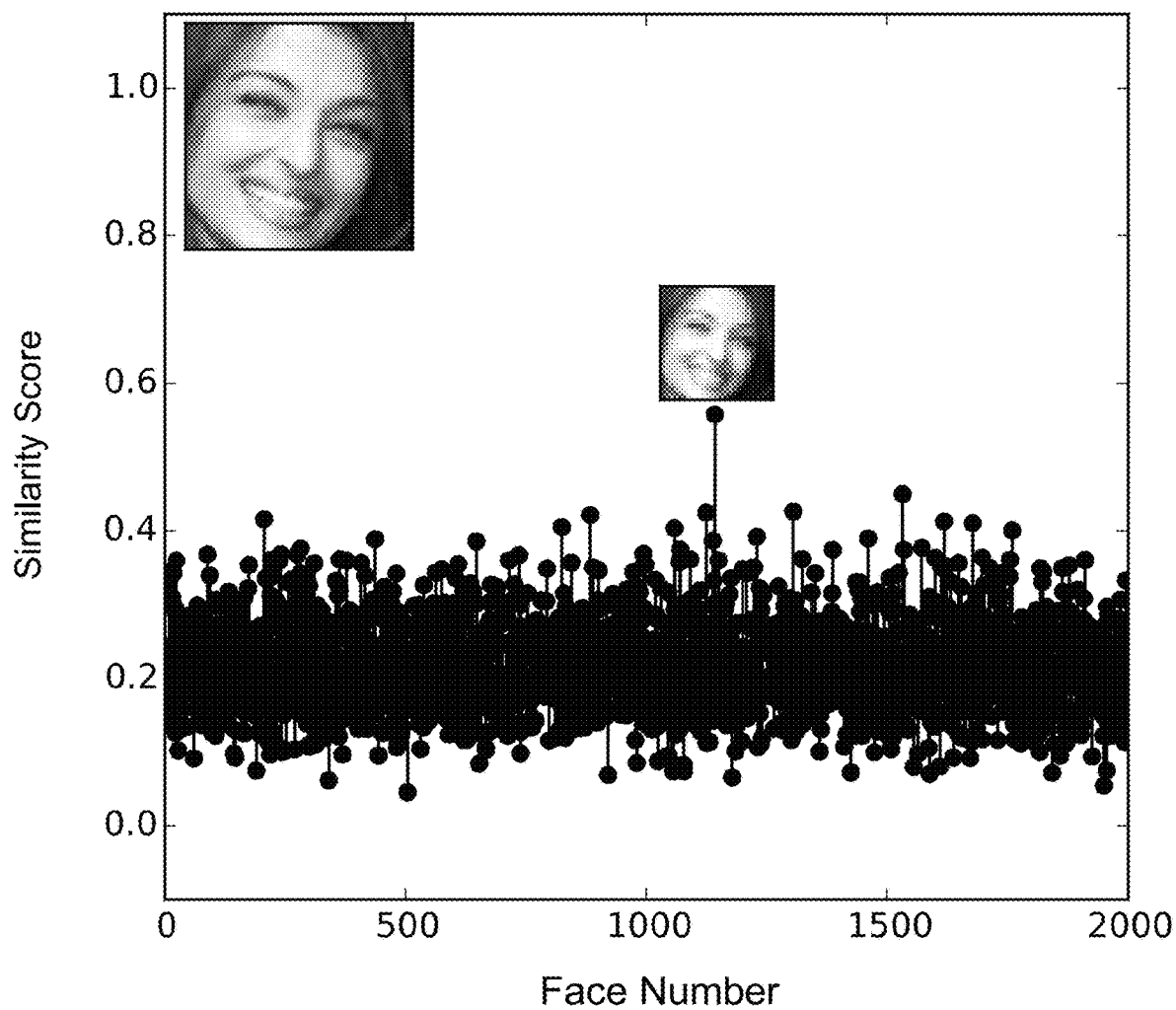
FIG. 13 shows the reporting of the identification of the first-image-of-interest and thus the original-image by a comparison of the pseudo-image-of-interest of FIG. 11 with the full pseudo-image library from which the portion of FIG. 10 was taken. The first-image of a face within the pseudo-image library that has the highest similarity value is displayed.

Comparing FIGS. 10-12 with FIGS. 5-7 of Example 1, we see that reducing the K value resulted in more active elements, meaning that the pseudo-images were less sparse. The reduction of sparseness has an impact on the comparison of the pseudo-image-of-interest with the library of pseudo-images. Specifically, as shown in FIG. 13, many more faces in the library of pseudo-images have moderate values in the similarity score, as compared with the few in FIG. 8. Although the same correct face was identified, reducing the K value caused the difference (contrast) between the similarity score for the correct face and that for the nearest runner up to be much smaller for this example than for Example 1. Hence, the robustness was compromised.

This reduction in robustness is further demonstrated below by Examples 3-6, where imperfect facial images of various types were successfully identified when K was 1,500, and Example 7, where successful identification was not achieved when K was reduced to 500, thus taking the K/M and K/R ratios from above 1.0 for Examples 3-6 to below 1.0 for Example 7.

Example 3

This example illustrates the ability of the technique to perform facial recognition for people having part of their face obscured by, in this case, glasses or sunglasses. The same procedures, training set, and pseudo-image library as in Example 1 were used except that for this example, the first-images-of-interest were faces from the training set modified by including a pair of glasses or sunglasses around the eyes. The faces in the training set remained the same; only the first-images-of-interest whose identities were sought were changed.

Figure 14:
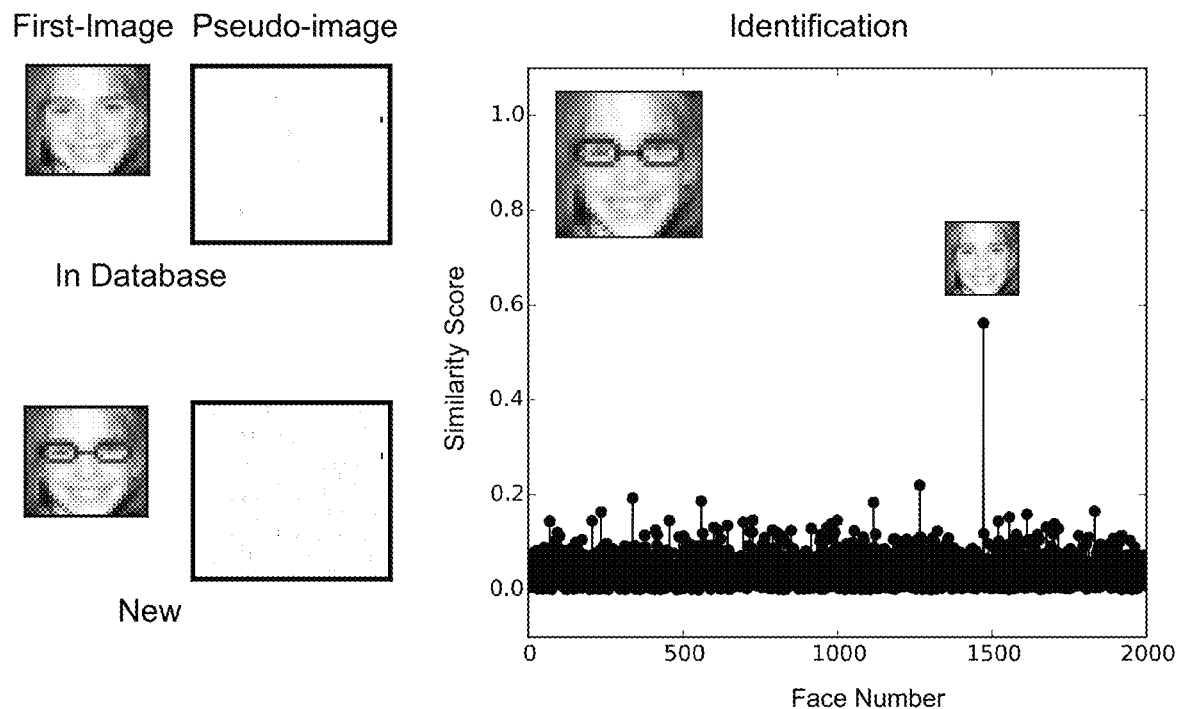
FIG. 14 shows the identification of a face in a pseudo-image library but with a pair of glasses that changes and somewhat obscures the original face. The face with glasses was not in the pseudo-image library, but the process correctly identified it as the exact person without the glasses. K equaled 1,500 for this figure.
Figure 15:
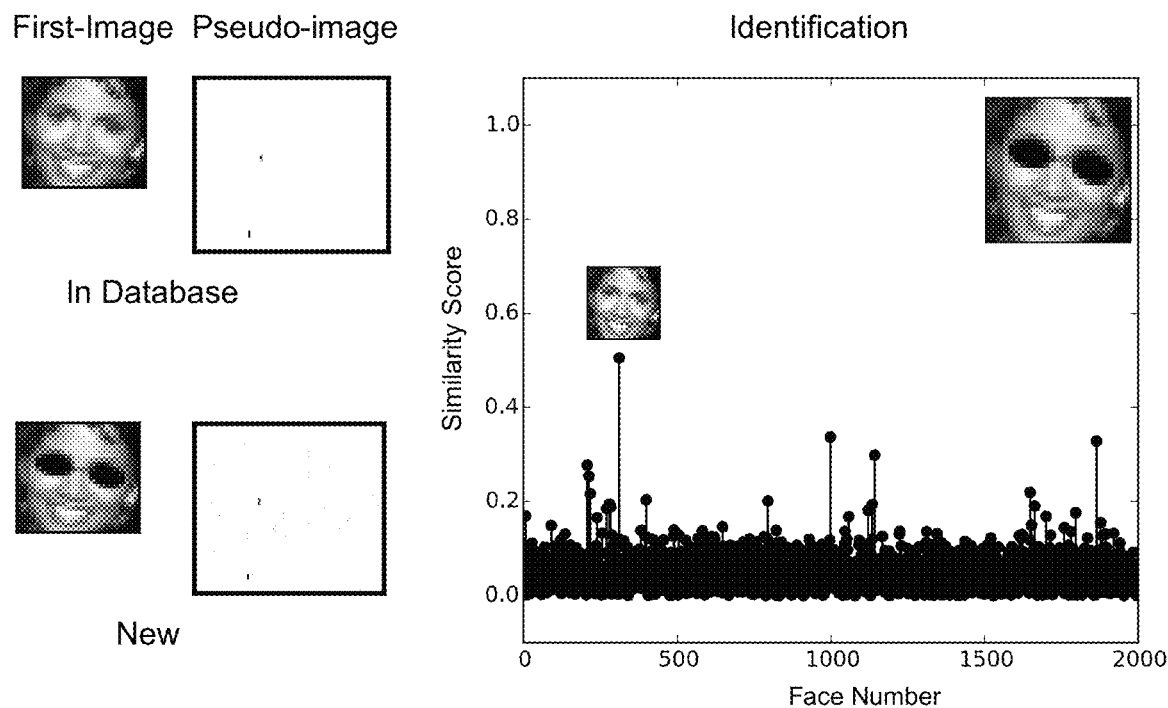
FIG. 15 shows the identification of a face in a pseudo-image library but with a pair of sunglasses that completely obscures the eyes of the subject. The face with sunglasses was not in the pseudo-image library, but the process correctly identified it as the exact person without the sunglasses. K equaled 1,500 for this figure.

FIGS. 14 and 15 show the results. The pseudo-images obtained using the predetermined transformation matrix Φ of Example 1 and Algorithm 2 showed more active elements, specifically, for FIGS. 14 and 15, respectively, 4.3% and 2.6% active elements for the original first-image for a threshold of 0.3 percent of the largest element weight versus 18.9% and 19.1% for the modified (imperfect) first-image using the threshold used for the original image, i.e., the threshold based on the largest element weight for the original first-image. However, the coefficient values for the additional elements were relatively small, i.e., substantially invisible in the middle columns of FIGS. 14 and 15. Thus, although the sparseness of the pseudo-images for the imperfect first-images was compromised, there still was substantial sparseness. Importantly, as can be seen in these middle columns, the main, high element weight (high coefficient value) dictionary elements are the same between the modified facial image and the original one.

As shown in the right hand columns of FIGS. 14 and 15, the similarity scores clearly identify the original face as the correct one notwithstanding the fact that the first-images-of-interest used in the analysis were wearing the eyewear.

Example 4

This example illustrates the ability of the technique to perform facial recognition for people with facial expressions that are not in the training set. The same procedures, training set, and pseudo-image library as in Example 1 were used. A face in the training set was modified by changing from smiling to non-smiling (top panel of FIG. 16) or from non-smiling to smiling (bottom panel of FIG. 16). The modified faces were then used as first-images-of-interest, the images in the training set being unchanged, i.e., the predetermined transformation matrix Φ and the library of pseudo-images used for the comparison were unchanged.

Figure 16:
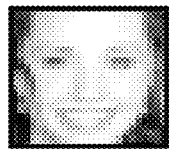
FIG. 16 shows the identification of faces with expressions different from the ones in the pseudo-image library. The top panel shows a person whose smiling face was in the training set. Her non-smiling face (the "new" face) was properly identified even though it was not in the training set and thus not in the pseudo-image library prepared from the training set. The bottom panel shows a person whose non-smiling face was not in the training set and thus not in the pseudo-image library prepared from the training set. Her smiling face was correctly identified. K equaled 1,500 for this figure.
Figure 16:
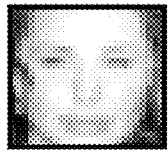
Figure 16:
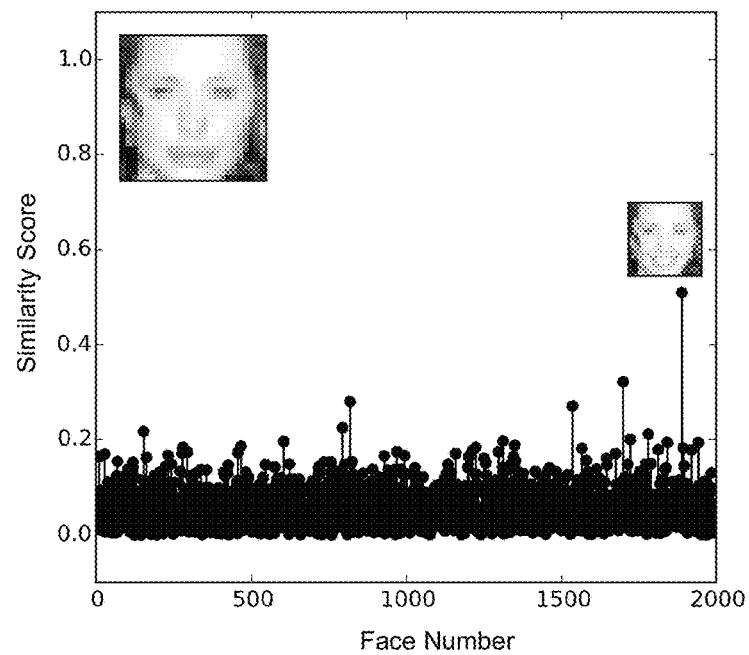
Figure 16:
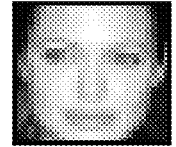
Figure 16:
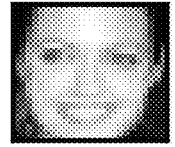
Figure 16:
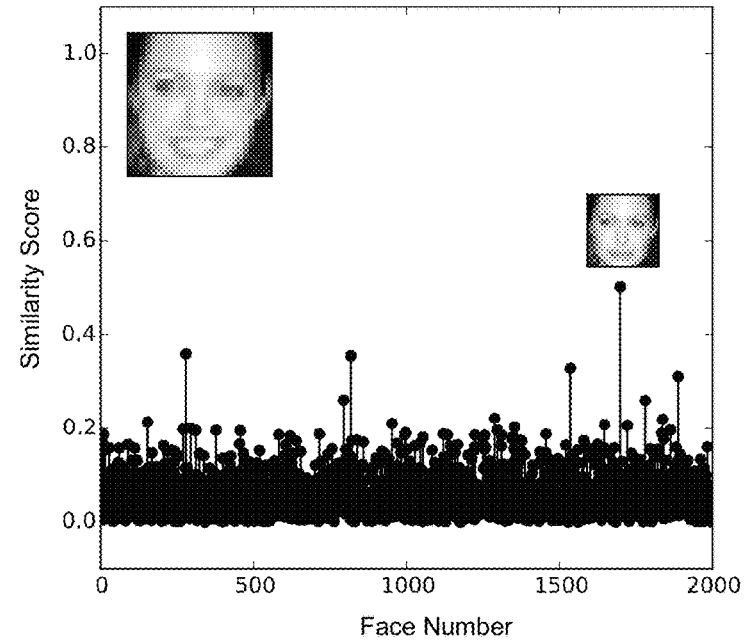

The right hand column of FIG. 16 shows the similarity scores between the faces with the different expressions and the pseudo-images of the library. The highest scores correctly identified the original faces.

Example 5

This example illustrates the ability of the technique to perform facial recognition for people having multiple parts of their face obscured by, in this case, sunglasses, facial hair, or both. The same procedures, training set, and pseudo-image library as in Example 1 were used. For this example, the first-images-of-interest were a face from the training set modified by including a pair of sunglasses around the eyes, a mustache above the mouth, or both. The face in the training set remained the same; only the first-images-of-interest whose identities were sought were changed.

Figure 17:
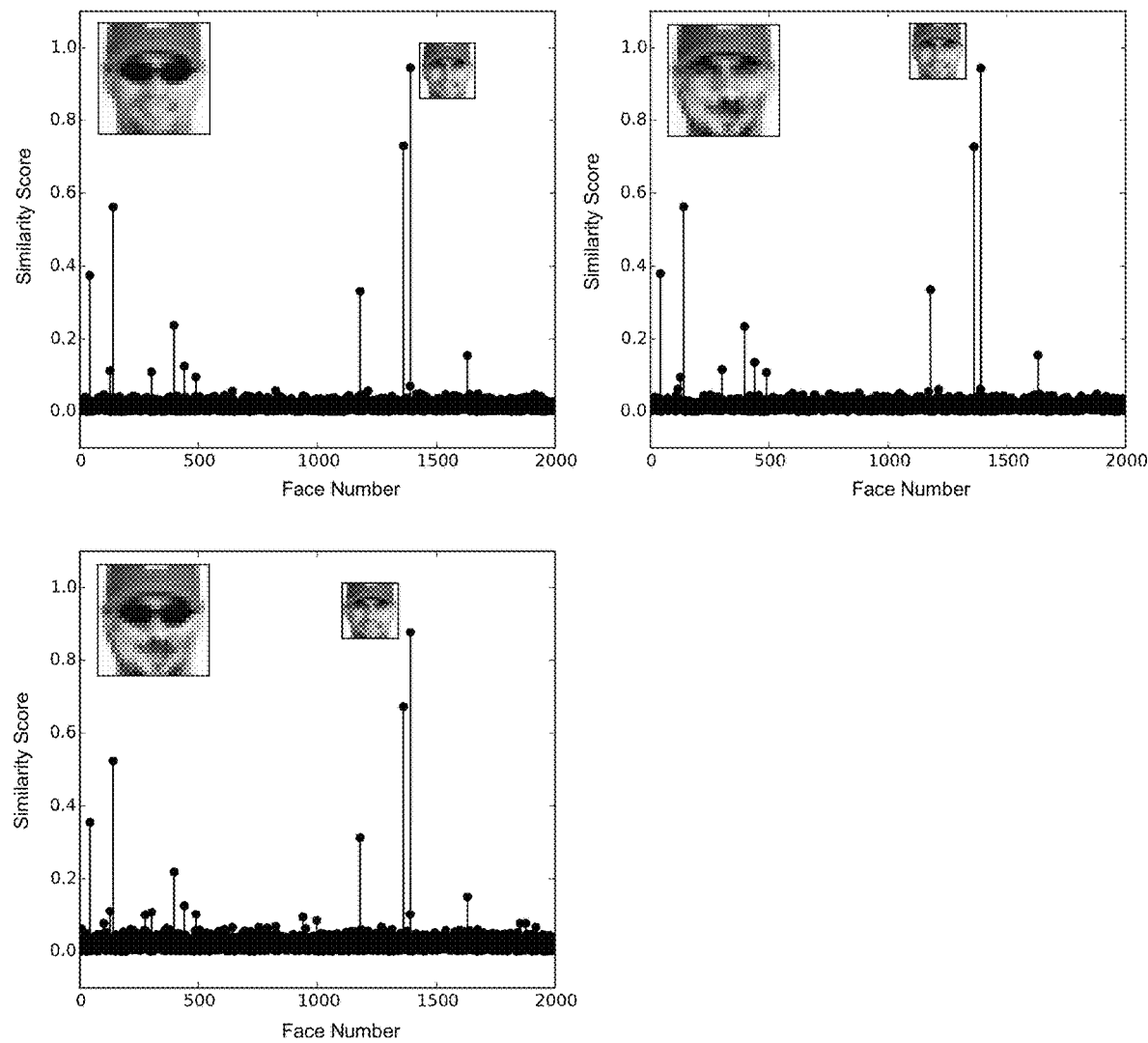
FIG. 17 illustrates the correct identification of a face with different facial modifications. The face with sunglasses (top left), the face disguised with a mustache (top right), and the face with both sunglasses and a mustache (bottom left), each generated a pseudo-image that when compared with the pseudo-image library which contained the unadulterated face gave the highest similarity score for the unadulterated face. K equaled 1,500 for this figure.

FIG. 17 shows the results. The largest similarity score between modified faces and the library of pseudo-images for the training set is the original face notwithstanding the fact that the first-images-of-interest used in the analysis were wearing a pair of sunglasses around the eyes, a mustache above the mouth, or both.

Example 6

Figure 18:
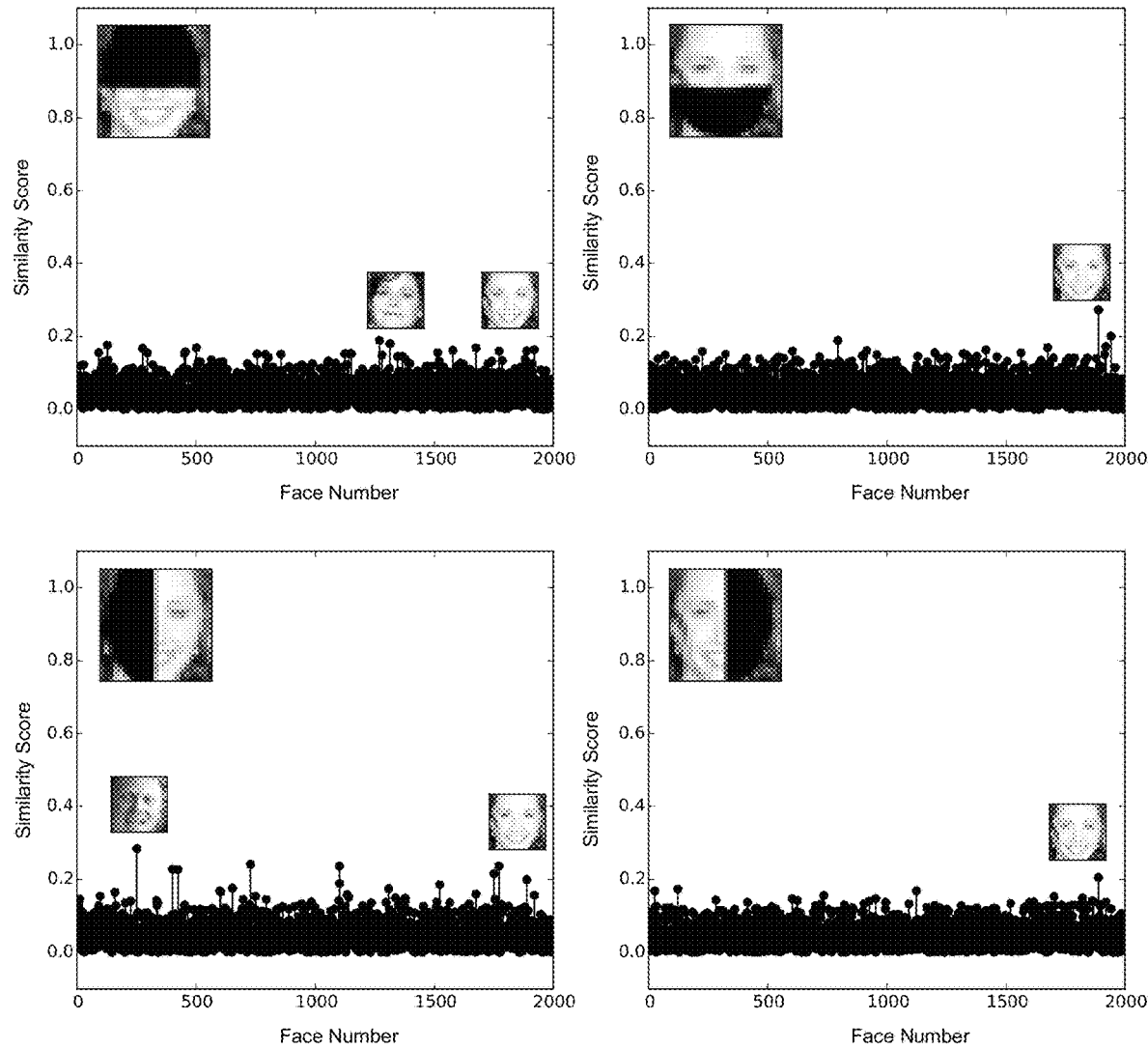
FIG. 18 illustrates the identification of a female face when different parts of the face were occluded. The faces with high similarity scores included the original face to be identified. Although not wishing to be bound by any particular theory of operation, it is believed that female faces can be more difficult to identify than male faces and consequently the face of the pseudo-image library with the highest similarity score was not the correct face in two of the four cases. K equaled 1,500 for this figure.
Figure 19:
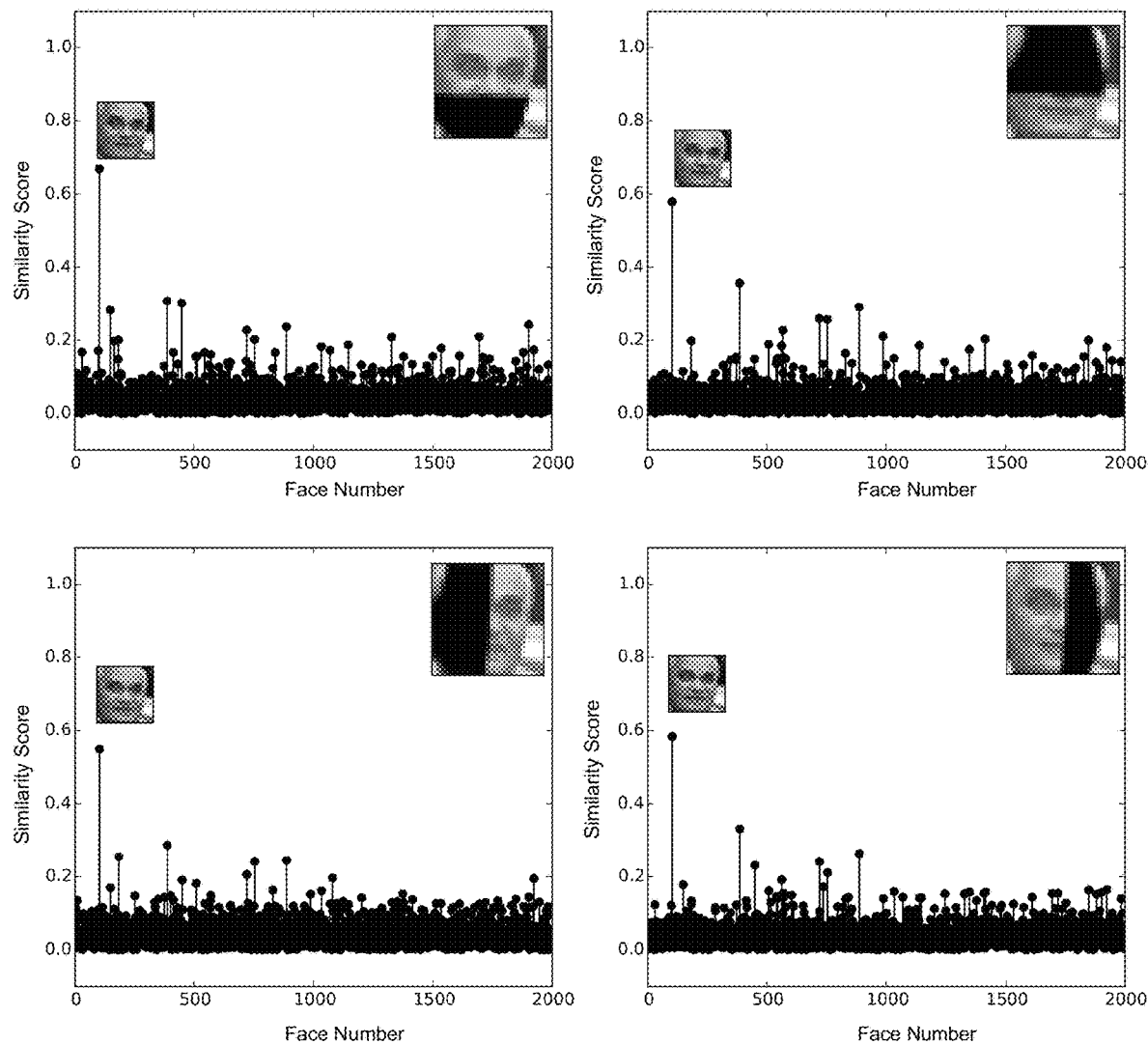
FIG. 19 illustrates the identification of a male face when different parts of the face were occluded. The face with the highest similarity score was the original face to be identified in all cases. K equaled 1,500 for this figure.

This example illustrates the ability of the technique to perform facial recognition for people having part of their face obscured by an object which in practice could be a hat, a scarf, a mask, or the like. The same procedures, training set, and pseudo-image library as in Example 1 were used. For this example, the first-images-of-interest were a face from the training set obstructed by a black mask that removed half of the face from being seen. The mask was placed to obscure different parts of the face (i.e., the top, bottom, left, or right halves). FIGS. 18 and 19 show the similarity scores between the obscured faces and the library of pseudo-images for the training set. In two of the cases (left hand cases in FIG. 18), the correct face was one of the faces with a high similarity score, although not the face with the highest score; in the other six cases (right hand cases in FIG. 18 and all the cases in FIG. 19), the original face was the face with the highest score.

Example 7

This example shows the effect of reducing the K value of 1,500 that was used in Examples 3-6 to 500. As noted above, with the reduction in K, the K/M and K/R value for this example was 0.8.

Figure 23:
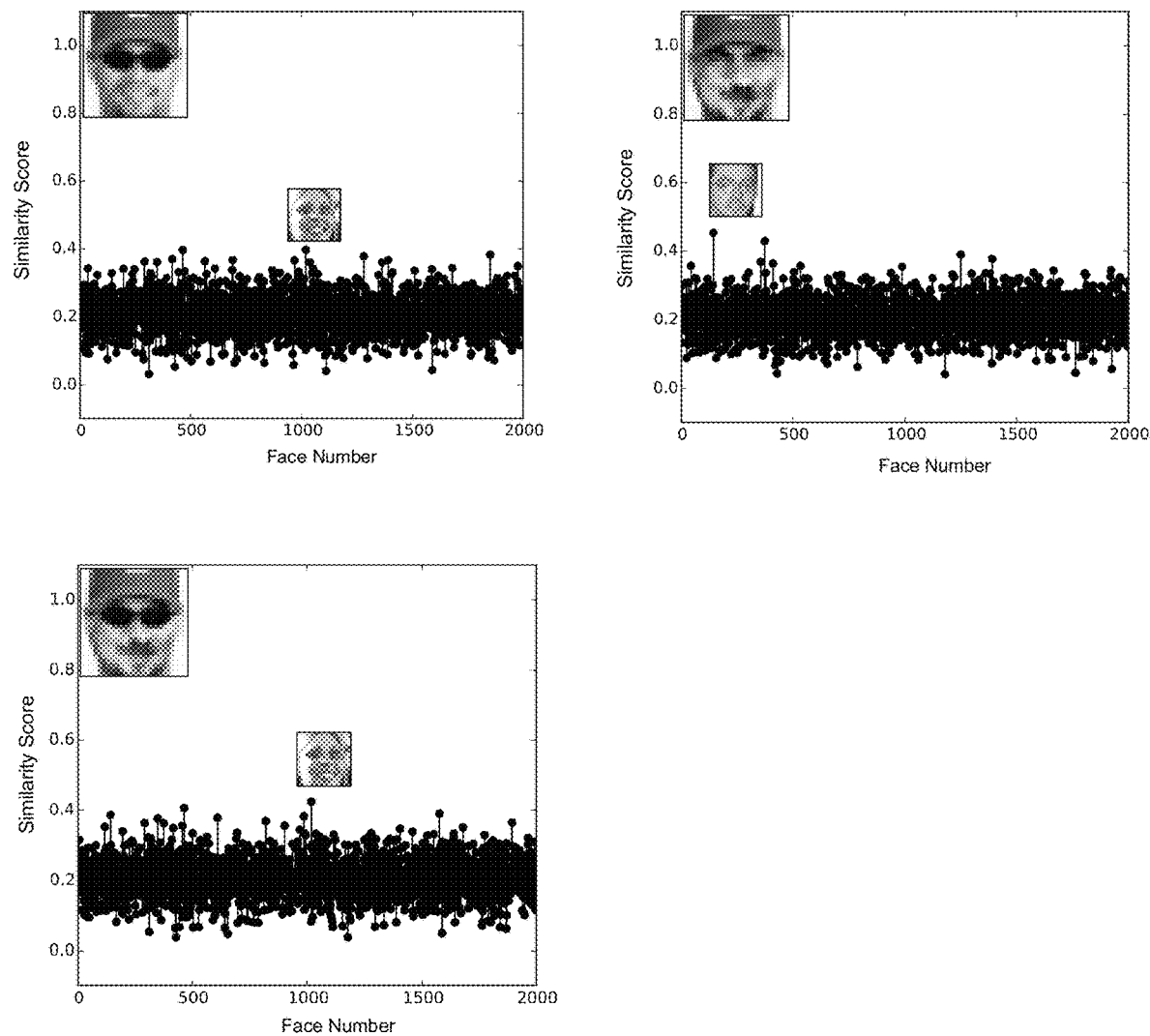
FIG. 23 shows the identification of a face in a pseudo-image library but with added facial accessories, including a pair of sunglasses, a mustache, or both, as in FIG. 17. K equaled 500 for this figure, instead of 1,500 as in FIG. 17. In contrast to FIG. 17, wrong faces were identified.
Figure 24:
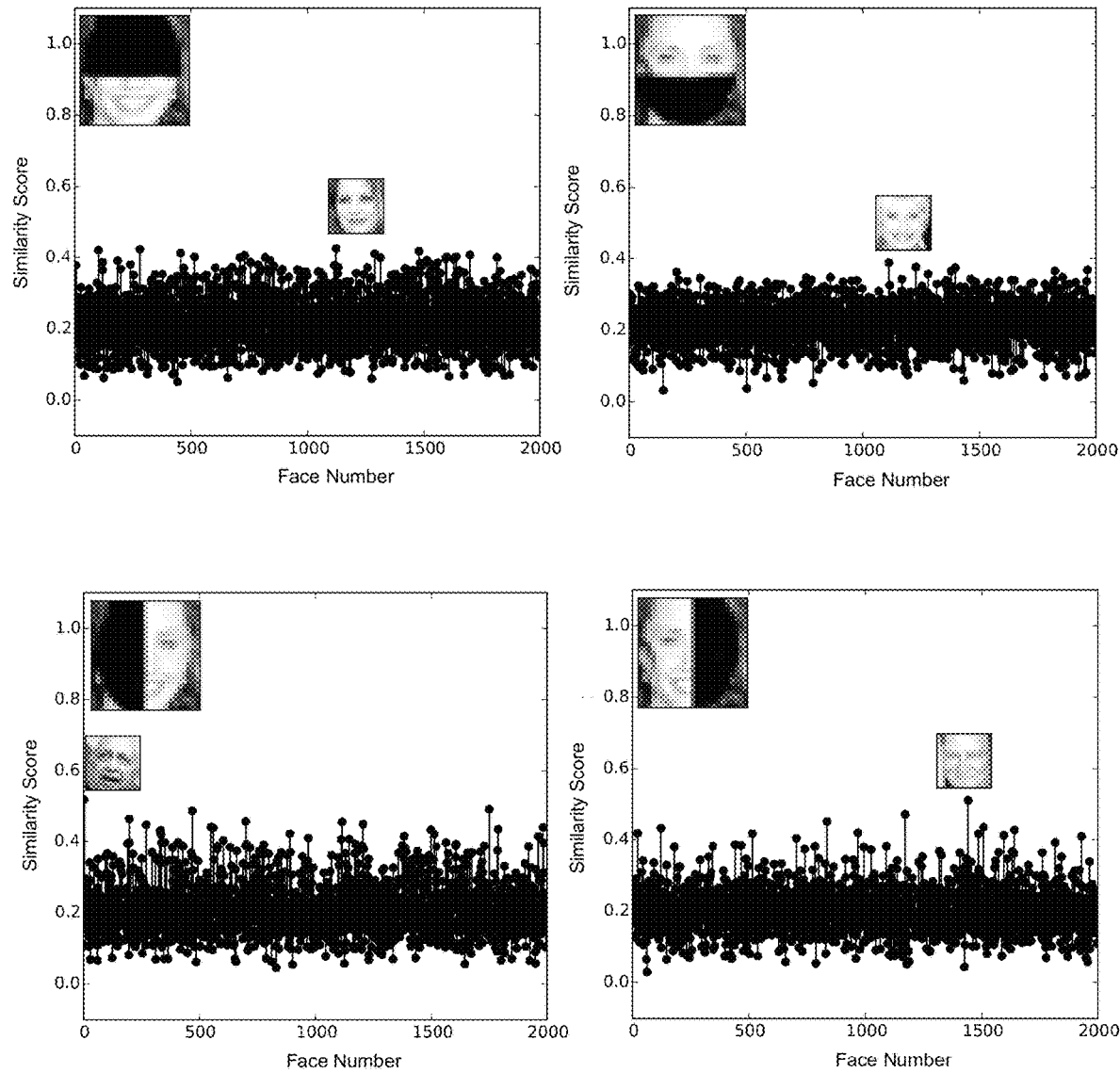
FIG. 24 shows the identification of a female face in a pseudo-image library but with different parts of her face obscured as in FIG. 18. K equaled 500 for this figure, instead of 1,500 as in FIG. 18. In contrast to FIG. 18, wrong faces were identified in all cases.
Figure 25:
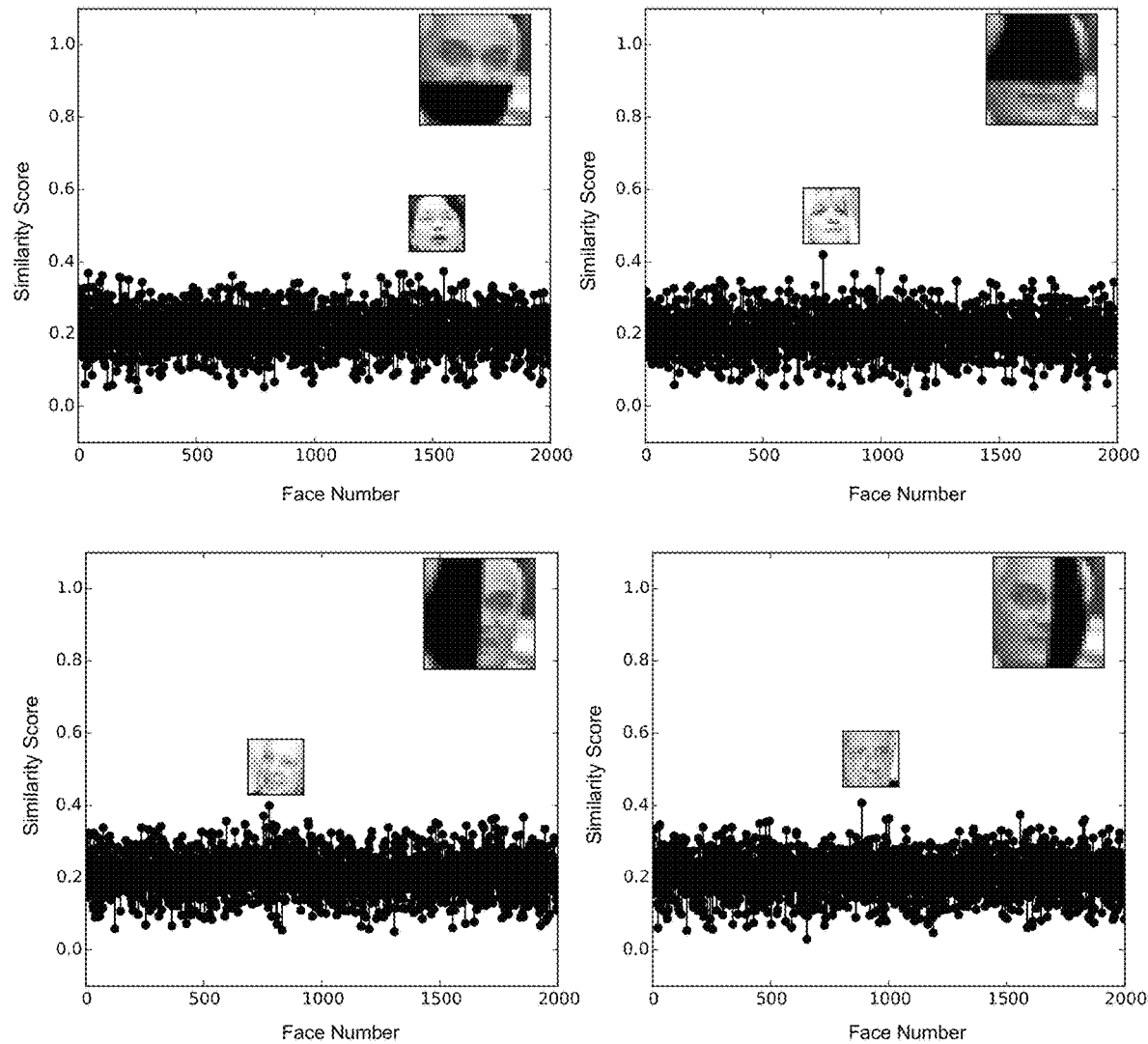
FIG. 25 shows the identification of a male face in a pseudo-image library but with different parts of his face obscured as in FIG. 19. K equaled 500 for this figure, instead of 1,500 as in FIG. 19. In contrast to FIG. 19, wrong faces were identified.

Specifically, FIGS. 20 and 21 correspond to FIGS. 14 and 15 of Example 3, FIG. 22 corresponds to FIG. 16 of Example 4, FIG. 23 corresponds to FIG. 17 of Example 5, and FIGS. 24 and 25 correspond to FIGS. 18 and 19 of Example 6. The same procedures and training set as in Example 1 were used except that for this example, K was 500 instead of 1,500 and thus, although the pseudo-image library still had 2,000 pseudo-images, the pseudo-images were different because K was different.

As can be seen in FIGS. 20-25, the wrong face was identified in each case thus illustrating the lack of robustness in identifying imperfect images when the K/M and K/R values were less than 1.0.

Example 8

This example illustrates the ability to achieve even greater robustness in image recognition performed on imperfect first-images by increasing the value of K and thus the values of K/M and K/R.

Figure 26:
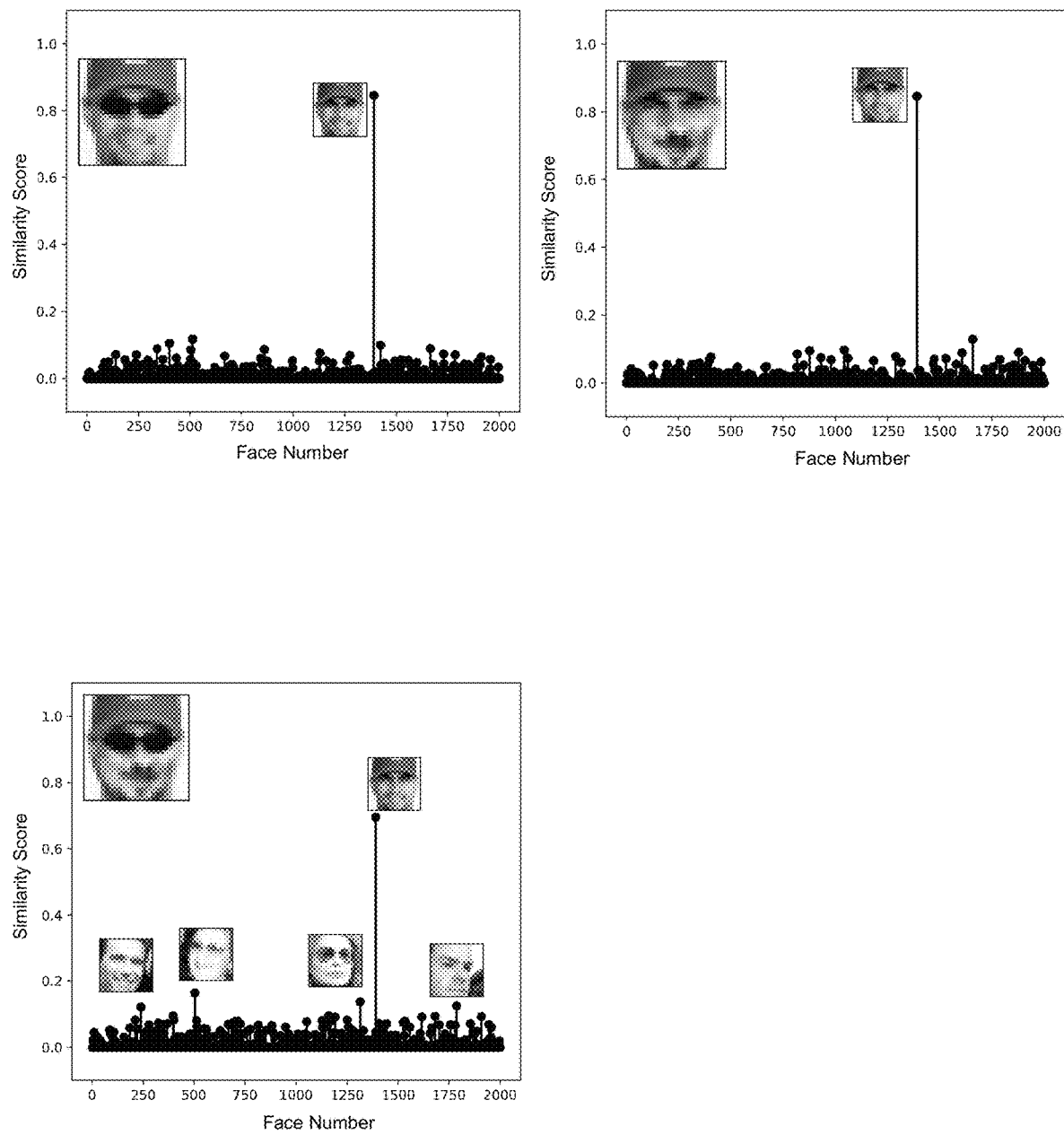
FIG. 26 shows the identification of a face in a pseudo-image library but with added facial accessories, including a pair of sunglasses, a mustache, or both, as in FIG. 17 and FIG. 23. K equaled 2,500 for this figure and the correct face was identified with a substantially higher similarity score in all cases compared to other faces in the library.
Figure 27:
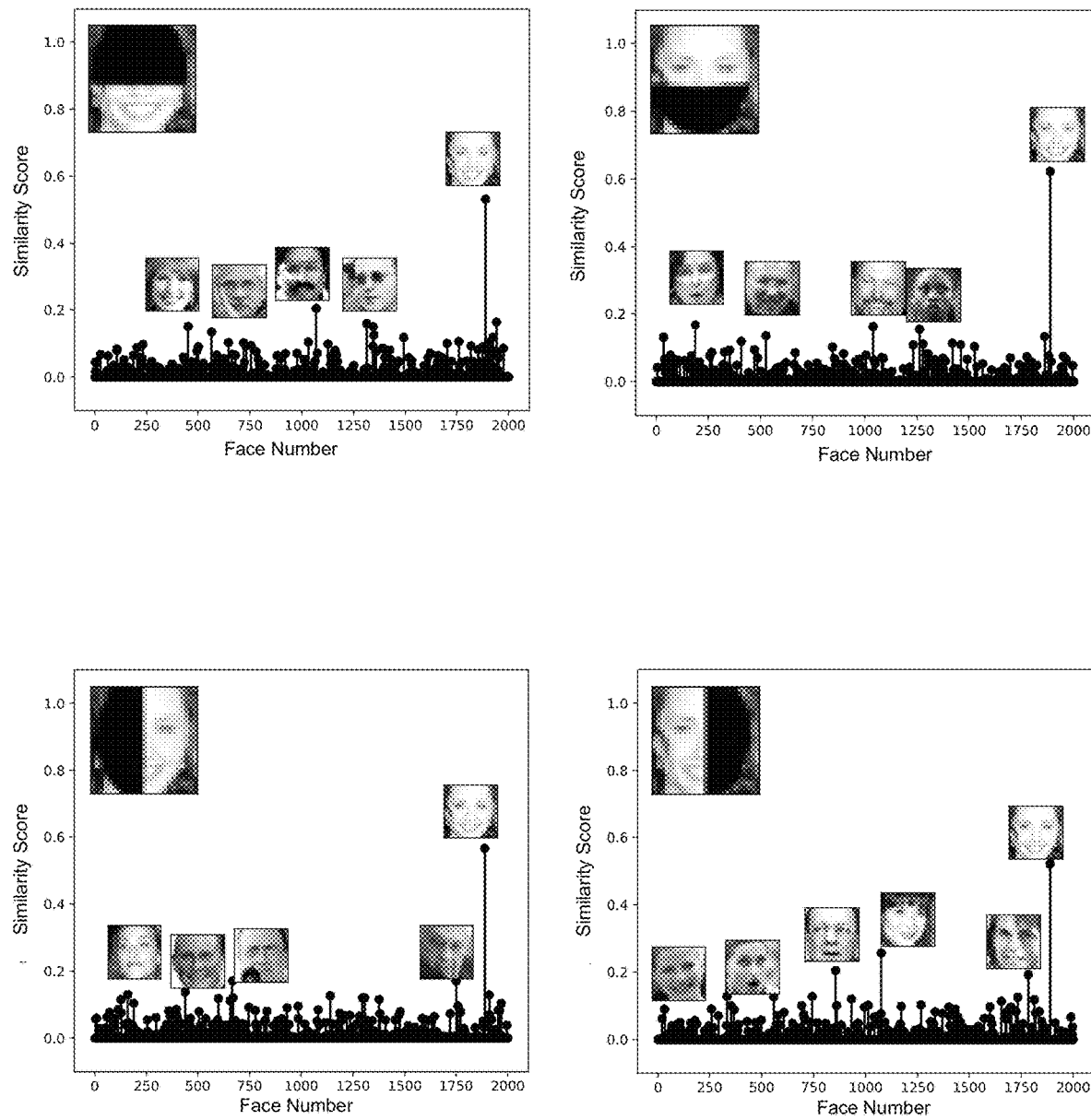
As shown in FIG. 27, when K was increased to 2,500, the correct face was identified in all four cases.

Example 5 and the female face of Example 6 were repeated with K equal to 2,500 instead of 1,500, so that the K/M and K/R ratios were each 4.0 instead of 2.4. FIGS. 26 and 27 show the results of the analysis.

As can be seen in these figures, the similarity score for the correct face is now much greater than the nearest runner up, i.e., the contrast between similarity scores is greater. Compared to FIGS. 17 and 18 where K was 1,500, the correct face for FIGS. 26 and 27 with K equal to 2,500 now stands substantially alone in terms of similarity score. Also, for the female face of Example 6, the correct face is now identified irrespective of the part of the face that is obscured. It has been found that female faces tend to be more difficult to identify than male faces and thus may require somewhat larger K/M and/or K/R values for robust identification as the results of this example and Example 6 illustrate.

Example 9

This example illustrates the ability of the technique to perform facial recognition for people who are not in the training set.

Figure 28:
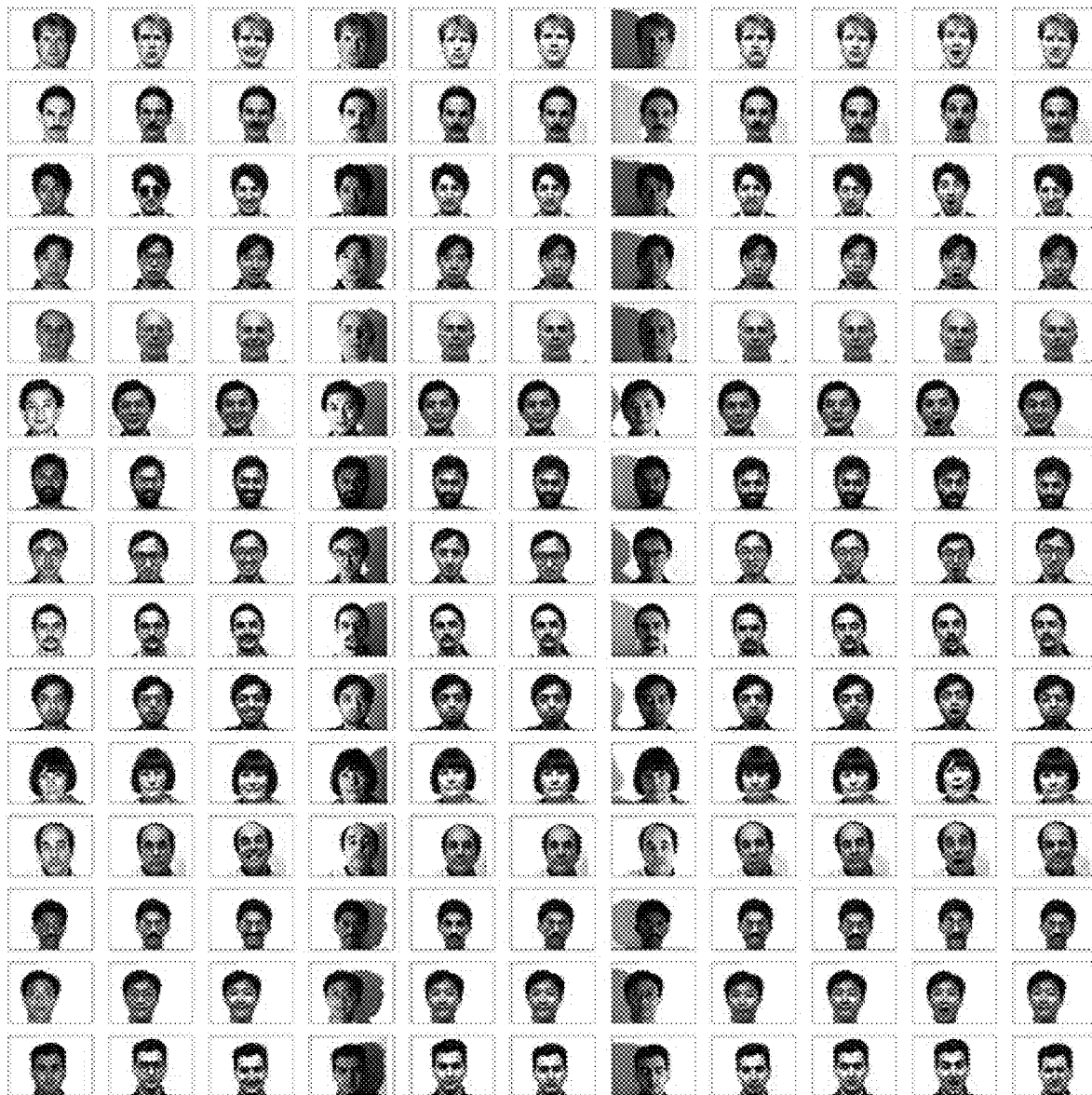
FIG. 28 shows a set of faces that were not in the training set used to produce the pseudo-image library of Example 1. The faces were from the Yale face image database. Faces for 15 different individuals with 11 different facial expressions and lighting conditions for each face are shown in this figure.

The images used were from the Yale facial image database which can be found at http://cvc.cs.yale.edu/cvc/projects/yalefaces/yalefaces.html. Specifically, 15 individuals, each having 11 different facial expressions or lighting conditions, were used. FIG. 28 shows the 165 faces that were used. Each row in FIG. 28 is for a different individual with the different facial expressions or lighting conditions for that individual being shown as one moves across a row.

Each facial image in FIG. 28 was treated as a first-image-of-interest and was transformed into a pseudo-image-of-interest using the same procedures and training set as in Example 1 but with K equal to 2,500 instead of 1,500 thus making the K/M and K/R ratios 4.0 instead of 2.4. The similarly scores between the resulting pseudo-images-of-interest taken as pairs were then calculated.

Figure 29:
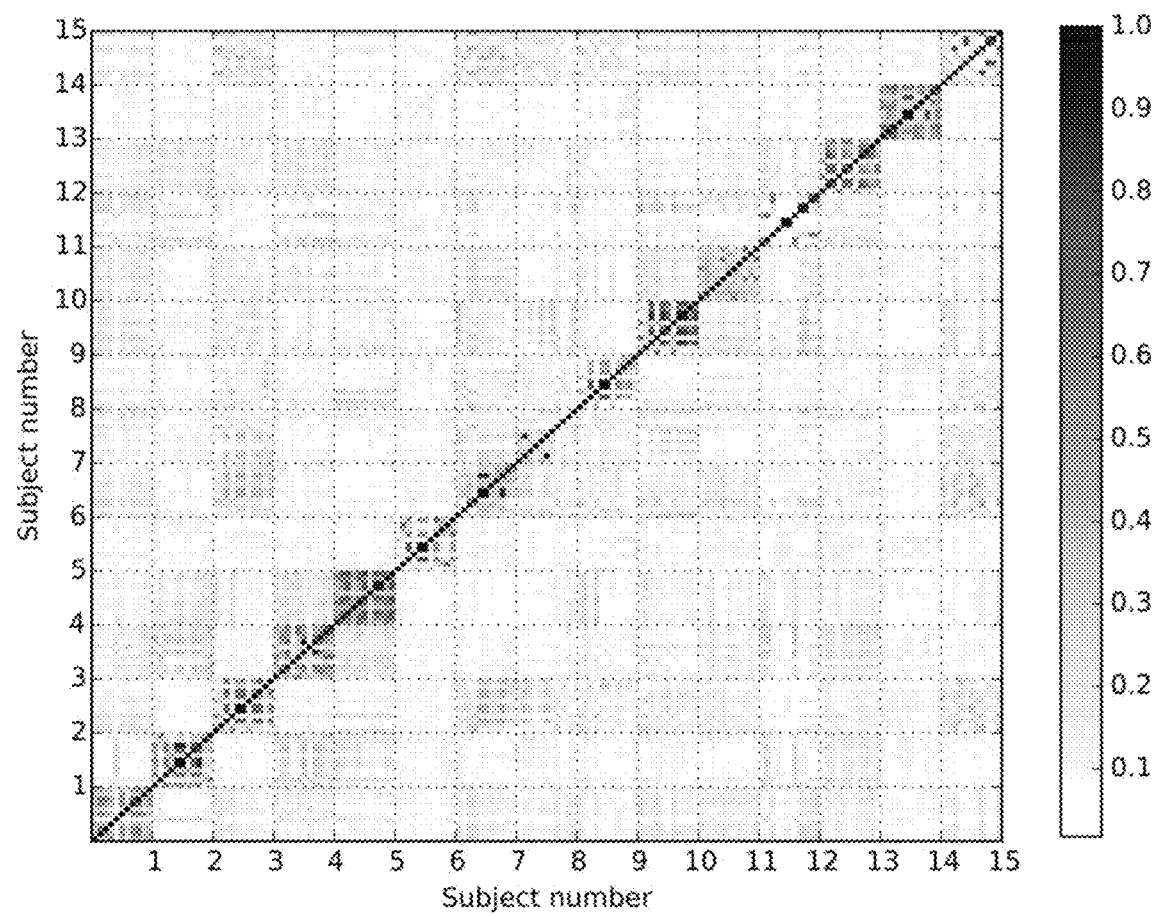
FIG. 29 illustrates the identification of the faces shown in FIG. 28 using the predetermined transformation matrix of Example 1. The graph shows the pairwise similarity scores between pairs of pseudo-images for the faces from the Yale database of FIG. 28. Dark grayscales indicate high similarity scores. Faces belong to the same person are grouped and indicated by the number along the axes. The graph shows that despite different facial expressions and lighting conditions, faces belonging to the same person are highly similar in their pseudo-images, but not those belonging to different persons.

FIG. 29 shows the pairwise scores among the 15 individuals and their 11 faces (a total of 27,225 comparisons). Darker grayscales indicate higher similarity scores. Faces belong to the same person are grouped and indicated by the number along the axes. The groupings along the diagonal in this figure show that a given person has high similarity scores between his/her own facial images even with different expressions and lighting conditions. On the other hand, the similarity scores between pseudo-images of different people are low. The graph thus shows that despite different facial expressions and lighting conditions, faces belonging to the same person are highly similar in their pseudo-images, but are not similar to those belonging to a different person.

Figure 30:
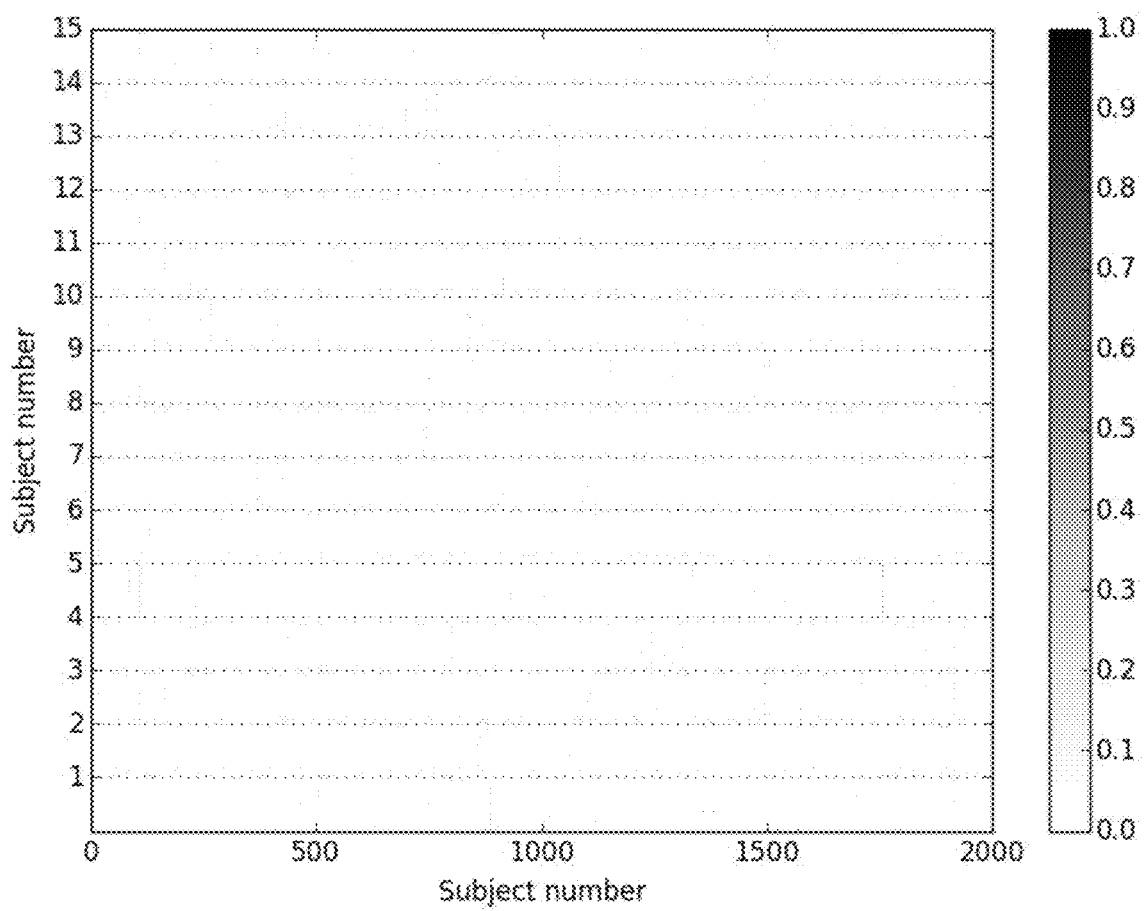
FIG. 30 illustrates the pairwise similarity scores between the pseudo-images for faces from the Yale database of FIG. 28 and pseudo-images for the faces of the training set of Example 1. In contrast to the similarity of the pseudo-images of the Yale faces belonging to the same person, the Yale faces exhibit little similarity to those in the training set.

FIG. 30 shows the similarity scores between the pseudo-images for the faces from the Yale database of FIG. 28 and the pseudo-images for the faces of the training set of Example 1. The similarity scores between the pseudo-images for these two sets of unrelated faces are low.

Thus, the technique is able to determine if a given individual is or is not part of a pseudo-image library and is also able to group first-images of a particular individual having different facial expressions and different lighting conditions even if that individual was not part of the training set used to generate the predetermined transformation matrix used in producing pseudo-images.

Example 10

This example illustrates the ability of the technique to perform recognition of symbols.

FIG. 31 shows 1,000 letters and characters from world languages. These 1,000 symbols were used as a training set (i.e., N=1000) to produce a predetermined transformation matrix $\Phi$ with 800 dictionary elements (i.e., K=800), which was then used to produce pseudo-images for the English capital letter "H" and a Chinese "bing" character, with and without adulteration.

Each of the symbols of the training set, as well as the "H" and the "bing" character used in the tests, had 256 pixels (i.e., M=256), giving a K/M ratio of 3.1 for the $\Phi$ matrix. The predetermined transformation matrix thus transformed each symbol from a 256-dimensional space to an 800-dimensional space. The rank of the X matrix as determined using the MATLAB RANK( ) function referred to above in Example 1 was 253, so the K/R ratio was 3.2. The A matrix produced during the calculation of $\Phi$ was used as the pseudo-image library (S=1,000) for comparison with the pseudo-images of the "H" letter and the "bing" character, both in their adulterated and unadulterated forms. As in the prior examples, Algorithm 1 was used to generate the $\Phi$ matrix and Algorithm 2 was used in transforming first-images into pseudo-images.

Figure 32:
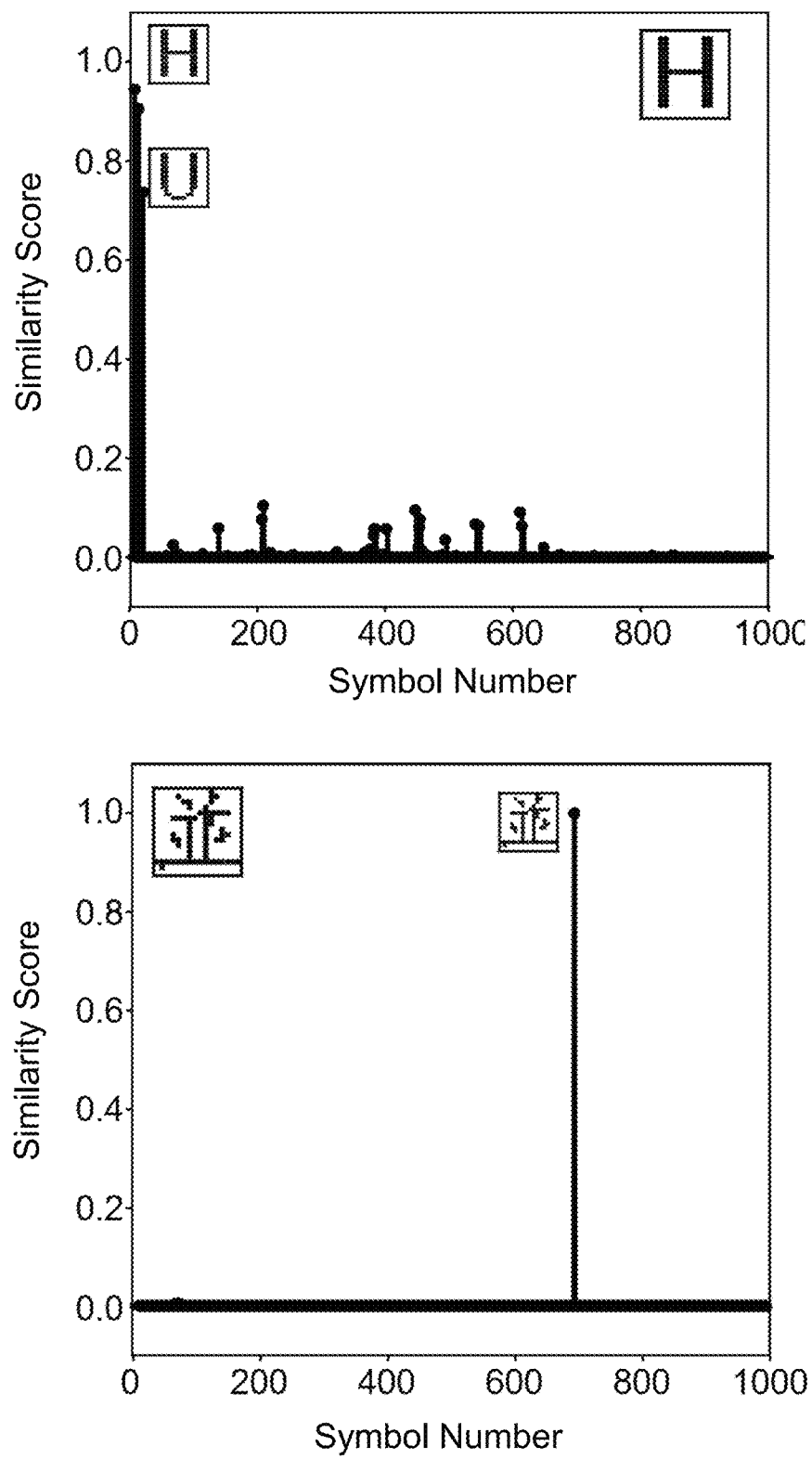
FIG. 32 illustrates the generation of pseudo-images for the symbols of the training set of FIG. 31 and the similarity scores of the pseudo-images for the capital letter "H" and a Chinese "bing" character with those pseudo-images used as a pseudo-image library. K equaled 800 for this figure.

FIG. 32 shows the results for the unadulterated letter "H" (top panel) and unadulterated "bing" character (lower panel). The similarity scores shown in this figure are the values of the $\cos(\theta)$ function for the element weights of the pseudo-image-of-interest versus the element weights of the pseudo-images of the pseudo-image library. As can be seen, the correct letter/character was found in each case. The second highest similarity score in the case of the English capital letter "H" was the Greek capital letter "eta" which appears in the third row, last column of FIG. 31. As can be seen, the differences between this Greek letter and the English letter are minimal and yet the image recognition procedures disclosed herein were able to distinguish between these two letters.

Figure 33:
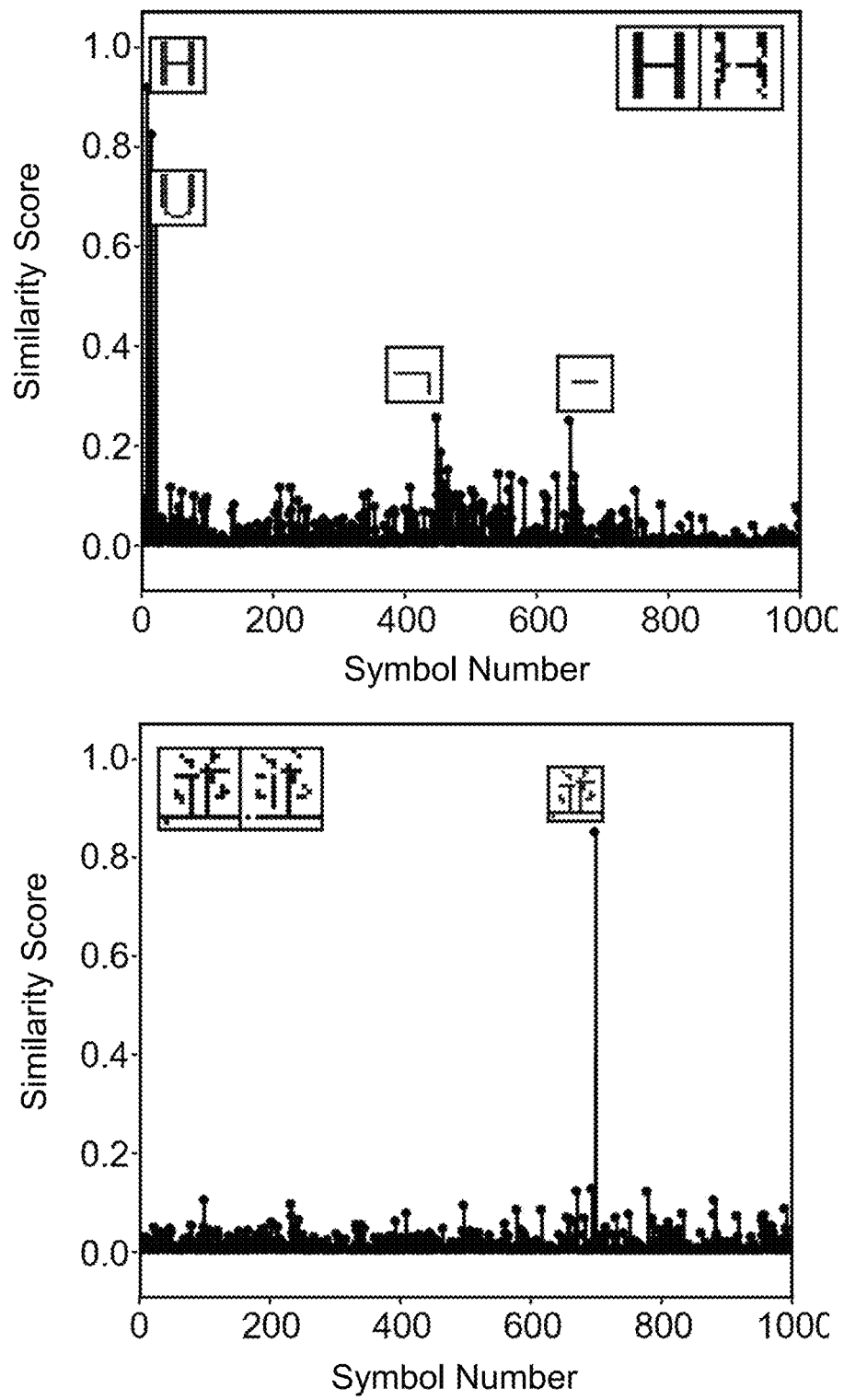
FIG. 33 illustrates the identification of the capital letter "H" and a Chinese "bing" character when the letter and the character were corrupted by missing pixels (shown next to the original symbol). K equaled 800 for this figure. The similarity scores between the pseudo-images for the corrupted letter/character and each of the pseudo-images in the pseudo-image library are shown. The correct letter/character was identified.

FIG. 33 shows the results for corrupted first-images, specifically, first-images where pixels are missing (pixel value set equal to zero). Again, the procedure readily identified the correct letter/character notwithstanding the corruption of the image.

Figure 34:
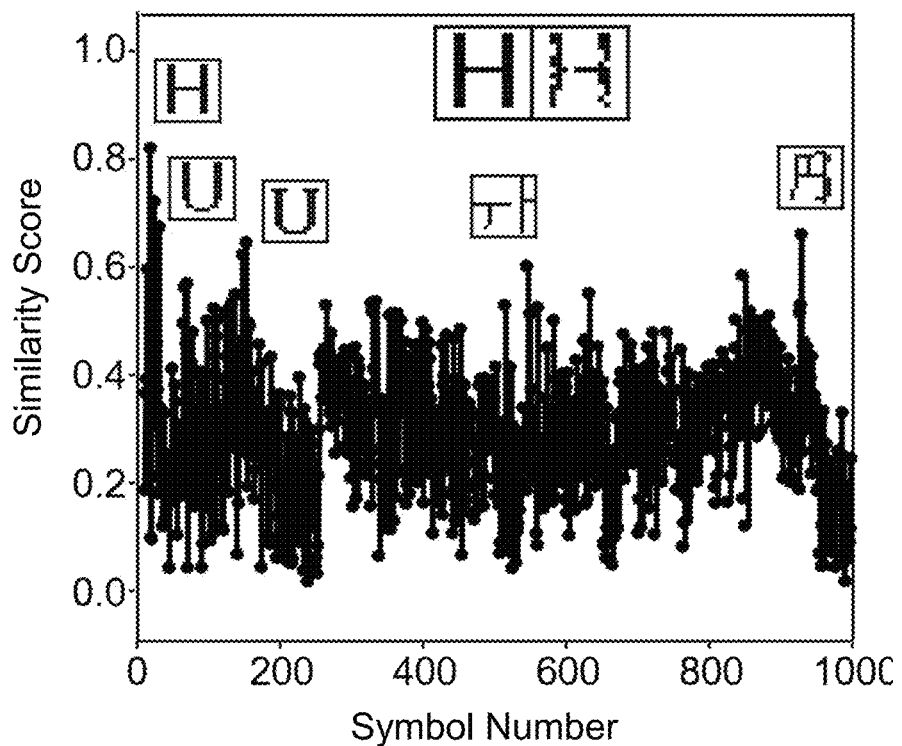
FIG. 34 illustrates the identification of the capital letter "H" and a Chinese "bing" character when the letter and the character were corrupted by missing pixels (shown next to the original symbol). The corruption was the same as in FIG. 33. K equaled 100 for this figure. The correct symbols were identified but many pseudo-images now have high similarity score values.
Figure 34:
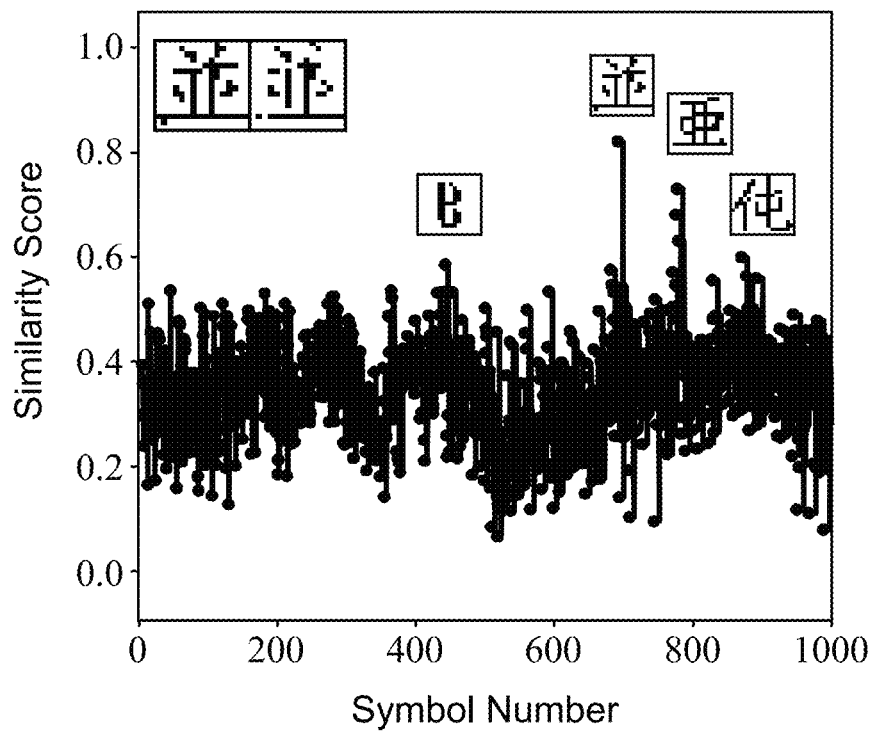

As noted above, for binary images, such as the symbols of FIG. 31, the requirements on K for robust image recognition can often be relaxed. This effect is illustrated in FIG. 34 which repeats FIG. 33 but with K equal to 100, instead of 800. Thus, instead of the K/M ratio of 3.1 and the K/R ratio of 3.2 of FIG. 33, FIG. 34 had K/M and K/R ratios of only 0.4.

As can be seen in FIG. 34, the procedure was able to identify the corrupted letter "H" and the corrupted "bing" character even with this low value of K. Compared to FIG. 33, the robustness was plainly compromised as evidenced by the large number of symbols with substantial similarity scores, but the system was still robust enough to find the correct symbol.

Figure 35:
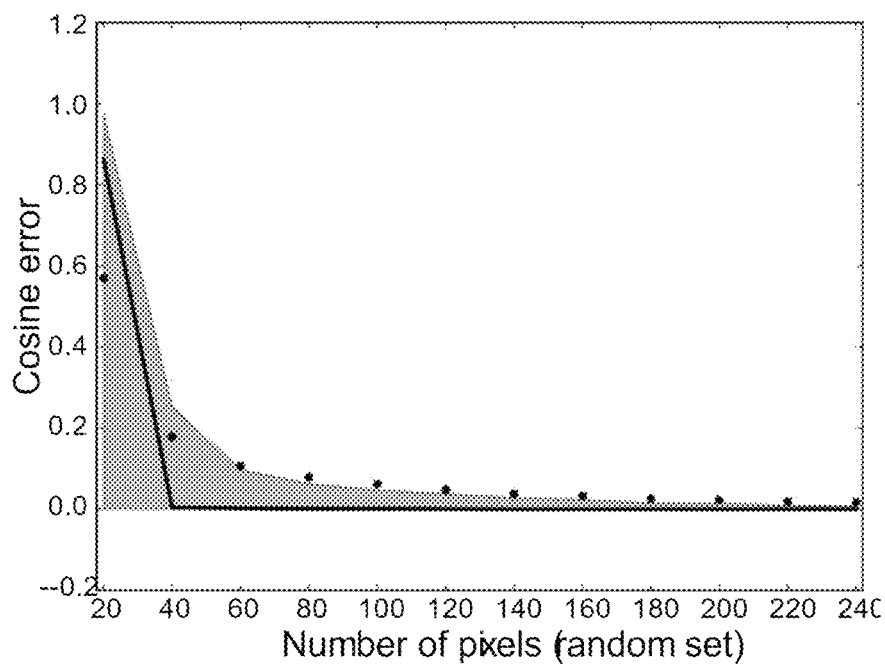
FIG. 35 shows the cosine error rates (1-cosine distances) using K equal to 800 (top panel) vs. K equal to 100 (bottom panel) for images composed of varying numbers of pixels randomly selected from an original image. The drop in error rate with increasing numbers of pixels is faster for the larger K value.
Figure 35:
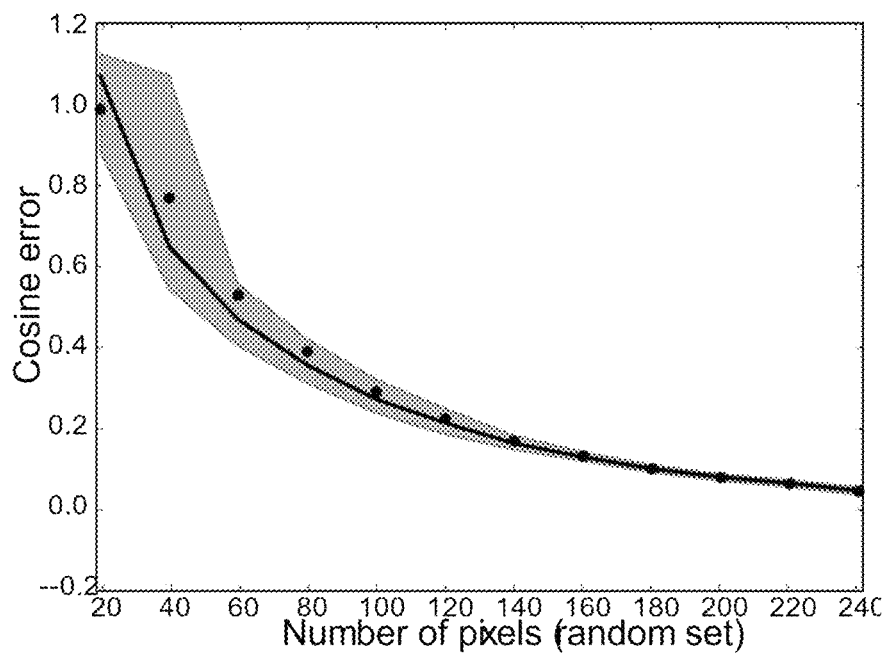

FIG. 35 further characterizes the effect of changing K from 800 to 100. The panels of this figure plot the error, in particular, the value of $1-\cos(\theta)$, between the pseudo-image-of-interest and the correct pseudo-image as a function of the number pixels in the first-image-of-interest. Specifically, random sets of pixels from each of the 1,000 symbols of FIG. 31 were used as first-images-of-interest, these first-images-of-interest were converted to pseudo-images-of-interest, and then those pseudo-images-of-interest were compared with the pseudo-image for the unadulterated symbols. The number of pixels in the random sets is plotted along the horizontal axis and the $1-\cos(0)$ values along the vertical axis. Specifically, the data points are the means for the 1,000 symbols, the solid line is for the medians, and the shading is for the variances for the cosine error. The upper panel is for K=800 and the lower panel is for K=100.

As can be seen in the lower panel of FIG. 35, even for K=100, the likelihood of a correct identification is greater than ~80% when the number of pixels is greater than ~50% of the total number of pixels. For K=800, the robustness is remarkably better, with the median correct identification reaching 100% with only 40 out of 256 pixels (15.6%) being present in the first-image-of-interest. This result illustrates the unexpected power (unexpected robustness) of using pseudo-images and, in particular, pseudo-images where first-images-of-interest have been transformed into a higher dimensional space, to perform image recognition.

Example 11

This example compares the de novo and sequential approaches for creating an augmented predetermined transformation matrix. As first-images, it used the 1,000 letters and characters of FIG. 36 (N=1,000), each of which was a 16×16 array of binary pixels (M=256). The value of K used in this example was 1,000, thus giving a K/M ratio of 3.9.

The M×K dimension predetermined transformation matrix was calculated in two ways. First, all of the letters and characters of FIG. 36 were used at one time, as would be done when using the de novo approach for augmenting a predetermined transformation matrix. Algorithm 1 was used to calculate the predetermined transformation matrix.

Figures 36, 37:
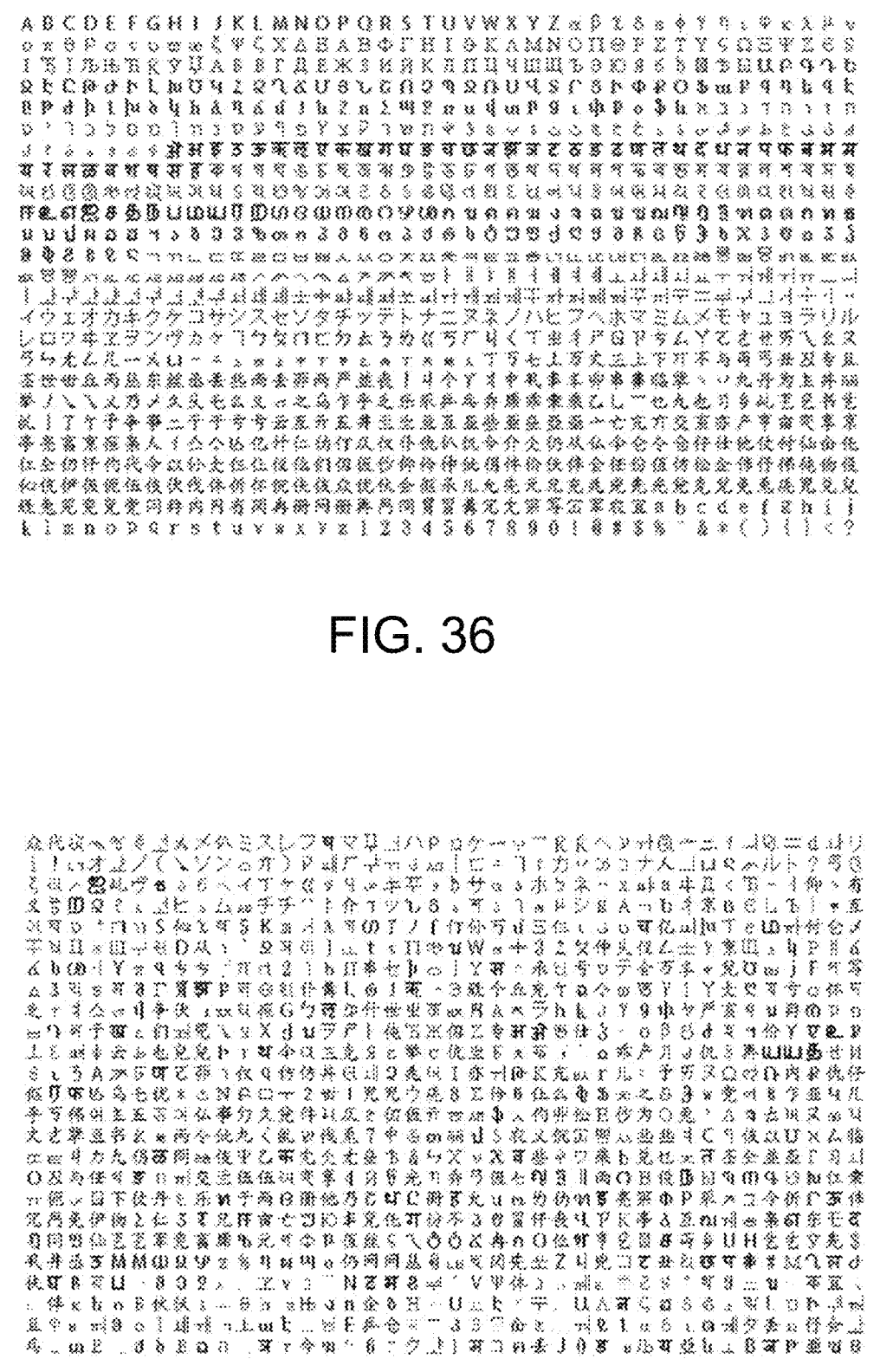

Second, the letters and characters of FIG. 36 were used one after another as an extreme example of the sequential approach. Algorithm 1 was used for the first letter/character and thereafter Algorithm 3 was repeatedly used (999 times) with the predetermined transformation matrix of the last calculation being used as the existing predetermined transformation matrix for the following calculation.

Figures 38, 39:
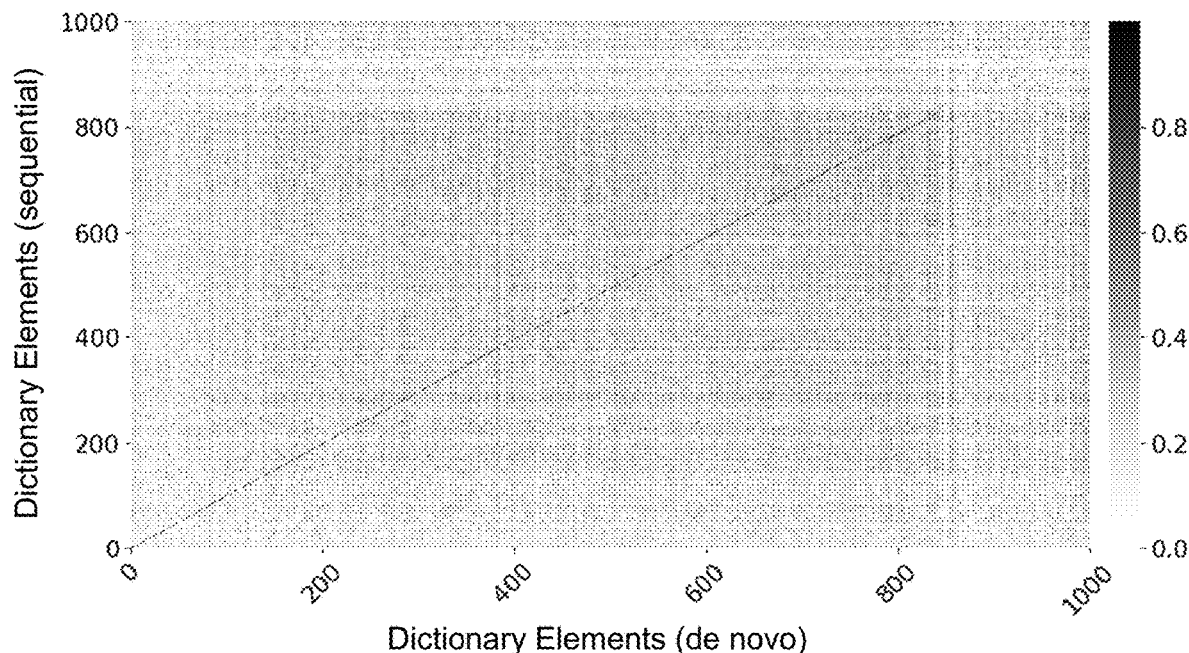
FIG. 38 shows the dictionary elements (K=1,000) produced using the sequential approach for creating an augmented predetermined transformation matrix. Each of the dictionary elements is a 16×16 array of binary pixels (M=256).
FIG. 39 shows cosine similarity between the dictionary elements of FIG. 37 produced by de novo learning and the dictionary elements of FIG. 38 produced by sequential learning.

The resulting 1,000 dictionary elements for the two approaches are shown in FIGS. 37 and 38, where FIG. 37 is for the de novo approach and FIG. 38 is for the sequential approach. A visual inspection reveals the high level of similarity between the dictionary elements of the predetermined transformation matrices calculated by the two approaches.

FIG. 39 quantifies the similarity between the dictionary elements of FIGS. 37 and 38. Specifically, this figure plots cosine similarity between dictionary elements learned from sequential learning and from de novo learning. The heatmap indicates the pair-wise similarity score between the two learning methods. High scores (darker color) indicate high levels of similarity. The diagonal dark line indicates nearly identical elements. As can be seen, the two learning approaches produced nearly identical sets of dictionary elements for the first ~50 elements. The last 150 or so were more different is believed that this is because the first 850 elements likely captured all the important feature combinations with the last 150 or so only improving accuracy and not being required for robustness.

Figure 40:
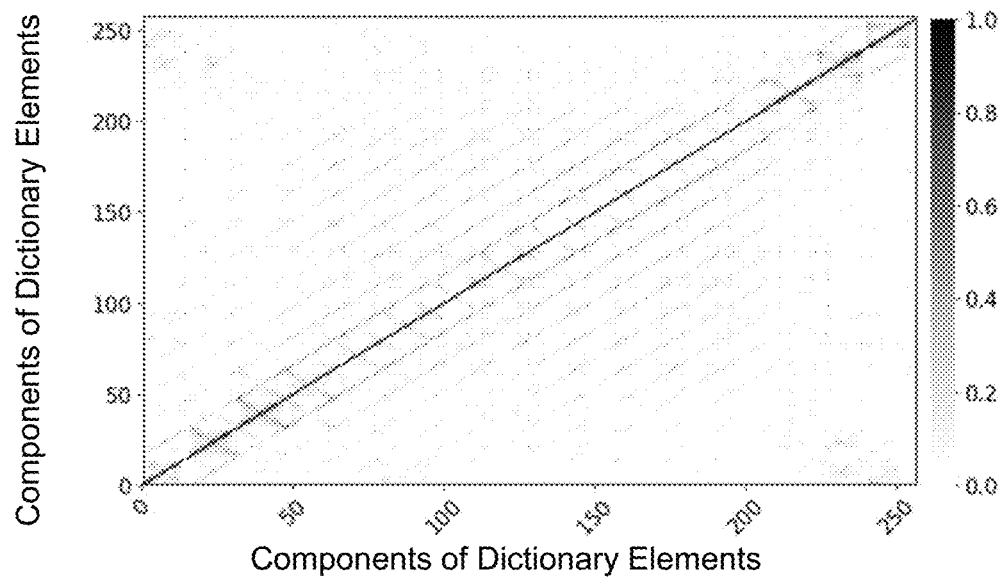
FIG. 40 shows pairwise correlations between the components of the dictionary elements of FIG. 38 produced by sequential learning.
Figure 41:
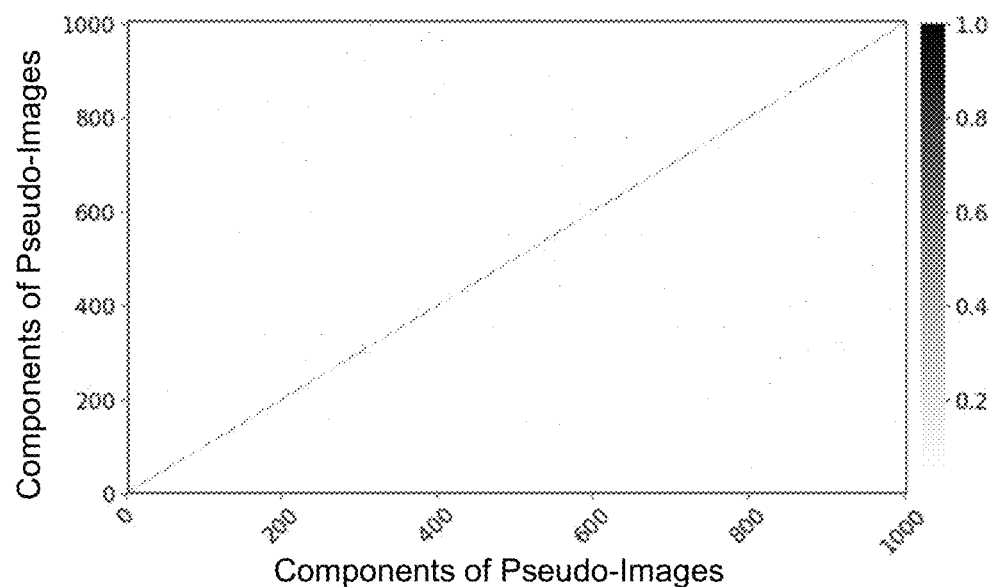
FIG. 41 shows pairwise correlations between components of pseudo-images for the first-images of FIG. 36 where the pseudo-images were produced by sequential learning.

FIGS. 40 and 41 illustrate further characteristics of the predetermined transformation matrix obtained using the sequential approach. FIG. 40 is a plot of pairwise correlations between the 256 components of the dictionary elements of the predetermined transformation matrix. The presence of substantial off-diagonal values indicates substantial information content in individual components of the dictionary elements, as is desirable for robust image recognition. FIG. 41 is a plot of pairwise correlations between the components of the pseudo-images produced using the sequential approach for the training set (FIG. 36). The lack of substantial off-diagonal values indicates that the first-images have substantially unique representations when transformed into pseudo-image space, as is desirable for robust image recognition.

Industrial Applicability

As discussed above, one of the main applications for the image recognition techniques and associated computer systems disclosed herein is in human facial recognition. In connection with this application, in an embodiment, the facial recognition techniques disclosed herein can be used to identify a person using captured images from image capturing devices, such as cameras and video recorders, and one or more databases to retrieve relevant information. For example, in the setting of a security checkpoint, a person walking through the checkpoint may be identified directly from a facial image. Alternatively, the image recognition techniques disclosed herein can be used to identify a person from a body image or a sequence of images that captures the gait structure of the person. As further alternatives, combinations of two or more of facial image data, body image data, and gait data can be used to identify a person.

In implementations of these types, a person will be identified without having to produce personal identification. Such implementations will reduce the need for other forms of identification. In the case of the criminal justice system, facial images, body images, and/or gait images can be used with an existing criminal database to identify the perpetrator of a crime or to determine whether a known criminal was present at a specific location at a specific time. In the case of consumer identification, a returning customer walking into a store may be recognized to allow a sales clerk to recommend products based on the customer's purchase history. In an e-commerce setting, the disclosed technology can allow the use of facial images, body images, gait images or combinations thereof as identification, thereby removing the need for other forms of identification. With the person's identify known, the person's credit or debit account may be directly billed, thus removing the need for cash or credit or debit cards.

In addition to facial recognition, the disclosed technology can be used in other forms of imaging. For example, an image of an animal or other living object (e.g., plant, cell, organ, tissue, or virus) can be treated in the same way as a facial image to produce a pseudo-image which can then be compared with a library (database) of known pseudo-images. The images that are analyzed can be produced by medical imaging devices, such as, MRI, fMRI, X-ray, CT, and similar devices. Images produced by microscopes, e.g., images of blood and tissue samples, can also be used as original-images, as well as images in the form of sequences (e.g., genetic sequences) or in the form of traces (e.g., EKG and EEG traces). The results of the comparison of pseudo-images-of-interest with a pseudo-image library can, for example, be used as part of the diagnosis of diseases and/or in medical procedures.

Other applications of the technology disclosed herein include use of a person's signature, retina, fingerprints, or other biometrics, either separately or in combination, for biometric recognition purposes. Assemblies of objects (e.g., collages created by artists) can be treated the same way as facial images. Indeed, pseudo-images can be used to authenticate the work of an artist or to establish the authenticity of objects, e.g., modern or antique furniture, alleged to have been produced by a particular manufacturer.

The disclosed methods can be applied to military situations to provide high confidence recognition of potential threats and to distinguish friendly and hostile installations under highly variable conditions. For example, the method can be applied to identify enemy tanks under conditions such as fog, sandstorm, smoke, twilight or night, with the tanks being camouflage or partially hidden.

The disclosed methods can be used in remote sensing using, for example, images acquired through sensors that detect patterns not directly visible to human eyes. For example, sonar or infrared spectral images can be used to, for example, recognize mineral, gas, or oil deposits.

More generally, it will be apparent to those skilled in the art that the disclosed image recognition techniques can be used in all forms of machine vision. For example, the disclosed methods can be applied to images or image sequences to identify vehicles, obstacles, traffic signs and passage conditions in an autonomous robotic device, vehicle, or vessel, and inform a central decision maker (e.g., a computer) of existing conditions. The disclosed methods can be used for the identification of faulty parts in mechanical, electrical, and electronic manufacturing. For example, using pseudo-images for faulty vs. intact electronic circuits, the disclosed methods can be used to correctly and rapidly identify defective circuits.

Not only can the techniques be used on still images, but they can be used to recognize a person, animal, object, or pattern in an image sequence by considering the images captured in the sequence as a concatenated image. That is, a sequence of images of an object-of-interest can be concatenated or transformed into a new image, and that new image can be subject to transformation and analyses using the disclosed methods.

Pseudo-images can also be combined to construct new first-images which can then be transformed into new, higher-level, pseudo-images. This multi-layer approach can, for example, be used in artificial intelligence applications of the image recognition techniques disclosed herein. As just one example, in a quality control setting, using pseudo-images for the parts of a finished machine, a manufacturer can determine if all the parts have been included in a particular finished machine by (i) combining the pseudo-images for the parts into a first-image, (ii) obtaining a pseudo-image for that first-image, and (iii) comparing that pseudo-image with a pseudo-image of the actual finished machine to determine if all the parts are present.

The disclosed techniques can be used in conjunction with search engines to facilitate learning, identify people and objects, and retrieve relevant information. For example, search engines can be used to generate libraries of pseudo-images which can then be compared with an image captured by an image-capturing device. The search engine can respond to queries by identifying the person or object that is the subject of the query. In one scenario, a person may obtain an image of a plant and send the image to a search engine, which will then return the properly identified plant and associated information. In another scenario, an image of a person whom the subject may wish to learn more about may be sent to a search engine, which will then return the desired information. For example, in a social setting, the information retrieved can be simply a quick reminder of the time and circumstances when an earlier encounter with the person occurred. In these and other applications, images produced by an image-capturing device associated with a computer (e.g., the camera of a smartphone or a camera incorporated in a pair of glasses) can be used to search an existing database (from a search engine provider or a personal database stored on the device) in real time to retrieve desired information through the medium of a pseudo-image comparison.

Features of the Disclosure

Based on the foregoing, in addition to the six aspects of the disclosure set forth above in the Summary and General Description, the invention includes, but is not limited to, the following features. The six aspects and the following features, as well as their various paragraphs and subparagraphs, can be used in any and all combinations.

Feature 1: A method comprising:

(a) receiving an image in a computer system;

(b) using the computer system to perform a sparse, non-negative transformation of the image into a pseudo-image using a predetermined transformation matrix;

(c) using the computer system to compare the pseudo-image with a library of pseudo-images of known images; and (d) using the computer system to output the results of the comparison of the pseudo-image with the library of pseudo-images of known images;

wherein the image has M components, the pseudo-image has K components, and K is greater than or equal to M.

Feature 2: A method comprising:

(a) receiving an image in a computer system;

(b) using the computer system to perform a sparse, non-negative transformation of the image into a pseudo-image using a predetermined transformation matrix;

(c) using the computer system to compare the pseudo-image with a library of pseudo-images of known images; and (d) using the computer system to output the results of the comparison of the pseudo-image with the library of pseudo-images of known images;

wherein the image has M components each of which has only one of two possible values.

Feature 3: The method of Feature 1 or 2 wherein the computer system performs the sparse, non-negative transformation using at least one $L_2$ norm.

Feature 4: The method of Feature 1, 2, or 3 wherein the predetermined transformation matrix is a matrix obtained by a method comprising using a computer system to perform a sparse, non-negative factorization of a matrix of training images.

Feature 5: The method of Feature 4 wherein the matrix of training images is an M×N matrix where N is greater than or equal to M.

Feature 6: The method of Feature 4 or 5 wherein the computer system performs the sparse, non-negative factorization using at least one Frobenius norm.

Feature 7: The method of any prior Feature wherein the image of step (a) is a pre-processed image.

Feature 8: The method of any prior Feature wherein the computer system performs the comparison of step (c) using at least one of a Euclidean distance and a cosine distance.

Feature 9: The method of any of Features 1, 3, 4, 5, 6, 7, 8, or 9 wherein the image of step (a) comprises a human face.

Feature 10: A method of performing computer-implemented image recognition comprising:
 (a) providing to one or more computer processors a first-image having M components;
 (b) providing to the one or more computer processors a predetermined transformation matrix, wherein:
  (i) the predetermined transformation matrix is an M×K matrix in which the K columns constitute a set of K dictionary elements, and
  (ii) the predetermined transformation matrix is constructed by a method comprising performing a sparse, non-negative factorization of an M×N matrix in which the N columns constitute a set of N training images, each training image having M components, the sparse, non-negative factorization employing at least one Frobenius norm;
 (c) constructing, using the one or more computer processors, a pseudo-image for the first-image using the predetermined transformation matrix to perform a sparse, non-negative transformation of the first-image, said pseudo-image for the first-image consisting of K element weights, each element weight being for one of the K dictionary elements, the sparse, non-negative transformation employing at least one $L_2$ norm;
 (d) comparing, using the one or more computer processors, the pseudo-image for the first-image with a library of pseudo-images of known images using at least one of a Euclidean distance and a cosine distance; and
 (e) outputting, using the one or more computer processors, the results of the comparison of the pseudo-image with the library of pseudo-images of known images;
 wherein the M×N matrix has a rank R and K satisfies one or both of the following relationships:
  (i) K is greater than or equal to M; and
  (ii) K is greater than or equal to R.

Feature 11: A method of preparing a predetermined transformation matrix for use in image recognition comprising:
 (a) providing a set of N training images to a computer system, each training image having M components;
 (b) using the computer system to produce a predetermined transformation matrix by performing a sparse, non-negative factorization of an M×N matrix in which each of the N columns of the matrix constitutes one of the training images, said sparse, non-negative factorization employing at least one Frobenius norm; and
 (c) storing the predetermined transformation matrix in a non-transitory computer readable medium;
 wherein:
  (i) the predetermined transformation matrix is a M×K matrix;
  (ii) the M×N matrix has a rank R; and
  (iii) K satisfies one or both of the following relationships:
   (A) K is greater than or equal to M; and
   (B) K is greater than or equal to R.

Feature 12: The method of Feature 11 wherein a set of pseudo-images for the N training images is produced in step (b) and the method further comprises using the computer system to store at least some of those pseudo-images in a non-transitory computer readable medium as at least part of a pseudo-image library.

Feature 13: The method of Feature 11 further comprising distributing the predetermined transformation matrix as an article of commerce.

Feature 14: The method of Feature 1, 10, or 11 (or any Feature that depends therefrom) wherein K is greater than M.

Feature 15: A method for preparing a predetermined transformation matrix for use in image recognition from a prior predetermined transformation matrix comprising:
 (a) providing a prior predetermined transformation matrix $\Phi_0$ to a computer system, said prior predetermined transformation matrix having been obtained using a set of N training images;
 (b) providing a set $A_0$ of pseudo-images for the N training images to the computer system;
 (c) providing a set Y of N' training images to the computer system, where N' is greater than or equal to one and at least one member of said set is a training image that is not part of the set of N training images;
 (d) using the computer system to produce a predetermined transformation matrix using a concatenation of Y with the matrix product $\Phi_0 A_0$, where the $\Phi_0 A_0$ matrix product serves as a proxy for the set of N training images; and
 (e) storing the predetermined transformation matrix of step (d) in a non-transitory computer readable medium.

Feature 16: The method of Feature 15 wherein a set of pseudo-images for the N' training images is produced in step (d) and the method further comprises using the computer system to store at least some of those pseudo-images in a non-transitory computer readable medium as at least part of a pseudo-image library.

Feature 17: The method of Feature 15 further comprising distributing the predetermined transformation matrix of step (d) as an article of commerce.

Feature 18: A method of preparing or augmenting a library of pseudo-images for use in image recognition comprising:
 (a) providing a set of known images to a computer system;
 (b) using the computer system to perform sparse, non-negative transformations of the known images into pseudo-images using a predetermined transformation matrix; and
 (c) using the computer system to store at least some of the pseudo-images in a non-transitory computer readable medium as at least part of a pseudo-image library.

Feature 19: The method of Feature 12, 16, or 18 further comprising distributing the pseudo-image library as an article of commerce.

Feature 20: A non-transitory computer readable medium having a predetermined transformation matrix prepared by the method of Feature 11 or 15 stored therein.

Feature 21: A non-transitory computer readable medium having a pseudo-image library prepared at least in part by the method of Feature 12, 16, or 18 stored therein.

Feature 22: A non-transitory computer readable medium comprising a library of pseudo-images of known images for comparison with a pseudo-image for an unknown image wherein the pseudo-images of known images are obtained by a method comprising performing sparse, non-negative transformations of the known images into pseudo-images using a predetermined transformation matrix.

Feature 23: A non-transitory computer readable medium with instructions stored therein capable of being executed by a computer processor to perform the steps of:

(a) transforming an image into a pseudo-image;

(b) comparing the pseudo-image with a library of pseudo-images of known images; and (c) outputting the results of the comparison of the pseudo-image with the library of pseudo-images of known images;

wherein the transformation of step (a) is a sparse, non-negative transformation using a predetermined transformation matrix.

Feature 24: A computer system comprising the non-transitory computer-readable medium of Feature 23 and a computer processor for executing the instructions stored therein.

Feature 25: A system comprising:

a computer processor;

at least one computer memory (e.g., a RAM);

at least one computer storage device (e.g., a hard drive, a flash drive, and/or the cloud);

a computer interface that receives an image and stores the image in the at least one computer memory; and a computer program capable of being executed by the computer processor to generate a pseudo-image for the received image and store the pseudo-image in the at least one computer storage device;

wherein the computer program is capable of generating the pseudo-image by a method comprising performing a sparse, non-negative transformation of the image using a predetermined transformation matrix.

Feature 26: The system of Feature 25 wherein the computer program is capable of comparing the pseudo-image with a library of pseudo-images and outputting a result of the comparison.

Feature 27: The system of Feature 25 or 26 wherein the computer program is capable of including the pseudo-image in a library of pseudo-images.

Feature 28: The system of Feature 25, 26, or 27 further comprising an image capture device capable of providing an image to the computer interface.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

REFERENCES

Boyd, S. P. and L. Vandenberghe (2004). *Convex optimization*. Cambridge, UK; New York, Cambridge University Press.

Candes, E, &. Romberg, J. (2005). l1-magic: Recovery of sparse signals via convex programming. URL: www.acm.caltech.edu/l1magic/downloads/l1magic.pdf, 4, 14.

Candès, E. J., J. Romberg and T. Tao (2006). "Robust uncertainty principles: Exact signal reconstruction from highly incomplete frequency information." *Information Theory, IEEE Transactions on* 52: 489-509.

Candes, E. J., J. K. Romberg and T. Tao (2006). "Stable signal recovery from incomplete and inaccurate measurements." *Communications on pure and applied mathematics* 59(8): 1207-1223.

Candes, E. J. and T. Tao (2005). "Decoding by linear programming." *IEEE transactions on information theory* 51(12): 4203-4215.

Chen, S. S., D. L. Donoho and M. A. Saunders (2001). "Atomic decomposition by basis pursuit." *SIAM review* 43(1): 129-159.

Comon, P. and C. Jutten (2010). *Handbook of blind source separation: independent component analysis and applications*. Amsterdam; Boston, Elsevier.

Dantzig, G. B. and M. N. Thapa (1997). *Linear programming*. New York, Springer.

Donoho, D. L. (2006). "Compressed sensing." *Information Theory, IEEE Transactions on* 52(4): 1289-1306.

Donoho, D. L. (2006). "For most large underdetermined systems of linear equations the minimal l1-norm solution is also the sparsest solution." *Communications on pure and applied mathematics* 59: 797-829.

Donoho, D. L. and M. Elad (2003). "Optimally sparse representation in general (nonorthogonal) dictionaries via l1 minimization." *Proceedings of the National Academy of Sciences* 100(5): 2197-2202.

Donoho, D. L., Y. Tsaig, I. Drori and J.-L. Starck (2012). "Sparse solution of underdetermined systems of linear equations by stagewise orthogonal matching pursuit." *IEEE Transactions on Information Theory* 58(2): 1094-1121.

Elad, M. (2010). *Sparse and redundant representations: from theory to applications in signal and image processing*. New York, Springer.

Eldar, Y. C. and G. Kutyniok (2012). *Compressed sensing: theory and applications*. Cambridge; New York, Cambridge University Press.

Gill, P. E., W. Murray and M. H. Wright (1991). *Numerical linear algebra and optimization*. Redwood City, Calif., Addison-Wesley Pub. Co.

Hoyer, P. O. (2004). "Non-negative matrix factorization with sparseness constraints." *The Journal of Machine Learning Research* 5: 1457-1469.

Hurley, N. and S. Rickard (2009). "Comparing measures of sparsity." *Information Theory, IEEE Transactions on* 55: 4723-4741.

Rapin, J., J. Bobin, A. Lame and J.-L. Starck (2013). "Sparse and non-negative BSS for noisy data." *Signal Processing, IEEE Transactions on* 61: 5620-5632.

Rapin, J., J. Bobin, A. Lame and J.-L. Starck (2013). "Sparse Regularizations and Non-negativity in BSS." *Proceedings of SPARS, Lausanne, Switzerland*: 83.

Strang, G. (2006). *Linear algebra and its applications*. Belmont, C A, Thomson, Brooks/Cole.

Yu, X., D. Hu and J. Xu (2014). *Blind source separation: theory and applications*. Singapore, John Wiley & Sons Singapore Pte. Ltd.

What is claimed is:

1. A method comprising:

(a) receiving an image in a computer system;

(b) using the computer system to perform a sparse, non-negative transformation of the image into a pseudo-image using a predetermined transformation matrix;

(c) using the computer system to compare the pseudo-image with a library of pseudo-images of known images; and (d) using the computer system to output the results of the comparison of the pseudo-image with the library of pseudo-images of known images;
wherein:
(i) the predetermined transformation matrix is a matrix obtained by a method comprising using a computer system to perform a sparse, non-negative factorization of a matrix of training images; and
(ii) the image has M components, the pseudo-image has K components, and K is greater than or equal to M.

2. A method comprising:
(a) receiving an image in a computer system;
(b) using the computer system to perform a sparse, non-negative transformation of the image into a pseudo-image using a predetermined transformation matrix;
(c) using the computer system to compare the pseudo-image with a library of pseudo-images of known images; and
(d) using the computer system to output the results of the comparison of the pseudo-image with the library of pseudo-images of known images;
wherein:
(i) the predetermined transformation matrix is a matrix obtained by a method comprising using a computer system to perform a sparse, non-negative factorization of a matrix of training images; and
(ii) the image has M components each of which has only one of two possible values.

3. The method of claim 1 or 2 wherein the computer system performs the sparse, non-negative transformation using at least one $L_2$ norm.

4. The method of claim 1 or 2 wherein the matrix of training images is an M×N matrix where N is greater than or equal to M.

5. The method of claim 1 or 2 wherein the computer system performs the sparse, non-negative factorization using at least one Frobenius norm.

6. The method of claim 1 or 2 wherein the image of step (a) is a pre-processed image.

7. The method of claim 1 or 2 wherein the computer system performs the comparison of step (c) using at least one of a Euclidean distance and a cosine distance.

8. The method of claim 1 wherein the image of step (a) comprises a human face.

9. A method of performing computer-implemented image recognition comprising:
(a) providing to one or more computer processors a first-image having M components;
(b) providing to the one or more computer processors a predetermined transformation matrix, wherein:
(i) the predetermined transformation matrix is an M×K matrix in which the K columns constitute a set of K dictionary elements, and
(ii) the predetermined transformation matrix is constructed by a method comprising performing a sparse, non-negative factorization of an M×N matrix in which the N columns constitute a set of N training images, each training image having M components, the sparse, non-negative factorization employing at least one Frobenius norm;
(c) constructing, using the one or more computer processors, a pseudo-image for the first-image using the predetermined transformation matrix to perform a sparse, non-negative transformation of the first-image, said pseudo-image for the first-image consisting of K element weights, each element weight being for one of the K dictionary elements, the sparse, non-negative transformation employing at least one $L_2$ norm;
(d) comparing, using the one or more computer processors, the pseudo-image for the first-image with a library of pseudo-images of known images using at least one of a Euclidean distance and a cosine distance; and
(e) outputting, using the one or more computer processors, the results of the comparison of the pseudo-image with the library of pseudo-images of known images;
wherein the M×N matrix has a rank R and K satisfies one or both of the following relationships:
(i) K is greater than or equal to M; and
(ii) K is greater than or equal to R.

10. A method of preparing a predetermined transformation matrix for use in image recognition comprising:
(a) providing a set of N training images to a computer system, each training image having M components;
(b) using the computer system to produce a predetermined transformation matrix by performing a sparse, non-negative factorization of an M×N matrix in which each of the N columns of the matrix constitutes one of the training images, said sparse, non-negative factorization employing at least one Frobenius norm; and
(c) storing the predetermined transformation matrix in a non-transitory computer readable medium;
wherein:
(i) the predetermined transformation matrix is a M×K matrix;
(ii) the M×N matrix has a rank R; and
(iii) K satisfies one or both of the following relationships:
(A) K is greater than or equal to M; and
(B) K is greater than or equal to R.

11. The method of claim 10 wherein a set of pseudo-images for the N training images is produced in step (b) and the method further comprises using the computer system to store at least some of those pseudo-images in a non-transitory computer readable medium as at least part of a pseudo-image library.

12. The method of claim 10 further comprising distributing the predetermined transformation matrix as an article of commerce.

13. The method of claim 1, 9, or 10 wherein K is greater than M.

14. A method for preparing a predetermined transformation matrix for use in image recognition from a prior predetermined transformation matrix comprising:
(a) providing a prior predetermined transformation matrix $\Phi_0$ to a computer system, said prior predetermined transformation matrix having been obtained using a set of N training images;
(b) providing a set $A_0$ of pseudo-images for the N training images to the computer system;
(c) providing a set Y of N' training images to the computer system, where N' is greater than or equal to one and at least one member of said set is a training image that is not part of the set of N training images;
(d) using the computer system to produce a predetermined transformation matrix using a concatenation of Y with the matrix product $\Phi_0 A_0$, where the $\Phi_0 A_0$ matrix product serves as a proxy for the set of N training images; and
(e) storing the predetermined transformation matrix of step (d) in a non-transitory computer readable medium.

15. The method of claim 14 wherein a set of pseudo-images for the N' training images is produced in step (d) and the method further comprises using the computer system to store at least some of those pseudo-images in a non-transitory computer readable medium as at least part of a pseudo-image library.

16. The method of claim 14 further comprising distributing the predetermined transformation matrix of step (d) as an article of commerce.

17. A method of preparing or augmenting a library of pseudo-images for use in image recognition by comparison of a pseudo-image for an image to be recognized with the library, comprising:
   (a) providing a set of known images to a computer system;
   (b) using the computer system to perform sparse, non-negative transformations of the known images into pseudo-images using a predetermined transformation matrix; and
   (c) using the computer system to store at least some of the pseudo-images in a non-transitory computer readable medium as at least part of a pseudo-image library,
   wherein the predetermined transformation matrix is a matrix obtained by a method comprising using a computer system to perform a sparse, non-negative factorization of a matrix of training images.

18. The method of claim 11, 15, or 17 further comprising distributing the pseudo-image library as an article of commerce.

19. A non-transitory computer readable medium having a predetermined transformation matrix prepared by the method of claim 10 or 14 stored therein.

20. A non-transitory computer readable medium having a pseudo-image library prepared at least in part by the method of claim 11, 15, or 17 stored therein.

21. A non-transitory computer readable medium comprising a library of pseudo-images of known images for use in image recognition by comparison of a pseudo-image for an image to be recognized with the library, wherein:
   (i) the pseudo-images of known images are obtained by a method comprising performing sparse, non-negative transformations of the known images into pseudo-images using a predetermined transformation matrix, and
   (ii) the predetermined transformation matrix is a matrix obtained by a method comprising using a computer system to perform a sparse, non-negative factorization of a matrix of training images.

22. A non-transitory computer readable medium with instructions stored therein which, when executed by a computer processor, perform the steps of
   (a) transforming an image into a pseudo-image;
   (b) comparing the pseudo-image with a library of pseudo-images of known images; and
   (c) outputting the results of the comparison of the pseudo-image with the library of pseudo-images of known images; wherein:
   (i) the transformation of step (a) is a sparse, non-negative transformation using a predetermined transformation matrix; and
   ii) the predetermined transformation matrix is a matrix obtained by a method comprising using a computer system to perform a sparse, non-negative factorization of a matrix of training images.

23. A computer system comprising the non-transitory computer-readable medium of claim 22 and a computer processor for executing the instructions stored therein.

24. A system comprising:
   a computer processor;
   at least one computer memory; at least one computer storage device;
   a computer interface for receiving an image and storing the image in the at least one computer memory; and
   a computer program which, when executed by the computer processor, generates a pseudo-image for the received image and stores the pseudo-image in the at least one computer storage device;
   wherein: (i) the computer program generates the pseudo-image by a method comprising performing a sparse, non-negative transformation of the image using a predetermined transformation matrix; and
   (ii) the predetermined transformation matrix is a matrix obtained by a method comprising using a computer system to perform a sparse, non-negative factorization of a matrix of training images.

25. The system of claim 24 wherein the computer program, when executed by the computer processor, compares the pseudo-image with a library of pseudo-images and outputs a result of the comparison.

26. The system of claim 24 or 25 wherein the computer program, when executed by the computer processor, includes the pseudo-image in a library of pseudo-images.

27. The system of claim 24 further comprising an image capture device for providing an image to the computer interface.

* * * * *